United States Patent
Lekivetz et al.

(10) Patent No.: US 11,663,374 B2
(45) Date of Patent: May 30, 2023

(54) EXPERIMENT DESIGN VARIANTS TERM ESTIMATION GUI

(71) Applicant: JMP Statistical Discovery LLC, Cary, NC (US)

(72) Inventors: Ryan Adam Lekivetz, Cary, NC (US); Joseph Albert Morgan, Raleigh, NC (US); Caleb Bridges King, Cary, NC (US); Bradley Allen Jones, Cary, NC (US); Mark Wallace Bailey, Haddonfield, NJ (US); Jacob Davis Rhyne, Dallas, NC (US)

(73) Assignee: JMP Statistical Discovery LLC, Cary, NC (US)

( * ) Notice: Subject to any disclaimer, the term of this patent is extended or adjusted under 35 U.S.C. 154(b) by 0 days.

(21) Appl. No.: 17/883,193

(22) Filed: Aug. 8, 2022

(65) Prior Publication Data
US 2023/0040772 A1 Feb. 9, 2023

Related U.S. Application Data

(63) Continuation of application No. 17/883,065, filed on Aug. 8, 2022.

(60) Provisional application No. 63/230,523, filed on Aug. 6, 2021.

(51) Int. Cl.
*G06F 30/12* (2020.01)
*G06F 9/451* (2018.01)
*G06F 3/04847* (2022.01)

(52) U.S. Cl.
CPC .......... *G06F 30/12* (2020.01); *G06F 3/04847* (2013.01); *G06F 9/453* (2018.02)

(58) Field of Classification Search
CPC combination set(s) only.
See application file for complete search history.

(56) References Cited

U.S. PATENT DOCUMENTS

| | | | |
|---|---|---|---|
| 5,559,728 A | * | 9/1996 | Kowalski ............. G01N 21/274 73/1.01 |
| 8,866,818 B2 | | 10/2014 | Rubin |
| 10,296,680 B2 | | 5/2019 | Morgan et al. |

(Continued)

OTHER PUBLICATIONS

MiniTab Workspace® Brochure—Minitab®—retrieved Apr. 5, 2021.
(Continued)

*Primary Examiner* — Tadesse Hailu
(74) *Attorney, Agent, or Firm* — KDW Firm PLLC

(57) ABSTRACT

An apparatus includes a processor to: present prompts guiding selection of first subset terms for estimation of variants of an experiment design based on a model thereof, and second subset terms for estimation using Bayesian modification; monitor for selections of term; in response to each change in the first subset terms, determine whether all first subset terms can be estimated based on the model; in response to the first subset including too many terms, present an indication of too many terms being selected for estimation based on the model; in response to the first subset including fewer terms than can be estimated based on the model, present an indication that more terms could be selected for estimation based on the model; and for each variant of the experiment design, estimate each first subset term based on the model, and estimate each second subset term using Bayesian modification.

30 Claims, 39 Drawing Sheets

(56) References Cited

U.S. PATENT DOCUMENTS

| | | | |
|---|---|---|---|
| 10,318,674 B2 | 6/2019 | Morgan et al. | |
| 10,386,271 B1 | 8/2019 | King et al. | |
| 10,698,806 B1 | 6/2020 | Scholz et al. | |
| 10,803,214 B1 | 10/2020 | Jones et al. | |
| 10,902,162 B2 | 1/2021 | Morgan et al. | |
| 10,943,407 B1* | 3/2021 | Morgan | G16H 10/60 |
| 11,010,285 B2 | 5/2021 | Hicks et al. | |
| 11,106,567 B2 | 8/2021 | Hicks et al. | |
| 2004/0105495 A1* | 6/2004 | Lee | H04N 19/53 |
| | | | 375/E7.107 |
| 2007/0078553 A1* | 4/2007 | Miwa | G06F 30/00 |
| | | | 700/97 |
| 2007/0271352 A1* | 11/2007 | Khopkar | H04L 67/535 |
| | | | 709/217 |
| 2008/0270333 A1* | 10/2008 | Jhala | G06Q 30/02 |
| | | | 706/16 |
| 2013/0332132 A1* | 12/2013 | Mongalvy | G06F 30/20 |
| | | | 703/10 |
| 2016/0063423 A1 | 3/2016 | Rao | |
| 2016/0124839 A1* | 5/2016 | Mordo | G06F 11/3664 |
| | | | 717/124 |
| 2018/0060469 A1* | 3/2018 | Morgan | G06F 30/20 |
| 2018/0137415 A1 | 5/2018 | Steinberg et al. | |
| 2019/0346297 A1 | 11/2019 | Lekivetz | |

OTHER PUBLICATIONS

Design-Expert® Software Brochure—Version 13—Stat-Ease, Inc.—retrieved Jan. 25, 2021.

Minitab® Real-Time SPC Brochure—Minitab®—retrieved Jul. 27, 2021.

* cited by examiner

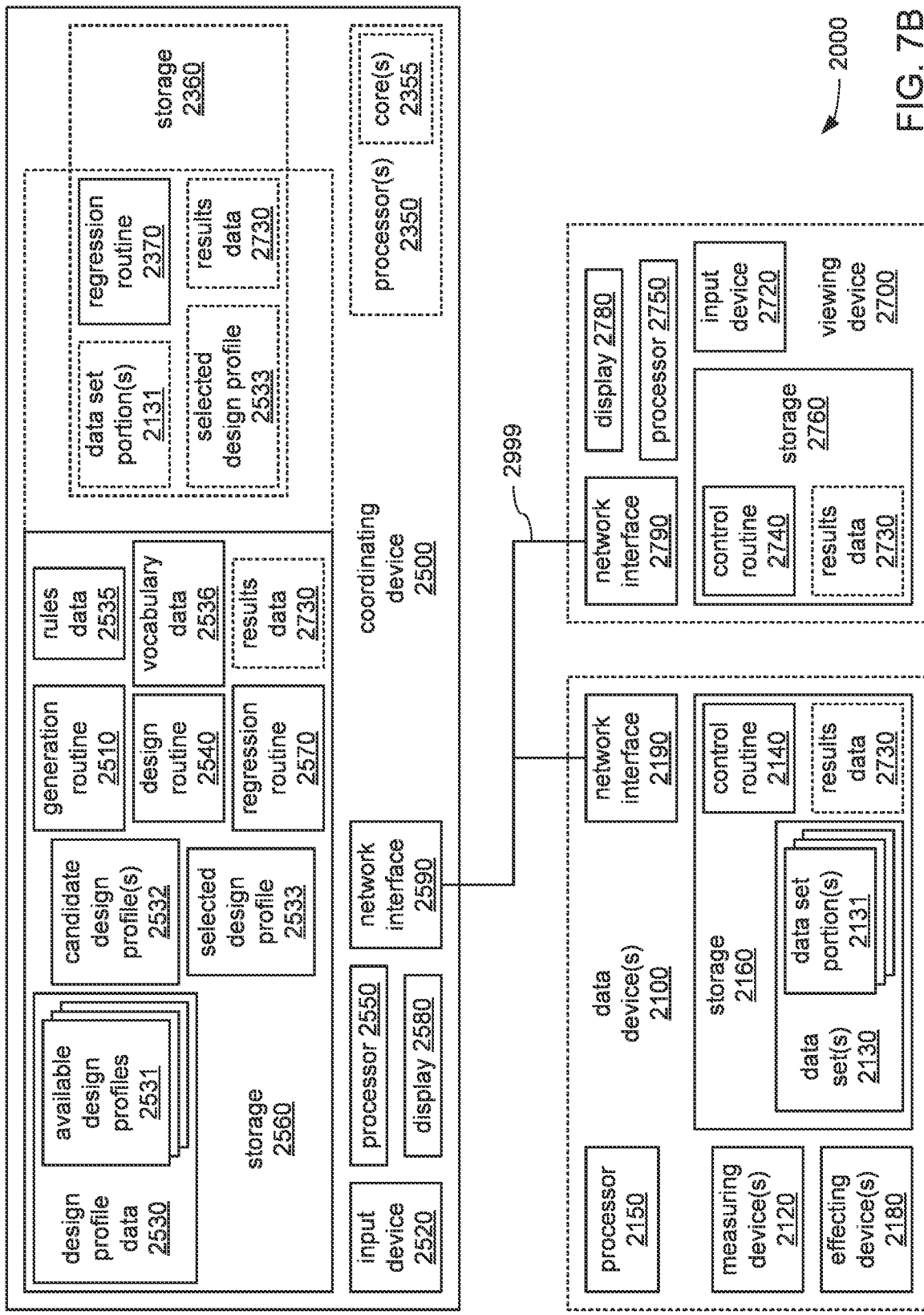

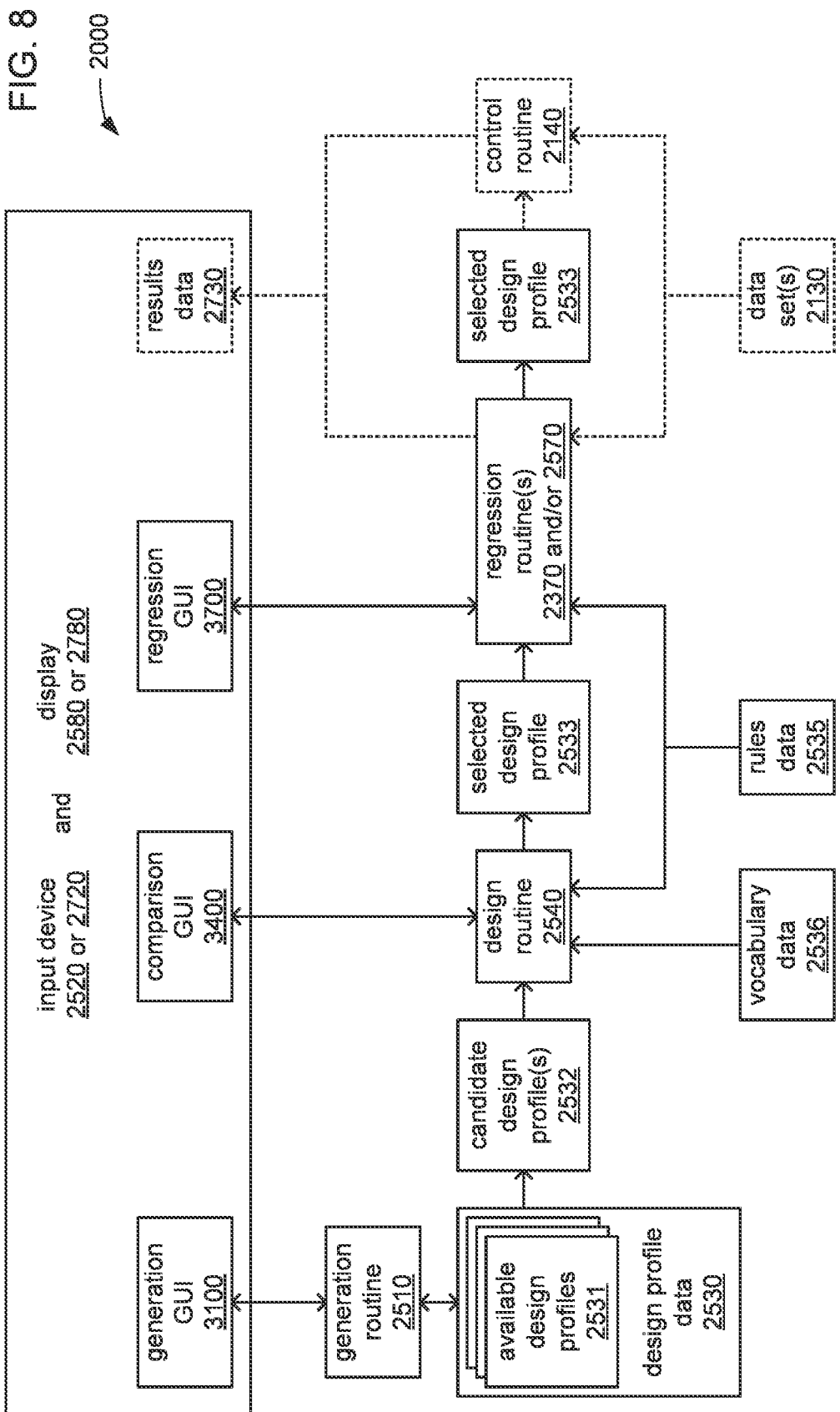

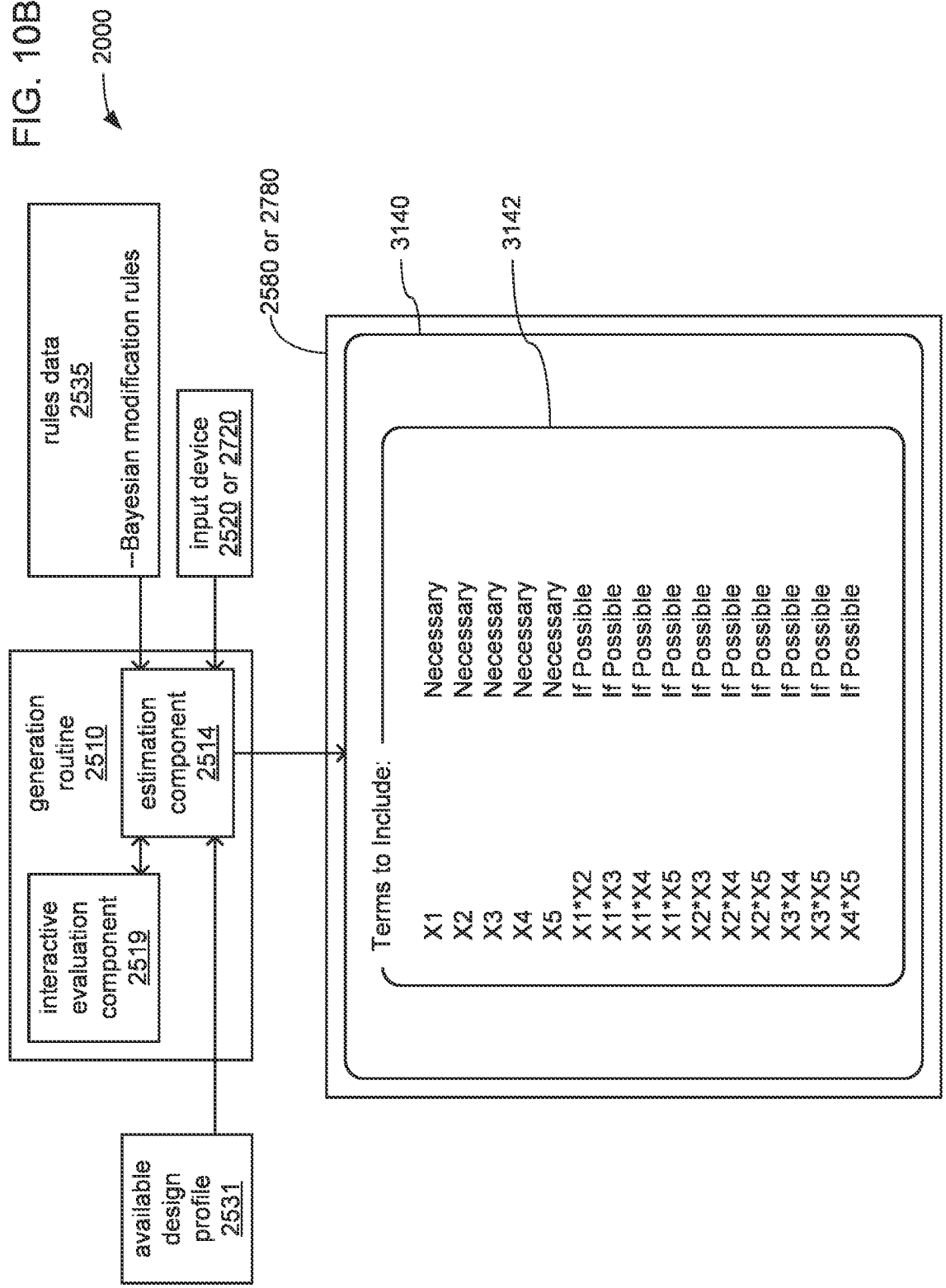

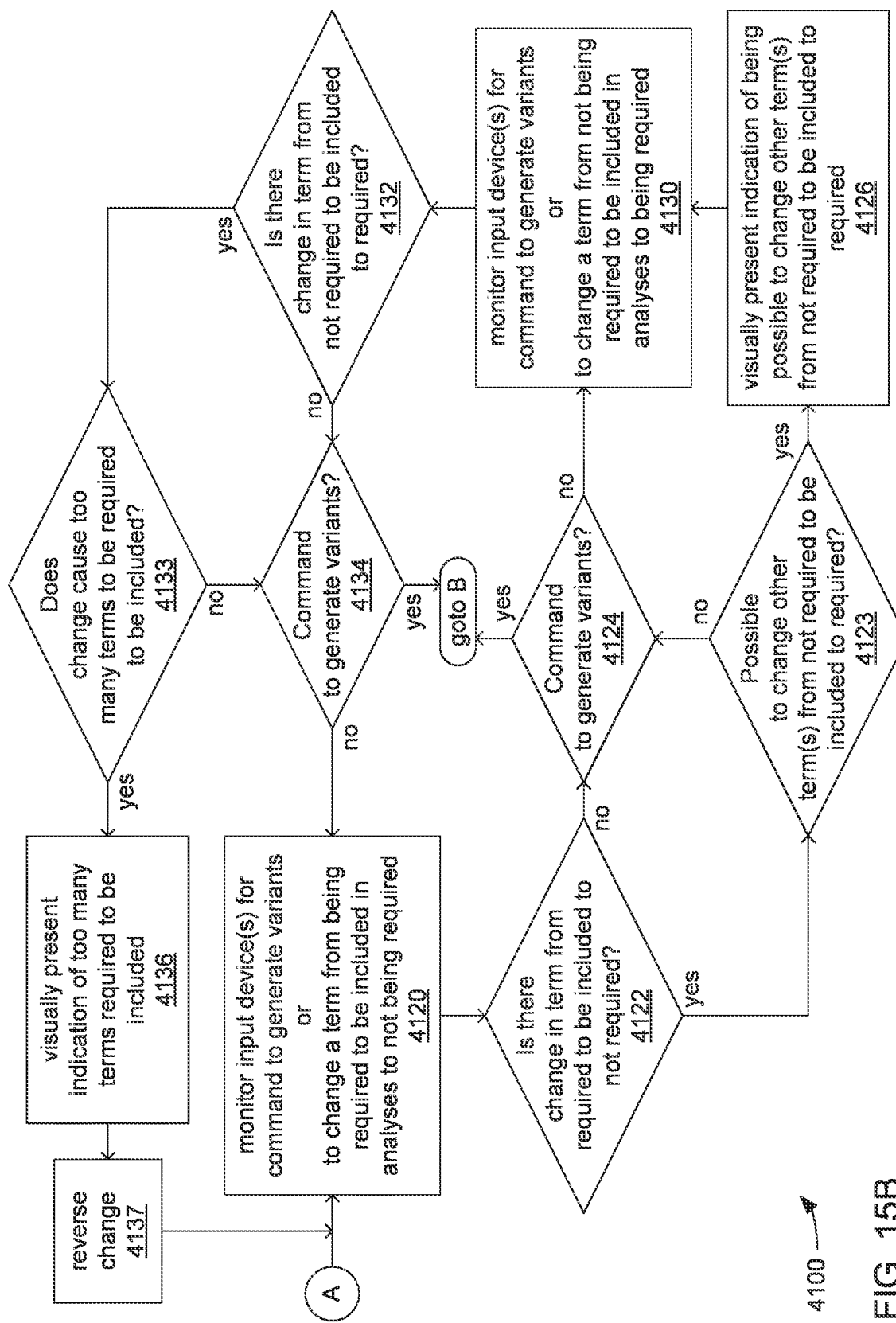

EXPERIMENT DESIGN VARIANTS TERM ESTIMATION GUI

CROSS-REFERENCE TO RELATED APPLICATIONS

This application is a continuation of, and claims the benefit of priority under 35 U.S.C. § 120 to, U.S. patent application Ser. No. 17/883,065 filed Aug. 8, 2022, and entitled "Experiment Design Variants Evaluation Table GUI", which is incorporated herein by reference in its entirety for all purposes. In turn, U.S. patent application Ser. No. 17/883,065 claims the benefit of priority under 35 U.S.C. § 119(e) to U.S. Provisional Application Ser. No. 63/230,523 filed Aug. 6, 2021, the entirety of which is incorporated herein by reference.

BACKGROUND

It has become increasingly commonplace to use experiment designs as a tool to derive models of complex systems in an effort to identify inputs (commonly referred to as "factors") that explain observed outputs (commonly referred to as "responses"), especially where there is a need to change undesired responses. However, the derivation of a model that provides an understanding of a complex system that is sufficient to explain a linkage between particular factors and particular responses is often a time-consuming task, since each particular type of model is typically closely associated with a particular type of experiment design. Thus, it is often necessary to suffer through a wasteful trial-and-error process in which best efforts to select a type of model that is believed to be capable of providing such a sufficient understanding of a system leads to a choice of experiment design that is later found to be undesirably ineffective in illuminating a linkage between particular factor(s) and response(s). Thus, there may be multiple iterations of selection of a type of model followed by the revelation of the need to make another selection only after an expenditure of considerable time to perform the associated type of experiment design.

Even after the identification of a type of model and associated type of experiment design that at least appears to be sufficiently capable of illuminating a linkage between particular factor(s) and response(s), additional considerable time may be consumed in iteratively deriving coefficients of the model and/or other parameters of the associated experiment design to derive a sufficiently useful model. Also, practical limitations of cost, availability of materials and/or available time may impose the need to perform the associated experiment design in a less than technically ideal manner, and such impositions may need to be taken into account in deriving the model.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform operations including, receive, from an input device communicatively coupled to the at least one processor, indications of selections, from among a predefined set of parameters of an experiment design, of a subset of parameters of the experiment design that are to be varied to generate a set of variants of the experiment design, wherein: the experiment design is associated with a model of a system under evaluation; the model comprises a set of terms as inputs to the model, and a set of responses as outputs from the model; and each term of the set of terms comprises at least one factor of a set of factors that are inputs to the system under evaluation. The at least one processor is also caused to perform operations including: receive, from the input device, indications of at least a first subset of terms of the set of terms that are to be estimated based on the model, generate the set of variants based on the subset of parameters of the experiment design that are to be varied, and for each variant, perform operations including: estimate at least the first subset of terms based on the model; and derive at least one optimality value indicative of at least one type of optimality of the variant. The at least one processor is further caused to provide a table portion of a graphical user interface (GUI), wherein the at least one processor is caused to perform operations including, present, on a display communicatively coupled to the at least one processor, a table of the set of variants, wherein the table includes: a column for each parameter of the subset of parameters of the experiment design to generate the set of variants; at least one column for the at least one optimality value; a row for each variant, wherein the row extends through each column to provide a location at which a value associated with the variant for each value of a parameter of the subset of parameters is presented, and to provide a location at which a value associated with the variant for each type of optimality of the at least one type of optimality of the variant is presented; and for each column of the table, a bar graph of a distribution of the values presented in the column across all of the rows of the table. In providing the table portion of the GUI, the at least one processor is further caused to perform operations including: present, on the display, along with the table, a set of function controls operable to select a function to become a current function to perform on at least one row of the table in response to a selection of a bar of a bar graph of a column; monitor the input device for an indication of operation of a function control to select a function to become the current function, or for an indication of a selection of a bar of a bar graph of a column; in response to operation of a function control to select a function, change the current function to the selected function; and in response to a selection of a bar of a bar graph of a column, perform the current function on at least one row of the table based on all instances within the column of the value associated with selected bar.

A computer-program product tangibly embodied in a non-transitory machine-readable storage medium includes instructions operable to cause at least one processor to perform operations including, receive, from an input device communicatively coupled to the at least one processor, indications of selections, from among a predefined set of parameters of an experiment design, of a subset of parameters of the experiment design that are to be varied to generate a set of variants of the experiment design, wherein: the experiment design is associated with a model of a system under evaluation; the model comprises a set of terms as inputs to the model, and a set of responses as outputs from the model; and each term of the set of terms comprises at least one factor of a set of factors that are inputs to the system under evaluation. The at least one processor is also caused to perform operations including: receive, from the input device, indications of at least a first subset of terms of the set of terms that are to be estimated based on the model, generate the set of variants based on the subset of parameters of the experiment design that are to be varied, and for each variant, perform operations including: estimate at least the first subset of terms based on the model; and derive at least one optimality value indicative of at least one type of optimality of the variant. The at least one processor is further caused to provide a table portion of a graphical user interface (GUI), wherein the at least one processor is caused to perform operations including, present, on a display communicatively coupled to the at least one processor, a table of the set of variants, wherein the table includes: a column for each parameter of the subset of parameters of the experiment design to generate the set of variants; at least one column for the at least one optimality value; a row for each variant, wherein the row extends through each column to provide a location at which a value associated with the variant for each value of a parameter of the subset of parameters is presented, and to provide a location at which a value associated with the variant for each type of optimality of the at least one type of optimality of the variant is presented; and for each column of the table, a bar graph of a distribution of the values presented in the column across all of the rows of the table. In providing the table portion of the GUI, the at least one processor is further caused to perform operations including: present, on the display, along with the table, a set of function controls operable to select a function to become a current function to perform on at least one row of the table in response to a selection of a bar of a bar graph of a column; monitor the input device for an indication of operation of a function control to select a function to become the current function, or for an indication of a selection of a bar of a bar graph of a column; in response to operation of a function control to select a function, change the current function to the selected function; and in response to a selection of a bar of a bar graph of a column, perform the current function on at least one row of the table based on all instances within the column of the value associated with selected bar.

The at least one processor may be caused to, in response to operation of a function control of the set of function controls to select highlighting as the current function, and in response to selection of a bar of a bar graph of a column, perform operations including: identify each row of the table in which an instance of the value associated with the selected bar that occurs within the column; and mark each identified row with a preselected type of highlighting.

The at least one processor may be caused to, in response to operation of a function control of the set of function controls to select grouping as the current function, and in response to selection of a bar of a bar graph of a column, perform operations including: identify each of the rows of the table in which an instance of the value associated with the selected bar that occurs within the column; and rearrange the rows of the table to group together the identified rows as the topmost rows of the table.

The at least one processor may be caused to, in response to operation of a function control of the set of function controls to select filtering as the current function, and in response to selection of a bar of a bar graph of a column, perform operations including: identify each of the rows of the table in which an instance of the value associated with the selected bar that occurs within the column; remove, from the table, all rows of the table that are not among the identified rows; present another function control on the display that is operable to undo the most recent performance of the current function; monitor the input device for an indication of first operation of the other function control; in response to the first operation of the other function control, restore the rows of the table that are not among the identified rows, and highlight the identified rows; continue to monitor the input device for an indication of second operation of the other function control; and in response to the second operation of the other function control, remove the highlighting from the identified rows.

For each column of the table, the at least one processor may be caused to perform operations including: identify a value among all of the values present within the column as comprising an aggregate function; mark each instance of the identified value with a type of highlighting indicative of a type of the aggregate function; provide a visual guide indicative of the type of the aggregate function and the type of highlighting associated with the type of the aggregate function; and mark the bar of the bar graph of the column that is associated with the value to visually correlate the bar with the value and the type of aggregate function.

The aggregate function may include at least one of: a minimum; a maximum; a median; a mean; or an average. The type of highlighting may include at least one of a color or a cross-hatching pattern.

The at least one processor may be further caused to provide a variants portion of the GUI, wherein the at least one processor may be caused to perform operations including: present, on the display, visual prompts to guide an operator through selecting, from among the predefined set of parameters of the experiment design, the subset of parameters that are to be varied to generate the set of variants; present, on the display, visual prompts to guide the operator through specifying a range of values for each parameter of the subset of parameters; and receive, from the input device, indications of the range of values for each parameter of the subset of parameters.

At least one parameter of the predefined set of parameters may include at least one of: a selection of a type of optimality; a quantity of runs; at least one center point; a quantity of replicates; or a quantity of random starts.

The at least one processor may be further caused to provide an estimation portion of the GUI, wherein the at least one processor may be caused to perform operations including: present, on the display, visual prompts to guide an operator through selecting, from among the set of terms, the first subset of terms to be estimated for each variant based on the model, and a second subset of terms to be estimated for each variant using Bayesian modification; and monitor the input device for indications of selections of terms to be included in the first subset of terms, and for indications of selections of terms to be included in the second subset of terms, and for an indication of receipt of a command to generate the set of variants.

The at least one processor may be further caused, for each variant, to estimate the second subset of terms using Bayesian modification.

A computer-implemented method includes receiving, by at least one processor, and from an input device communicatively coupled to the at least one processor, indications of selections, from among a predefined set of parameters of an experiment design, of a subset of parameters of the experiment design that are to be varied to generate a set of variants of the experiment design, wherein: the experiment design is associated with a model of a system under evaluation; the model comprises a set of terms as inputs to the model, and a set of responses as outputs from the model; and each term of the set of terms comprises at least one factor of a set of factors that are inputs to the system under evaluation. The method also includes receiving, by the at least one processor, and from the input device, indications of at least a first subset of terms of the set of terms that are to be estimated based on the model, generating, by the at least one processor, the set of variants based on the subset of parameters of the experiment design that are to be varied, and for each variant, performing operations including: estimating, by the at least one processor, at least the first subset of terms based on the model; and deriving, by the at least one processor, at least one optimality value indicative of at least one type of optimality of the variant. The method further includes providing, by the at least one processor, a table portion of a graphical user interface (GUI), wherein the method comprises performing operations including presenting, by the at least one processor, and on a display communicatively coupled to the at least one processor, a table of the set of variants, wherein the table includes: a column for each parameter of the subset of parameters of the experiment design to generate the set of variants; at least one column for the at least one optimality value; a row for each variant, wherein the row extends through each column to provide a location at which a value associated with the variant for each value of a parameter of the subset of parameters is presented, and to provide a location at which a value associated with the variant for each type of optimality of the at least one type of optimality of the variant is presented; and for each column of the table, a bar graph of a distribution of the values presented in the column across all of the rows of the table. In providing the table portion of the GUI, the method further includes: presenting, by the at least one processor, and on the display, along with the table, a set of function controls operable to select a function to become a current function to perform on at least one row of the table in response to a selection of a bar of a bar graph of a column; monitoring, by the at least one processor, the input device for an indication of operation of a function control to select a function to become the current function, or for an indication of a selection of a bar of a bar graph of a column; in response to operation of a function control to select a function, changing the current function to the selected function; and in response to a selection of a bar of a bar graph of a column, performing, by the at least one processor, the current function on at least one row of the table based on all instances within the column of the value associated with selected bar.

The method may further include, in response to operation of a function control of the set of function controls to select highlighting as the current function, and in response to selection of a bar of a bar graph of a column, performing operations including: identifying, by the at least one processor, each row of the table in which an instance of the value associated with the selected bar that occurs within the column; and marking each identified row with a preselected type of highlighting.

The method may further include, in response to operation of a function control of the set of function controls to select grouping as the current function, and in response to selection of a bar of a bar graph of a column, performing operations including: identifying, by the at least one processor, each of the rows of the table in which an instance of the value associated with the selected bar that occurs within the column; and rearranging, by the at least one processor, the rows of the table to group together the identified rows as the topmost rows of the table.

The method may further include, in response to operation of a function control of the set of function controls to select filtering as the current function, and in response to selection of a bar of a bar graph of a column, performing operations including: identifying, by the at least one processor, each of the rows of the table in which an instance of the value associated with the selected bar that occurs within the column; removing, from the table, all rows of the table that are not among the identified rows; presenting, by the at least one processor, another function control on the display that is operable to undo the most recent performance of the current function; monitoring, by the at least one processor, the input device for an indication of first operation of the other function control; in response to the first operation of the other function control, restoring the rows of the table that are not among the identified rows, and highlight the identified rows; continuing to monitor, by the at least one processor, the input device for an indication of second operation of the other function control; and in response to the second operation of the other function control, removing the highlighting from the identified rows.

The method may further include, for each column of the table, performing operations including: identifying, by the at least one processor, a value among all of the values present within the column as comprising an aggregate function; marking each instance of the identified value with a type of highlighting indicative of a type of the aggregate function; providing, by the at least one processor, a visual guide indicative of the type of the aggregate function and the type of highlighting associated with the type of the aggregate function; and marking the bar of the bar graph of the column that is associated with the value to visually correlate the bar with the value and the type of aggregate function.

The aggregate function may include at least one of: a minimum; a maximum; a median; a mean; or an average. The type of highlighting may include at least one of a color or a cross-hatching pattern.

The method may further include providing, by the at least one processor, a variants portion of the GUI, wherein the method comprises performing operations including: presenting, by the at least one processor, and on the display, visual prompts to guide an operator through selecting, from among the predefined set of parameters of the experiment design, the subset of parameters that are to be varied to generate the set of variants; presenting, by the at least one processor, and on the display, visual prompts to guide the operator through specifying a range of values for each parameter of the subset of parameters; and receiving, by the at least one processor, and from the input device, indications of the range of values for each parameter of the subset of parameters.

At least one parameter of the predefined set of parameters may include at least one of: a selection of a type of optimality; a quantity of runs; at least one center point; a quantity of replicates; or a quantity of random starts.

The method may further include providing, by the at least one processor, an estimation portion of the GUI, wherein the at least one processor is caused to perform operations including: presenting, by the at least one processor, and on the display, visual prompts to guide an operator through selecting, from among the set of terms, the first subset of terms to be estimated for each variant based on the model, and a second subset of terms to be estimated for each variant using Bayesian modification; and monitoring, by the at least one processor, the input device for indications of selections of terms to be included in the first subset of terms, and for indications of selections of terms to be included in the second subset of terms, and for an indication of receipt of a command to generate the set of variants.

The method may further include, for each variant, estimating, by the at least one processor, the second subset of terms using Bayesian modification.

An apparatus includes at least one processor and a storage to store instructions that, when executed by the at least one processor, cause the at least one processor to perform operations including receive, from an input device communicatively coupled to the at least one processor, an indication of a selection of an experiment design from which a set of variants of the experiment design are to be generated, wherein: the experiment design is associated with a model of a system under evaluation; the model comprises a set of terms as inputs to the model, and a set of responses as outputs from the model; and each term of the set of terms comprises at least one factor of a set of factors that are inputs to the system under evaluation. The at least one processor is also caused to receive, from the input device, indications of selections, from among a predefined set of parameters of the experiment design, of a subset of parameters of the experiment design that are to be varied to generate the set of variants, and to provide an estimation portion of a graphical user interface (GUI), wherein the at least one processor is caused to perform operations including: present, on a display communicatively coupled to the at least one processor, visual prompts to guide an operator through selecting, from among the set of terms, a first subset of terms to be estimated for each variant based on the model, and a second subset of terms to be estimated for each variant using Bayesian modification; monitor the input device for indications of selections of terms to be included in the first subset of terms, for indications of selections of terms to be included in the second subset of terms, or for an indication of receipt of a command to generate the set of variants; in response to each indication of a change in the terms currently included in the first subset of terms, determine whether all of the terms currently included within the first subset are able to be estimated based on the model; in response to a determination that the first subset of terms includes a quantity of terms greater than is able to be estimated based on the model, present, on the display, an indication that too many terms have been selected for estimation based on the model; or in response to a determination that the first subset of terms includes a quantity of terms less than is able to be estimated based on the model, present, on the display, an indication that more terms are able to be selected for estimation based on the model. The at least one processor, in response to receiving the command to generate the set of variants, is further caused to perform operations including: generate the set of variants based on the subset of parameters of the experiment design that are to be varied; for each variant, estimate each term of the first subset of terms based on the model, and estimate each term of the second subset of terms using Bayesian modification; and provide a table portion of the GUI, wherein the at least one processor is caused to present, on the display, a table, wherein, for each variant, the table comprises values of the subset of parameters of the experiment design that were used to generate the variant.

A computer-program product tangibly embodied in a non-transitory machine-readable storage medium includes instructions operable to cause at least one processor to perform operations including receive, from an input device communicatively coupled to the at least one processor, an indication of a selection of an experiment design from which a set of variants of the experiment design are to be generated, wherein: the experiment design is associated with a model of a system under evaluation; the model comprises a set of terms as inputs to the model, and a set of responses as outputs from the model; and each term of the set of terms comprises at least one factor of a set of factors that are inputs to the system under evaluation. The at least one processor is also caused to receive, from the input device, indications of selections, from among a predefined set of parameters of the experiment design, of a subset of parameters of the experiment design that are to be varied to generate the set of variants, and to provide an estimation portion of a graphical user interface (GUI), wherein the at least one processor is caused to perform operations including: present, on a display communicatively coupled to the at least one processor, visual prompts to guide an operator through selecting, from among the set of terms, a first subset of terms to be estimated for each variant based on the model, and a second subset of terms to be estimated for each variant using Bayesian modification; monitor the input device for indications of selections of terms to be included in the first subset of terms, for indications of selections of terms to be included in the second subset of terms, or for an indication of receipt of a command to generate the set of variants; in response to each indication of a change in the terms currently included in the first subset of terms, determine whether all of the terms currently included within the first subset are able to be estimated based on the model; in response to a determination that the first subset of terms includes a quantity of terms greater than is able to be estimated based on the model, present, on the display, an indication that too many terms have been selected for estimation based on the model; or in response to a determination that the first subset of terms includes a quantity of terms less than is able to be estimated based on the model, present, on the display, an indication that more terms are able to be selected for estimation based on the model. The at least one processor, in response to receiving the command to generate the set of variants, is further caused to perform operations including: generate the set of variants based on the subset of parameters of the experiment design that are to be varied; for each variant, estimate each term of the first subset of terms based on the model, and estimate each term of the second subset of terms using Bayesian modification; and provide a table portion of the GUI, wherein the at least one processor is caused to present, on the display, a table, wherein, for each variant, the table comprises values of the subset of parameters of the experiment design that were used to generate the variant.

Presenting, on the display, an indication that too many terms have been selected for estimation based on the model may include the at least one processor performing operations including: reversing a most recent change in the terms currently included in the first subset of terms; and presenting, on the display, an indication that the most recent change in the terms currently included in the first subset of terms has been reversed.

Providing the estimation portion of the GUI may further include the at least one processor performing operations including: present, on the display, a list of at least first-order terms and second-order terms of the model; initially present, on the display, and beside each first-order term of the list, an indication of the first-order term as selected to be estimated based on the model as a default; initially include all first-order terms of the model in the first subset of terms to cause all first-order terms of the model to be estimated based on the model as a default; for each first-order term of the list, monitor the input device for a change of the indication of being selected to be estimated based on the model to an indication of being selected to not be estimated; and in response to a change, for a first-order term of the list, of the indication of being selected to be estimated based on the model to an indication of being selected to not be estimated, remove the first-order term from the first subset of terms.

The performance of the estimation of each term of the second subset of terms using Bayesian modification may be conditioned on the second subset of terms including at least one term. Providing the estimation portion of the GUI further may include the at least one processor performing operations including: initially present, on the display, and beside each second-order term of the list, an indication of the second-order term as not being selected to be estimated as a default; initially include no second-order terms of the model in either of the first subset of terms or the second subset of terms as a default, such that the second subset is initially an empty set; for at least one second-order term of the list, present, on the display, an option to change the indication of not being selected to be estimated to an indication of being selected to be estimated using Bayesian modification; for each term of the list, monitor the input device for a change of the indication of not being selected to be estimated, or of the indication of being selected to be estimated based on the model, to an indication of being selected to be estimated using Bayesian modification; and in response to a change, for a term of the list, of the indication of not being selected to be estimated, or of the indication of being selected to be estimated based on the model, to an indication of being selected to be estimated using Bayesian modification, include the term in the second subset of terms.

The performance of the estimation of each term of the second subset of terms using Bayesian modification may be conditioned on the second subset of terms comprising at least one term. Providing the estimation portion of the GUI may further include the at least one processor performing operations including: initially present, on the display, and beside each second-order term of the list, an indication of the second-order term as being selected to be estimated using Bayesian modification as a default; initially include all second-order terms of the model in the second subset of terms as a default; for at least one second-order term of the list, present, on the display, an option to change the indication of being selected to be estimated using Bayesian modification to either an indication of being selected to not be estimated or an indication of being selected to be estimated based on the model; for each term of the list, monitor the input device for a change of the indication of not being selected to be estimated to either an indication of being selected to not be estimated or an indication of being selected to be estimated based on the model; and in response to a change, for a term of the list, of the indication of being selected to be estimated using Bayesian modification to an indication of being selected to not be estimated, remove the term from the second subset of terms. Providing the estimation portion of the GUI may still further include the at least one processor in response to a change, for a term of the list, of the indication of being selected to be estimated using Bayesian modification to an indication of being selected to be estimated based on the model, perform operations including: determine whether adding the term to the first subset of terms would cause the first subset of terms to include a quantity of terms greater than is able to be estimated based on the model; in response to a determination that the first subset of terms would include a quantity of terms greater than is able to be estimated based on the model, present, on the display, an indication that the change results in too many terms to be estimated using the model; and in response to a determination that the first subset of terms would not include a quantity of terms greater than is able to be estimated based on the model, remove the term from the second subset of terms, and add the term to the first subset of terms.

Providing the estimation portion of the GUI may further include the at least one processor performing operations including: determine a quantity of second-order terms that are able to be estimated based on the model in addition to all of the first-order terms; initially present, on the display, and beside each second-order term of the quantity of second-order terms of the list, an indication of each second-order term of the quantity of second-order terms as selected to be estimated based on the model as a default; initially include each second-order term of the quantity of second-order terms of the model in the first subset of terms to cause each second-order term of the quantity of second-order terms of the model to be estimated based on the model as a default; for at least one first-order term of the list, present, on the display, an option to change the indication of being selected to be estimated based on the model to an indication of being selected to not be estimated; and for each first-order term of the list, monitor the input device for a change of the indication of being selected to be estimated based on the model to an indication of being selected to not be estimated. Providing the estimation portion of the GUI may still further include the at least one processor, in response to a change, for a first-order term of the list, of the indication of being selected to be estimated based on the model to an indication of being selected to not be estimated, perform operations including: remove the first-order term from the first subset of terms; present, on the display and beside another second-order term of the second-order terms of the list, an indication of the other second-order term as being selected to be estimated using the model; and include the other second-order term in the first subset of terms.

The at least one processor may be further caused to provide a variants portion of the GUI, wherein the at least one processor is caused to perform operations including: present, on the display, visual prompts to guide the operator through selecting, from among the predefined set of parameters of the experiment design, the subset of parameters that are to be varied to generate the set of variants; present, on the display, visual prompts to guide the operator through specifying a range of values for each parameter of the subset of parameters; and receive, from the input device, indications of the range of values for each parameter of the subset of parameters.

Providing the variants portion of the GUI may further include the at least one processor performing operations including: present, on the display, visual prompts to guide the operator through specifying a value by which to step through the range of values specified for each parameter of the subset of parameters; and receive, from the input device, indications of the value by which to step through the range of values for each parameter of the subset of parameters.

The at least one processor may be caused to, in response to receiving the command to generate the set of variants, and for each variant of the set of variants, derive at least one optimality value indicative of at least one optimality type of the variant. For each variant, the table may further include the at least one optimality value.

Providing the table portion of the GUI may further include the at least one processor performing operations including: present, on the display, visual prompts to guide the operator to either select a variant of the set of variants to become a new version of the experiment design, or return to the variants portion of the GUI to select another subset of parameters to be varied to generate another set of variants of the experiment design; and monitor the input device for a command to select a variant of the set of variants to become the new version of the experiment design, or for a command to return to the variants portion of the GUI.

A computer-implemented method includes receiving, by at least one processor, and from an input device communicatively coupled to the at least one processor, an indication of a selection of an experiment design from which a set of variants of the experiment design are to be generated, wherein: the experiment design is associated with a model of a system under evaluation; the model comprises a set of terms as inputs to the model, and a set of responses as outputs from the model; and each term of the set of terms comprises at least one factor of a set of factors that are inputs to the system under evaluation. The method also includes receiving, by the at least one processor, and from the input device, indications of selections, from among a predefined set of parameters of the experiment design, of a subset of parameters of the experiment design that are to be varied to generate the set of variants, and providing, by the at least one processor, an estimation portion of a graphical user interface (GUI), wherein the method comprises performing operations including: presenting, by the at least one processor, and on a display communicatively coupled to the at least one processor, visual prompts to guide an operator through selecting, from among the set of terms, a first subset of terms to be estimated for each variant based on the model, and a second subset of terms to be estimated for each variant using Bayesian modification; monitoring, by the at least one processor, the input device for indications of selections of terms to be included in the first subset of terms, for indications of selections of terms to be included in the second subset of terms, or for an indication of receipt of a command to generate the set of variants; in response to each indication of a change in the terms currently included in the first subset of terms, determining, by the at least one processor, whether all of the terms currently included within the first subset are able to be estimated based on the model; in response to a determination that the first subset of terms includes a quantity of terms greater than is able to be estimated based on the model, presenting, by the at least one processor, and on the display, an indication that too many terms have been selected for estimation based on the model; or in response to a determination that the first subset of terms includes a quantity of terms less than is able to be estimated based on the model, presenting, by the at least one processor, and on the display, an indication that more terms are able to be selected for estimation based on the model. The method further includes, in response to receiving the command to generate the set of variants, performing operations including: generating, by the at least one processor, the set of variants based on the subset of parameters of the experiment design that are to be varied; for each variant, estimating, by the at least one processor, each term of the first subset of terms based on the model, and estimating, by the at least one processor, each term of the second subset of terms using Bayesian modification; and providing, by the at least one processor, a table portion of the GUI, wherein the method comprises performing operations comprising presenting, by the at least one processor, and on the display, a table, wherein, for each variant, the table comprises values of the subset of parameters of the experiment design that were used to generate the variant.

Presenting, on the display, an indication that too many terms have been selected for estimation based on the model may include performing operations including: reversing a most recent change in the terms currently included in the first subset of terms; and presenting, by the at least one processor, and on the display, an indication that the most recent change in the terms currently included in the first subset of terms has been reversed.

Providing the estimation portion of the GUI may further include performing operations including: presenting, by the at least one processor, and on the display, a list of at least first-order terms and second-order terms of the model; initially presenting, by the at least one processor, and on the display, and beside each first-order term of the list, an indication of the first-order term as selected to be estimated based on the model as a default; initially including all first-order terms of the model in the first subset of terms to cause all first-order terms of the model to be estimated based on the model as a default; for each first-order term of the list, monitoring, by the at least one processor, the input device for a change of the indication of being selected to be estimated based on the model to an indication of being selected to not be estimated; and in response to a change, for a first-order term of the list, of the indication of being selected to be estimated based on the model to an indication of being selected to not be estimated, removing the first-order term from the first subset of terms.

The performance of the estimation of each term of the second subset of terms using Bayesian modification may be conditioned on the second subset of terms comprising at least one term. Providing the estimation portion of the GUI may further include performing operations including: initially presenting, by the at least one processor, and on the display, and beside each second-order term of the list, an indication of the second-order term as not being selected to be estimated as a default; initially include no second-order terms of the model in either of the first subset of terms or the second subset of terms as a default, such that the second subset is initially an empty set; for at least one second-order term of the list, presenting, by the at least one processor, and on the display, an option to change the indication of not being selected to be estimated to an indication of being selected to be estimated using Bayesian modification; for each term of the list, monitoring, by the at least one processor, the input device for a change of the indication of not being selected to be estimated, or of the indication of being selected to be estimated based on the model, to an indication of being selected to be estimated using Bayesian modification; and in response to a change, for a term of the list, of the indication of not being selected to be estimated, or of the indication of being selected to be estimated based on the model, to an indication of being selected to be estimated using Bayesian modification, including the term in the second subset of terms.

The performance of the estimation of each term of the second subset of terms using Bayesian modification may be conditioned on the second subset of terms comprising at least one term. Providing the estimation portion of the GUI may further include performing operations including: initially presenting, by the at least one processor, and on the display, and beside each second-order term of the list, an indication of the second-order term as being selected to be estimated using Bayesian modification as a default; initially including all second-order terms of the model in the second subset of terms as a default; for at least one second-order term of the list, presenting, by the at least one processor, and on the display, an option to change the indication of being selected to be estimated using Bayesian modification to either an indication of being selected to not be estimated or an indication of being selected to be estimated based on the model; for each term of the list, monitoring, by the at least one processor, the input device for a change of the indication of not being selected to be estimated to either an indication of being selected to not be estimated or an indication of being selected to be estimated based on the model; and in response to a change, for a term of the list, of the indication of being selected to be estimated using Bayesian modification to an indication of being selected to not be estimated, removing the term from the second subset of terms. Providing the estimation portion of the GUI may still further include, in response to a change, for a term of the list, of the indication of being selected to be estimated using Bayesian modification to an indication of being selected to be estimated based on the model, performing operations including: determining, by the at least one processor, whether adding the term to the first subset of terms would cause the first subset of terms to include a quantity of terms greater than is able to be estimated based on the model; in response to a determination that the first subset of terms would include a quantity of terms greater than is able to be estimated based on the model, presenting, by the at least one processor, and on the display, an indication that the change results in too many terms to be estimated using the model; and in response to a determination that the first subset of terms would not include a quantity of terms greater than is able to be estimated based on the model, removing the term from the second subset of terms, and add the term to the first subset of terms.

Providing the estimation portion of the GUI may further include performing operations including: determining, by the at least one processor, a quantity of second-order terms that are able to be estimated based on the model in addition to all of the first-order terms; initially presenting, by the at least one processor, and on the display, and beside each second-order term of the quantity of second-order terms of the list, an indication of each second-order term of the quantity of second-order terms as selected to be estimated based on the model as a default; initially including each second-order term of the quantity of second-order terms of the model in the first subset of terms to cause each second-order term of the quantity of second-order terms of the model to be estimated based on the model as a default; for at least one first-order term of the list, presenting, by the at least one processor, and on the display, an option to change the indication of being selected to be estimated based on the model to an indication of being selected to not be estimated; and for each first-order term of the list, monitoring, by the at least one processor, the input device for a change of the indication of being selected to be estimated based on the model to an indication of being selected to not be estimated. Providing the estimation portion of the GUI may still further include, in response to a change, for a first-order term of the list, of the indication of being selected to be estimated based on the model to an indication of being selected to not be estimated, performing operations including: removing the first-order term from the first subset of terms; presenting, by the at least one processor, and on the display and beside another second-order term of the second-order terms of the list, an indication of the other second-order term as being selected to be estimated using the model; and including the other second-order term in the first subset of terms.

The method may further include providing, by the at least one processor, a variants portion of the GUI, wherein the method comprises performing operations including: presenting, by the at least one processor, and on the display, visual prompts to guide the operator through selecting, from among the predefined set of parameters of the experiment design, the subset of parameters that are to be varied to generate the set of variants; presenting, by the at least one processor, and on the display, visual prompts to guide the operator through specifying a range of values for each parameter of the subset of parameters; and receiving, by the at least one processor, and from the input device, indications of the range of values for each parameter of the subset of parameters.

Providing the variants portion of the GUI may further include performing operations including: presenting, by the at least one processor, and on the display, visual prompts to guide the operator through specifying a value by which to step through the range of values specified for each parameter of the subset of parameters; and receiving, by the at least one processor, and from the input device, indications of the value by which to step through the range of values for each parameter of the subset of parameters.

The method may include, in response to receiving the command to generate the set of variants, and for each variant of the set of variants, deriving, by the at least one processor, at least one optimality value indicative of at least one optimality type of the variant. For each variant, the table may further include the at least one optimality value.

Providing the table portion of the GUI may further include performing operations including: presenting, by the at least one processor, and on the display, visual prompts to guide the operator to either select a variant of the set of variants to become a new version of the experiment design, or return to the variants portion of the GUI to select another subset of parameters to be varied to generate another set of variants of the experiment design; and monitoring, by the at least one processor, the input device for a command to select a variant of the set of variants to become the new version of the experiment design, or for a command to return to the variants portion of the GUI.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 7A and 7B each illustrate an example embodiment of a distributed processing system.

FIG. 8 illustrates an overview of an example of guided and partially automated generation, refinement, comparison, selection, regression analysis, and/or use of experiment design(s).

FIGS. 10A, 10B, 10C and 10D, together, illustrate additional details of the generation and/or refinement of experiment design(s) of FIG. 9B.

FIGS. 15A and 15B, together illustrate an example embodiment of a logic flow of guiding generation, analysis and visual presentation of a set of variants from a single experiment design.

DETAILED DESCRIPTION

Figure 1:
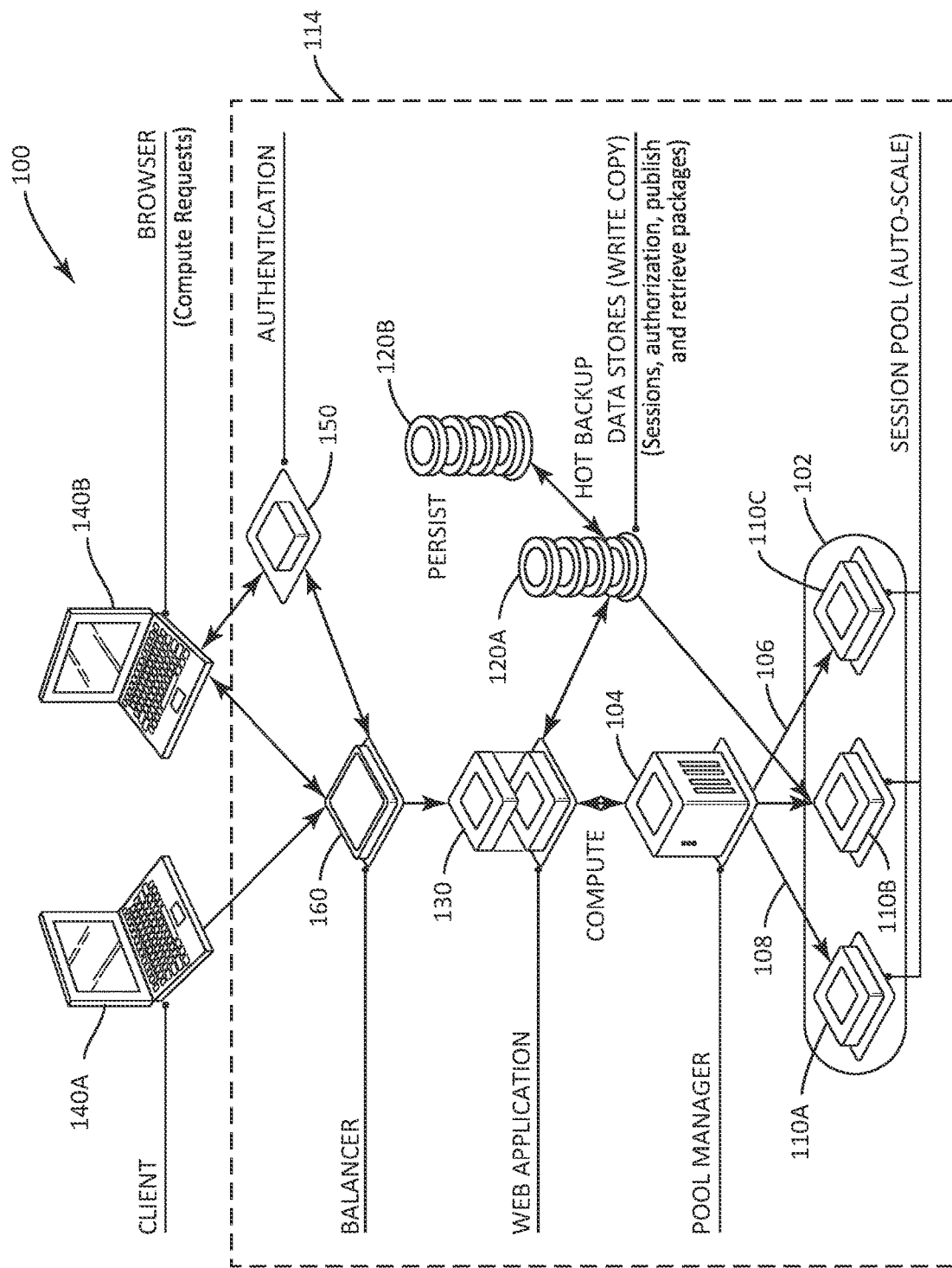
FIG. 1 illustrates an example network including an example set of devices communicating with each other according to some embodiments of present technology.

Various embodiments described herein are generally directed to techniques for guiding and automating various aspects of the generation, refinement, analysis and comparison of experiment designs to enable the selection of a single selected experiment design to be used in developing an understanding of linkage(s) between factor(s) and response(s) of a system being studied, and/or in developing an understanding of changes that may be made to one or more factors to bring about a desired change in one or more responses. More precisely, a set of generation tools and associated interactive graphical user interfaces (GUIs) are provided to generate one or more candidate experiment designs through guiding and partially automating the generation of an experiment design, along with variants thereof. In this way, a set of one or more candidate experiment designs may be derived from which a single experiment design may be selected for use through further analysis.

Where there are multiple candidate experiment designs, a set of analytical tools and associated additional interactive GUIs may also be provided to derive and present various comparisons and characterizations of the multiple candidate experiment designs to enable selection of the single selected experiment design. Such analytical tools may automatically identify matches between features, and the associated interactive GUIs may generate and present visualizations of various aspects of multiple candidate experiment designs in a manner that advantageously utilizes features of the human visual system (HVS). Such tools and associated GUIs may also aid in the generation of instructions for the distributed performance of regression analyses in which simulated data may be generated to refine aspects of a model associated with a candidate experiment design.

The variety of studied systems to which these techniques may be applied may include, and not limited to, chemical processes, sub-atomic particle interactions, biomechanical and/or biochemical systems, geological systems, meteorological systems, manufacturing systems, electrical and/or optical networks, group egress behaviors in response to fire emergencies in public spaces, etc. The impetus to apply these techniques may be the observation of one or more undesired responses of a studied system leading to a desire to identify the one or more factors of the studied system that are linked to those undesired response(s). Alternatively or additionally, the impetus may include the desire to derive changes to make to the identified factor(s) that may bring about more desirable responses from the studied system. However, as will be familiar to those skilled in the art, such systems are typically highly complex such that they defy efforts at understanding or addressing undesirable response(s) through intuitive ad hoc trial-and-error experimentation. By way of example, there may simply be too many factors and/or responses to consider, such that the quantity of observation data may be too large to make such unsystematic experimentation practical.

In a distributed processing system that may be employed to generate, refine, analyze, compare and/or perform experiment designs, one or more data devices may store a data set made up of observation data representing captured values of factors and corresponding responses of a studied system. In some embodiments, the one or more data devices may be co-located with and/or directly coupled to the studied system to capture such observation data (e.g., located at a facility to capture observation data from a chemical or manufacturing process that is performed there). In such embodiments, the one or more data devices may incorporate measuring device(s) that may directly capture observation data to thereby generate the stored data set. In other embodiments, the one or more data devices may be storage devices employed to store the data set and/or other information related to the studied system and/or to experiment designs that may be used in developing an understanding of the studied system. In such other embodiments, the one or more data devices may recurringly receive and aggregate observation data that may be captured and transmitted to the one or more data devices by one or more remotely located measuring devices (e.g., measuring devices distributed among medical facilities to capture biomechanical or biochemical data of patients undergoing treatment in a medical study).

A coordinating device of the distributed processing system may provide an interactive GUI by which an operator may generate a new experiment design through the manual input of parameters that define an experiment design and its associated model. More specifically, the coordinating device may provide a menu-based and/or step-wise guided definition GUI that enables an operator to specify aspects of an experiment design and associated model, including and not limited to, factors, ranges of values of continuous factors, levels of categorical factors, terms based on the factors, responses, identifiers given to factors and responses, initial coefficients, initial degree(s) of error, a quantity of runs, input values for the factors for use during the runs, etc. As will be explained in greater detail, such a manually entered experiment design and associated model may be based on a set of constraints that are desired to be imposed on the performance of an experiment design, and may be employed as a reference against which one or more other experiment designs may be compared as part of enabling the selection of an experiment design to be performed.

Unfortunately, it has been found that operators who are relatively inexperienced in designing experiments often feel intimidated by the numerous parameters that need to be considered in defining an experiment design, even with such a definition GUI to guide them. More specifically, the initial efforts made by such inexperienced operators often entail simply copying the choice of associated models and parameters of an experiment design that others have used in performing similar or related experiments, and making little or no changes beyond what may be necessitated by one or more particular constraints that are unique to their situation. As a result, despite having gone through some of the motions of designing an experiment with the assistance of such a definition GUI, the result often still resembles more of an ad hoc effort than designing an experiment.

In the case of more experienced operators, such a definition GUI guiding them through the provision of parameters to define an experiment design may be beneficial in preventing mistakes, such as forgetting to consider a parameter. However, it has been found that such experienced operators may find it tedious and undesirably time consuming to repeatedly use the definition GUI to provide the parameters for each experiment design that they are considering. As those skilled in the art will readily recognize, it is often the case that many of the experiment designs that are being considered may be slight variations of one another. More specifically, it may be that multiple ones of such experiment designs differ from each other by just incremental changes in a relatively limited number of parameters as part of an effort to achieve some degree of refinement as part of selecting the experiment design to be used. In such a situation, an experienced operator may be required to consume an undesirable amount of time repeatedly entering many parameter values that do not change across such variants, again and again, as part of using such a definition GUI to define each variant.

To address such issues, the coordinating device may provide another interactive GUI that enables multiple variants of a single experiment design to be automatically generated by specifying what particular parameters are to be varied across the multiple variants, along with details of how those particular parameters are to be varied. In addition to the automated generation of those multiple variants based on such information, a relatively limited set of analyses may also be performed on each of the variants. Further, following such automated generation and analyses of multiple variants, such a variants GUI may present those multiple variants and the results of those analyses in the form of a table.

In addition to presenting the results of the limited set of analyses performed on each variant, such a table may be limited to presenting just the relatively few parameters that vary across the multiple variants. Not including unchanging parameter values takes advantage of the substantial similarities among the multiple variants to enable the presentation of a simpler table (i.e., a table of fewer rows or columns) that can be more readily comprehended by an operator.

In some embodiments, such a variants GUI may provide the ability to highlight, sort, group and/or filter out rows of the table based on the values of a selected one of the presented parameters or analysis results. This may aid the operator in identifying variants that exhibit more desirable characteristics, thereby aiding the operator in identifying what values for what parameters result in at least a tendency toward achieving more desirable characteristics.

In some embodiments, such a variants GUI may include the provision of a bar graph for each column of values that each depict the distribution of the various values within its corresponding column. The ability may be provided to highlight, sort, group and/or filter out rows of the table based on an operator using an input device to select one or more of the bars within one or more of such per-column bar graphs, thereby providing another aid to the operator in identifying variants that exhibit more desirable characteristics, and thereby aiding the operator in identifying what values for what parameters result in at least a tendency toward achieving more desirable characteristics.

In some embodiments, the results of the limited set of analyses performed on each variant may be presented in a comparative form in which one of the variants serves as a reference variant, and the results of the analyses for each of the other variants is presented as a level of difference from the corresponding results for the reference variant. Such a variants GUI may provide the ability to designate any one of the variants as the reference variant, and to change that designation as often as desired, thereby aiding the operator in quickly making numerous comparisons of results among the variants to identify one or more variants having more desirable characteristics. As each such change in the designation of reference variant is made, the results of the limited set of analyses performed on each of the multiple variants may be automatically recalculated to reflect that change.

In some embodiments, such a variants GUI may also provide the ability to display one or more graphs providing a visual representation of one or more of the analysis results associated with a variant. By way of example where the variants GUI supports the use of a pointing device, it may be that causing a graphical pointer to be positioned to overlie a portion of the table associated with a particular variant (i.e., a row or column associated with the particular variant) causes a one or more graphs to be automatically visually presented within a "popup" window or other portion of the variants GUI.

The coordinating device may provide still another interactive GUI by which an operator may be guided through various comparisons of aspects of two or more candidate experiment designs (in situations in which there are multiple candidate designs) to guide the operator in selecting one of the candidate experiment designs to become the single experiment design that is selected to be used. The operator may be visually guided, via such a comparison GUI, through providing various parameters for use in performing the comparisons, including and not limited to, selections of two or more candidate experiment designs to be compared, corrections to one or more automatically derived matches between factors and/or terms of the compared experiment designs, selections of terms and/or responses to be included in the comparisons, signal-to-noise ratios that the selected terms are expected to be subject to, and/or degree(s) of error that the selected terms are expected to be subject to.

During and/or following the provision of such parameters, the operator may be visually presented, via the comparison GUI, with various graphs and/or other visualizations depicting comparisons between aspects of each of the candidate experiment designs. In so doing, graphs and/or other visualizations depicting corresponding aspects of different ones of the candidate experiment designs may be presented at adjacent locations on a display in a manner that advantageously utilizes features of the HVS to enable speedy recognition of degrees of similarity therebetween. More specifically, such graphs and/or other visualizations may be positioned adjacent to each other in a horizontal side-by-side manner that utilizes the generally horizontal binocular placement of the eyes that imparts the typical "landscape" orientation to the field of view (FOV) of the HVS. Such visual presentations may be interactive in nature such that depicted numerical values in such visual presentations are dynamically re-derived in response to each new input by an operator to select, specify and/or change a parameter.

The coordinating device may provide yet another interactive GUI by which an operator may be presented with aspects of the manner in which simulated data may be randomly generated during a regression analysis to determine one or more aspects of the model associated with the selected experiment design, such as coefficients and/or statistical power. The operator may be visually guided, via such a regression GUI, through providing various parameters for use in the regression analysis, including and not limited to, values for one or more coefficients and/or changes thereto, degree(s) of difficulty in varying levels of one or more factors, degree(s) of error that one or more terms are expected to be subject to and/or changes thereto, selection of a type of distribution of simulated data to be randomly generated, and/or a number of iterations to perform of the regression analysis and accompanying generation of simulated data.

During and/or following the provision of such parameters, the coordinating device may generate and/or repeatedly regenerate instructions that are executable by one or more processors and/or processor cores to perform the regression analysis and accompanying generation of simulated data. Following such generation or regeneration, the operator may be visually presented, via the regression GUI, with a human readable form of a portion of the executable instructions that includes the presentation of the model in the form of a formula that includes the coefficients and terms, as well as human readable expressions of aspects of randomly generating the simulated data. In situations in which different degrees of difficulty in varying the levels of one or more factors have been specified, such that a split-plot or split-split-plot configuration is thereby specified, the formula visually presented by the regression GUI may include portions separated by bracketing that separately specify the factors for which the varying the levels is more difficult, as well as explicit expressions of the manner in which the varying of levels for those factors are to be minimized (such that the quantity of transitions between levels are minimized for those factors) during generation of the simulated data.

In some embodiments, the definition GUI, the variants GUI, the comparison GUI and/or the regression GUI may be visually presented on a display incorporated into or otherwise connected to the coordinating device. Also, one or more input devices, such as a keyboard and/or pointing device, may be monitored for receive inputs from an operator in response to prompting by one or more of these GUIs, where the one or more input devices may also be incorporated into or otherwise connected to the coordinating device. However, in other embodiments, the display and/or the one or more input devices may be incorporated into and/or otherwise connected to a separate viewing device of the distributed system.

In some embodiments, the distributed processing system may incorporate a grid of node devices among which the specified iterations of performances of the regression analysis and associated generation of simulated data may be distributed. More precisely, the coordinating device may distribute the executable instructions for performing the regression analysis, including the random generation of simulated data, among such a grid of node devices. The coordinating device may then coordinate an at least partially parallel performance of the iterations of the regression analysis by the grid of node devices, and aggregate the results thereof. In other embodiments, the coordinating device may, itself, incorporate one or more processors and/or processor cores among which the executable instructions for performing the regression analysis, including the random generation of simulated data, may be distributed. Following such distribution, the coordinating device may then coordinate an at least partially parallel performance of the iterations of the regression analysis by those processors and/or processor cores.

In some embodiments, following the performance of the regression analysis and accompanying generation of simulated data, the distributed processing system may directly perform the selected experiment design. As previously discussed, it may be that the one or more data devices may be co-located with the studied system. In some of such embodiments, the one or more data devices may control the studied system, and therefore, may be capable of actually performing the selected experiment design by directly varying factors and capturing the resulting responses. In some of such embodiments, the coordinating device may transmit a design profile and/or other information to the one or more data devices as part of enabling the one or more data devices to perform the experiment design with the studied system.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth or a Bluetooth Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure system on demand. As another example, one or more client devices may utilize an Internet of Things (IoT) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IoT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation). The network devices may detect and record data related to the environment that it monitors, and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a standpipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments includes a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it, and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool manager may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager 104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manger 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, backup pool manager may not control any portion of the project. Instead, backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server.

While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool manager may be stored in a list of backup pool manager to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined, or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool manager will take over for failed primary pool manager 104 and become the new primary pool manager. For example, the new primary pool manager may be chosen based on a ranking or "hierarchy" of backup pool manager based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
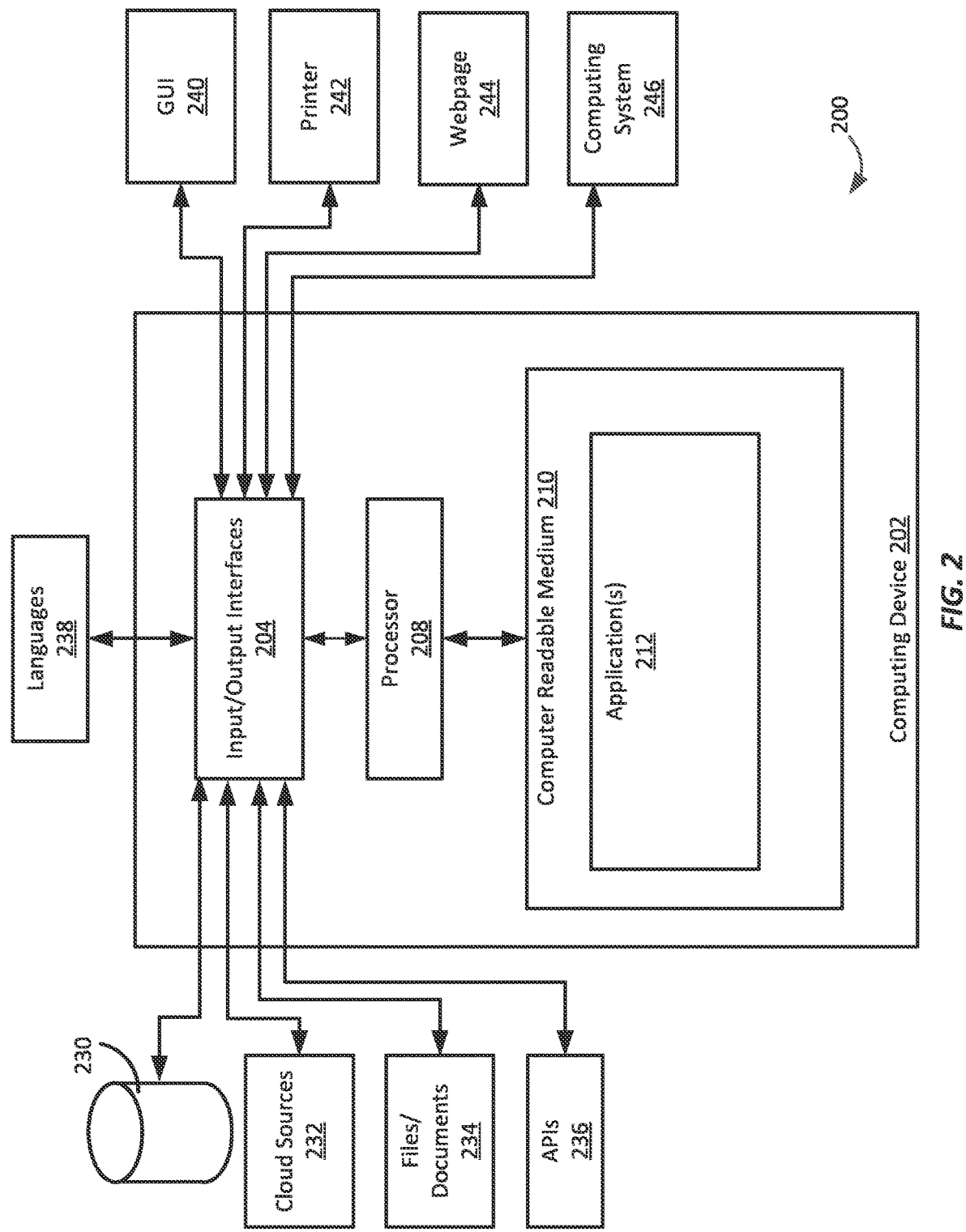
FIG. 2 illustrates a block diagram that provides an illustration of the hardware components of a computing system, according to some embodiments of present technology.

While each device in FIG. 1 is shown as a single device, it will be appreciated that multiple devices may instead be used. FIG. 2 shows an example computing structure for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission. Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
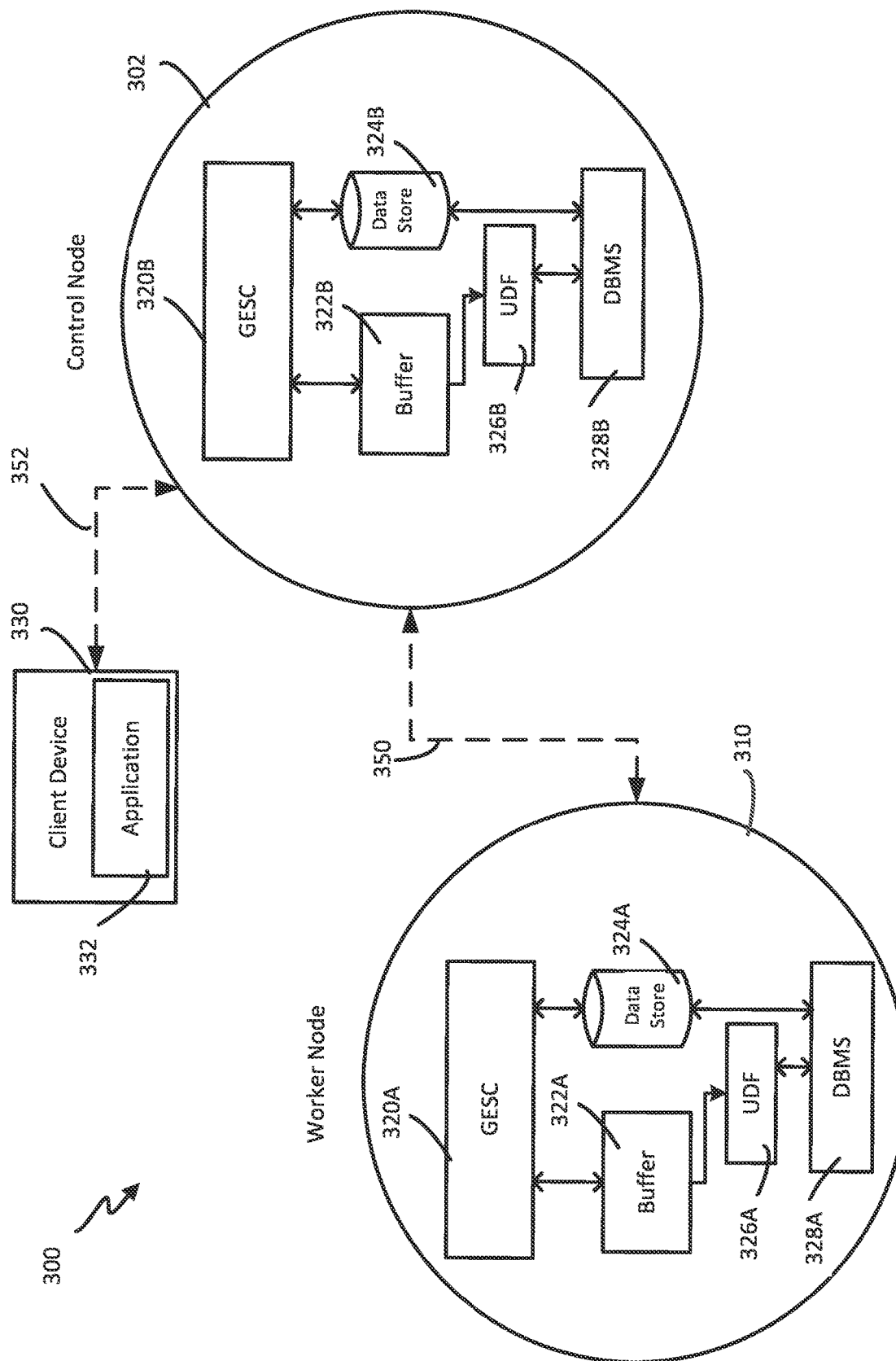
FIG. 3 illustrates a communications grid computing system including a variety of control and worker nodes, according to some embodiments of present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control node. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node on the pool.

Figure 4:
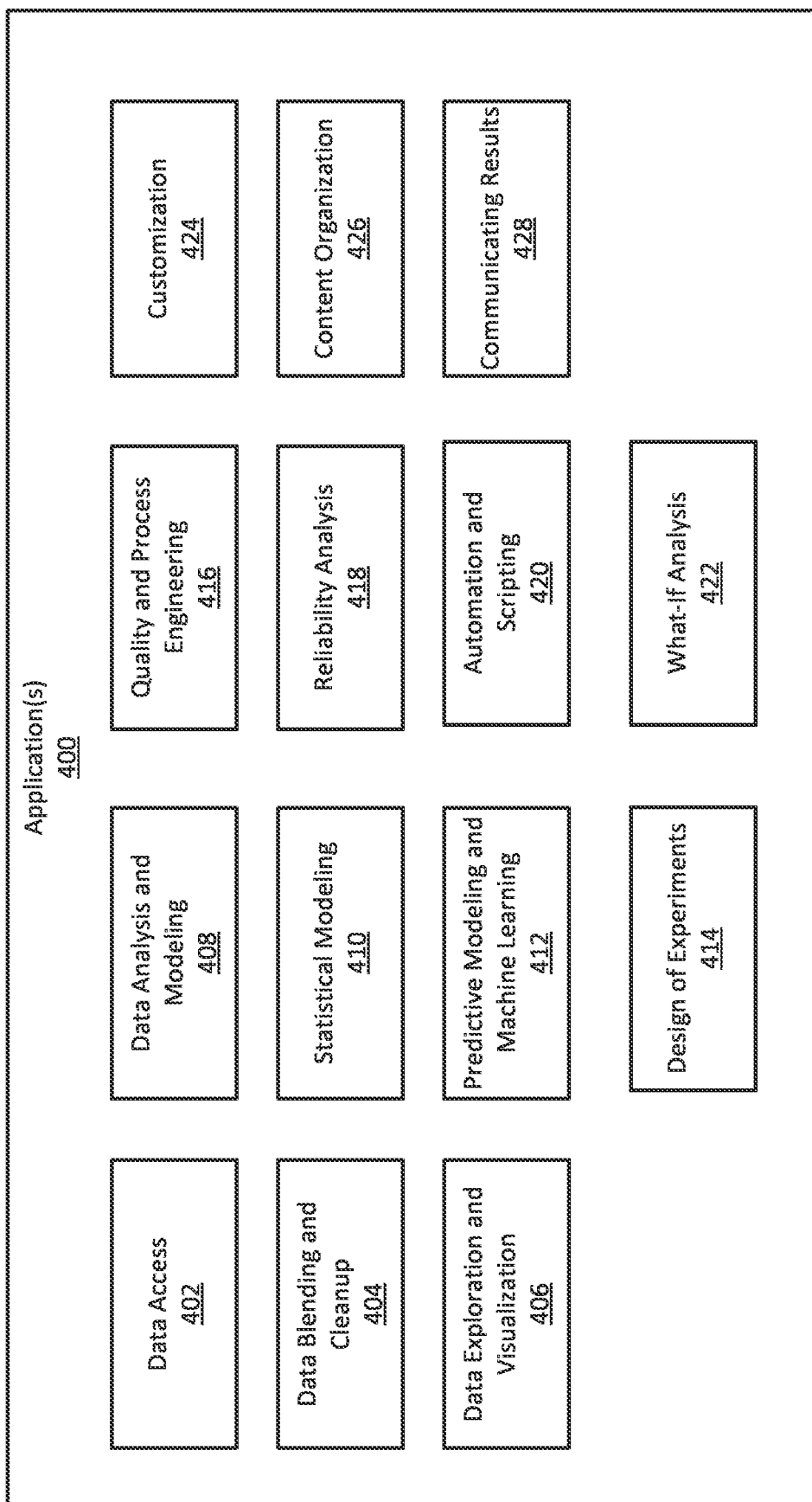
FIG. 4 illustrates application(s) for performing data normalization, visualization and/or analysis task(s)/operation(s), according to some embodiments of present technology.

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can included statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select a best model). Machine learning methods can be used by the user without having to write code and tune algorithms. Examples of machine learning techniques are described in more detail with respect to FIGS. 5 and 6).

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, Python® and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
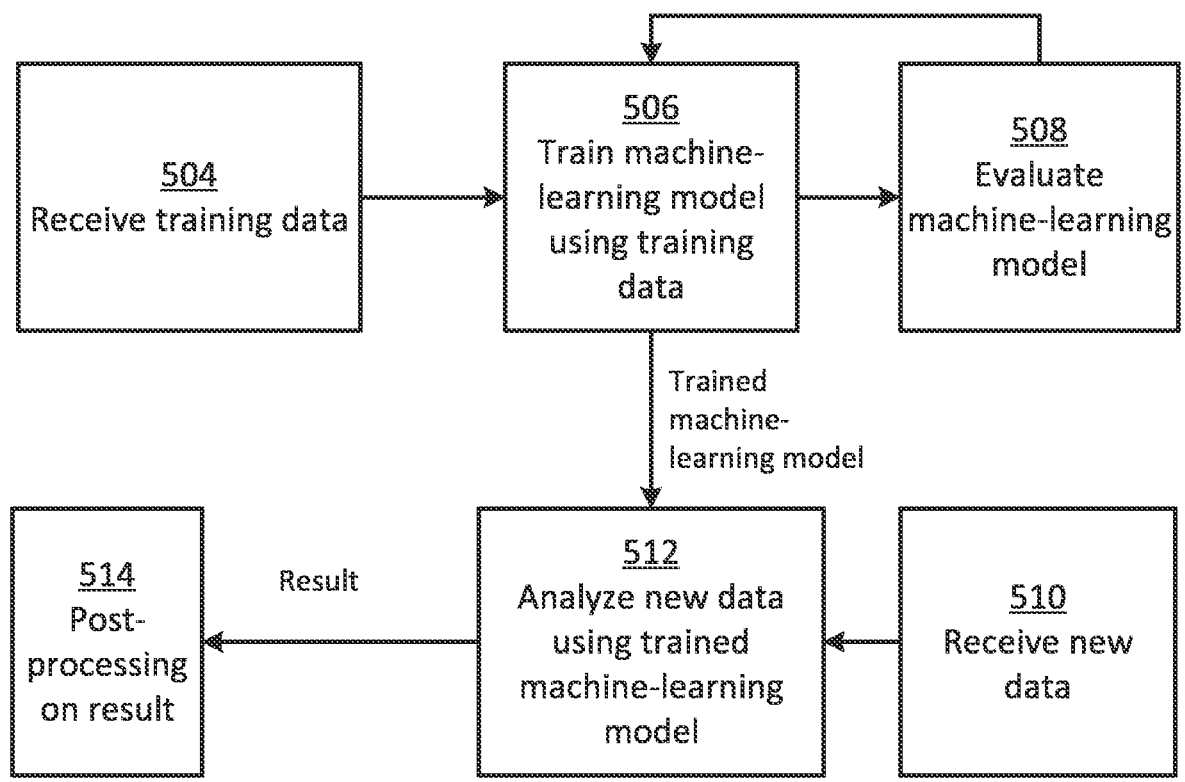
FIG. 5 illustrates a flow chart of an example process of generating and using a machine-learning model according to some aspects.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
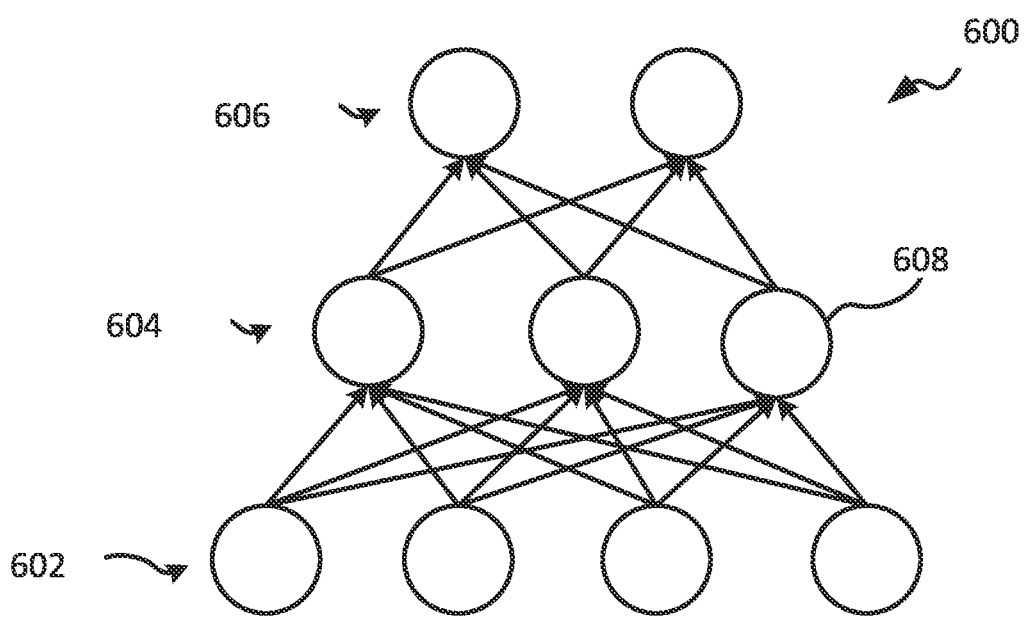
FIG. 6 illustrates an example machine-learning model based on a neural network.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, chip-level thermal processing considerations, processing speed improvements, data communication speed improvements, and/or data efficiency targets and improvements throughout various parts of the system when compared to a homogeneous computing architecture that employs CPUs for general purpose computing.

Figure 7A:
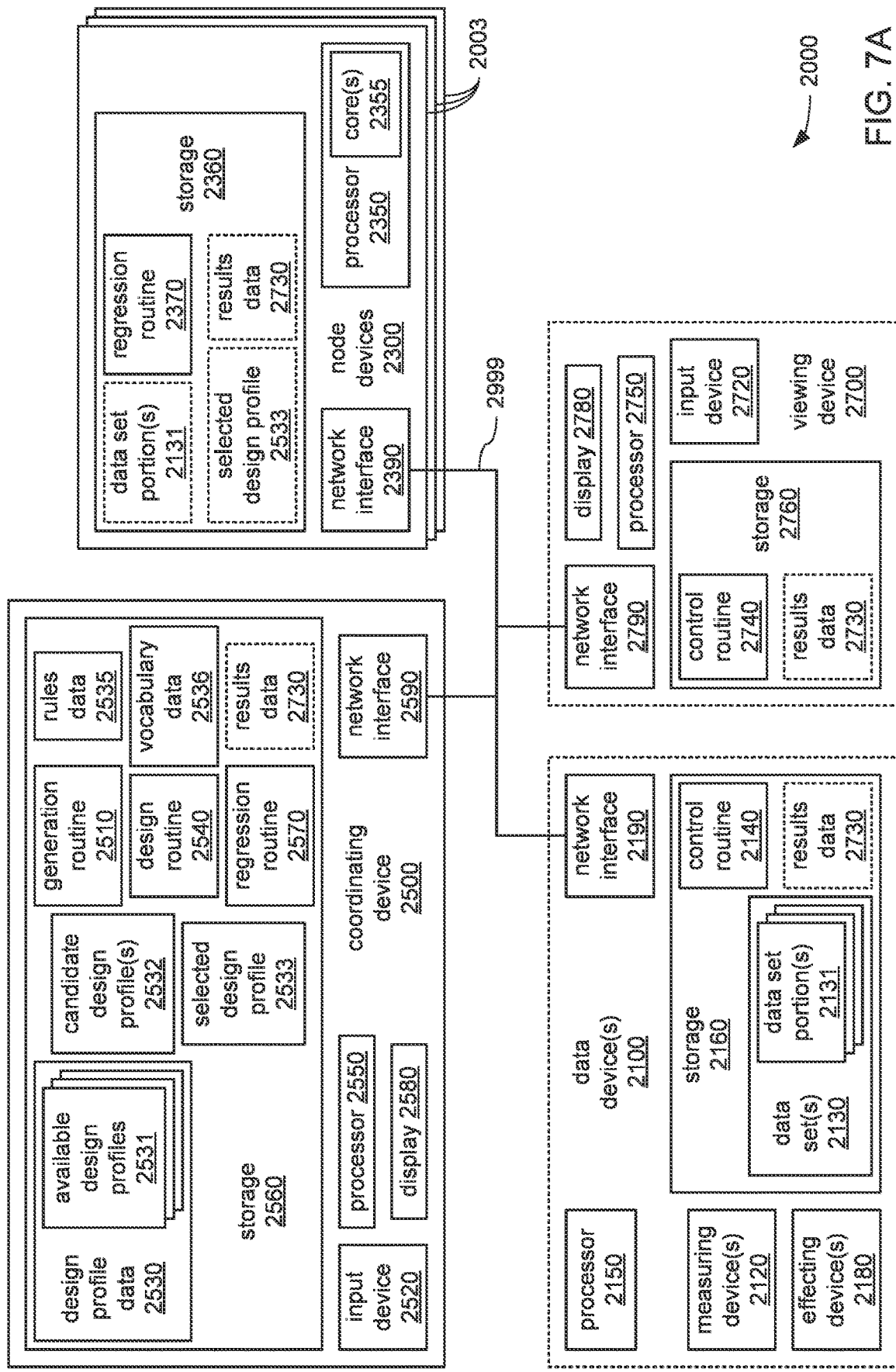

FIG. 7A illustrates a block diagram of an example embodiment of a distributed processing system 2000 incorporating one or more data devices 2100, one or more node devices 2300 that form of a device grid 2003, a coordinating device 2500 and/or a viewing device 2700 coupled by a network 2999. FIG. 7B illustrates a block diagram of an alternate example embodiment of the distributed processing system 2000 in which the coordinating device 2500 may perform the functions of the device grid 2003. In both of the embodiments of FIGS. 7A and 7B, the coordinating device 2500 may provide various GUIs by which an operator may be guided through defining a new experiment design, generating variants of an experiment design, comparing multiple candidate experiment designs, selecting an experiment design from among the candidate experiment designs, performing a regression analysis of the selected experiment design, and/or performing the selected experiment design. In various embodiments, the provision of such GUIs may be directly by the coordinating device 2500 or through the viewing device 2700. In various embodiments, the regression analysis (including the generation of simulated data) may be performed by the device grid 2003 or by multiple processors and/or processor cores of the coordinating device 2500. In some embodiments, the one or more data devices 2500 may directly perform the selected experiment design with the studied system.

In support of such operations, the devices 2100, 2300, 2500 and/or 2700 may exchange one or more design profiles and/or other data concerning one or more experiment designs via the network 2999. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the data devices 2100 may incorporate one or more of a processor 2150, a storage 2160, measuring device(s) 2120, effecting device(s) 2180, and a network interface 2190 to couple each of the data devices 2100 to the network 2999. The storage 2160 may store a control routine 2140, one or more data sets 2130 and/or results data 2730. The control routine 2140 may incorporate a sequence of instructions operative on the processor 2150 of each of the data devices 2100 to implement logic to perform various functions, at least partially in parallel with the processors 2150 of others of the data devices 2100. In executing the control routine 2140, the processor 2150 of each of the data devices 2100 may operate the network interface 2190 thereof to receive items of observation data captured by other devices (not shown) via the network 2999, and may store such items of observation data as one or more of the data sets 2130. Such other devices may include sensors or other forms of measuring device that monitor an aspect of a system under study, and may each transmit captured items of observation data to the one or more data devices 2100 for aggregation and/or storage. Alternatively or additionally, the processor 2150 of each of the data devices 2100 may operate one or more of the measuring devices 2120 that may be incorporated into one or more of the data devices 2100 to more directly capture such items of observation data, and may store such items of observation data as one or more of the data sets 2130.

Each of the measuring devices 2120 that may be incorporated into the one or more data devices 2100, and/or each remote device from which the one or more data devices 2100 may receive captured observation data via the network 2999, may be any of a variety of types of sensor or other data collecting device. Such sensors or other data collection devices may include, and are not limited to, any of a variety of physical and/or chemical sensors that measure aspects of a manufacturing or chemical process; any of a variety of electrical and/or optical energy sensors that measure aspects of transmission and/or reception of electrical and/or optical signals; any of a variety of manual input devices that accept manually entered observations made by personnel; etc. In embodiments in which the one or more data devices 2100 are involved in controlling the studied system such that the one or more data devices 2100 may incorporate one or more of the effecting devices 2180, each of the effecting devices 2180 may be any of a variety of types of controllable output device by which the one or more data devices 2100 may control one or more factors of the studied system. Such controllable output devices may include, and are not limited to, robotic end effectors to manipulate objects (e.g., grips, motors, solenoids, etc.), pumps and/or valves to selectively introduce chemical compounds, electrical and/or optical signal output devices, heaters and/or coolers, vibratory and/or acoustic output devices, radio frequency and/or magnetic emission devices, etc.

Each of the one or more data sets 2130 may include any of a wide variety of types of observation data concerning a studied system, including and not limited to, times, dates and/or locations of operation or use of the studied system; indications of aspects about the studied system that may differentiate the particular studied system from other similar studied systems; and/or captured observations of factors that are inputs to the studied system and responses that are outputs of the studied system. Each of the data sets 2130 may be divided into multiple data set portions 2131 that may each include captured observation data that may be so divided by times, dates and/or locations at which the items of observation data therein were captured. Alternatively or additionally, each of the data sets 2130 may be divided into multiple data set portions 2131 based on random samples taken of items of observation data therefrom to provide smaller, yet statistically representative, portions of each of the data sets 2130 that may be used in as an input to the guidance provided by the coordinating device 2500 in selecting an experiment design and/or in performing a regression test of a selected experiment design.

The studied system may be any of a variety of systems, including and not limited to, chemical processes, sub-atomic particle interactions, biomechanical and/or biochemical systems, geological systems, meteorological systems, manufacturing systems, electrical and/or optical networks, group egress behaviors in response to fire emergencies in public spaces, etc. The impetus to apply these techniques may be the observation of undesired responses of a studied system leading to a desire to identify the one or more factors of the studied system that are linked to those undesired responses. Alternatively or additionally, the impetus may include the desire to derive changes to make to the identified factors that may bring about more desirable responses from the studied system.

Each data set 2130 may be stored as one or more data files, and/or as one or more instances of at least one other type of data structure, in a distributed manner among multiple ones of the data devices 2100. Such distributed storage of a data set 2130 may be carried out to provide redundancy in its storage as a protection against data loss arising from a malfunction or other events associated with one or more of the data devices 2100. Alternatively or additionally, in embodiments in which a data set 2130 is of considerably large size, such distributed storage of a data set 2130 may be carried out to improve the speed and efficiency with which it is able to be accessed and/or exchanged with other devices, including with the coordination device 2500 and/or the multiple node devices 2300 of the node device grid 2003. Indeed, a data set 2130 may be sufficiently large that there may be no single storage device available that has sufficient storage and/or throughput capacity.

In various embodiments, the viewing device 2700 incorporates one or more of a processor 2750, a storage 2760, an input device 2720, a display 2780, and a network interface 2790 to couple the viewing device 2700 to the network 2999. The storage 2760 may store one or both of a control routine 2740 and the results data 2730. The control routine 2740 may incorporate a sequence of instructions operative on the processor 2750 to implement logic to perform various functions. The processor 2750 may be caused by its execution of the control routine 2740 to operate the input device 2720, the display 2780 and/or the network interface 2790 in a manner that causes the viewing device 2700 to enable the coordinating device to remotely provide various GUIs. Alternatively or additionally, the processor 2780 may be caused to operate the network interface 2790 to receive the results data 2730 providing results of a regression analysis of a selected experiment design, may be caused to generate a visualization based on the results data 2730, and/or may be caused to operate the display 2780 to present the visualization on the display 2780.

Turning more specifically to FIG. 7A, each of the node devices 2300 may incorporate one or more of a processor 2350, a storage 2360 and a network interface 2390 to couple each of the node devices 2300 to the network 2999. The processor 2350 of each of the node devices 2300 may incorporate one or more processing cores 2355. The storage 2360 may store one or more of a regression routine 2370, a selected design profile 2531s, data set portion(s) 2131 and/or the results data 2730. Within each of the multiple node devices 2300, the regression routine 2370 may incorporate a sequence of instructions operative on the processor 2350 to implement logic to perform various functions. The processor 2350 of each of the node devices 2300 may be caused by its execution of the regression routine 2370 to operate the network interface 2390 to receive the selected design profile 2531s from the coordinating device 2500 and/or to receive at least one of the data set portions 2131 from the one or more data devices 2100. The processor 2350 of each of the node devices 2300 may then employ the observation data of the studied system within the at least one data set portion 2131 and/or the information about a selected experiment design within the selected design profile 2531s to perform a regression analysis with the selected experiment design under the control of the coordinating device 2500. In so doing, the processor 2350 of one or more of the node devices 2300 may generate at least a portion of the results data 2730 providing an indication of the results of the regression analysis, and may operate the network interface 2390 to transmit the results data 2730 to the coordinating device 2500 and/or the viewing device 2700.

In various embodiments, the coordinating device 2500 may incorporate a processor 2550, a storage 2560, an input device 2520, a display 2580, and a network interface 2590 to couple the coordinating device 2500 to the network 2999. The storage 2560 may store one or more of a generation routine 2510, a design routine 2540, a regression routine 2570, design profile data 2530 that includes one or more available design profiles 2531a, one or more candidate design profiles 2531c, the selected design profile 2531s, vocabulary data 2533, rules data 2535 and the results data 2730. Each of the generation routine 2510, the design routine 2540 and the regression routine 2570 may incorporate a sequence of instructions operative on the processor 2550 to implement logic to perform various functions.

In executing the generation routine 2510, the processor 2550 may be caused to operate the input device 2520 and/or the display 2580 to locally provide a generation GUI that may include a definition GUI to guide an operator through providing parameters to define an experiment design and associated model, and a variants GUI to guide an operator through generation and evaluation of variants of an experiment design. An experiment design that is so defined via the definition GUI and/or variant(s) thereof that are so generated via the variants GUI may be stored within the design profile data 2530 as one or more of the available design profiles 2531a. Alternatively, the processor 2550 may be caused by the generation routine 2510 to operate the network interface 2590 to remotely provide the generation GUI through the network 2999 and another device, such as the viewing device 2700.

Also, in executing the design routine 2540, the processor 2550 may be caused to similarly provide a comparison GUI, either locally or remotely, to guide an operator through providing parameters to perform various comparisons between two or more candidate experiment designs, and thereby guide the operator through the consideration of various aspects of the candidate experiment designs in selecting a single experiment design to be used. Further, in executing the regression routine 2570, the processor 2550 may be caused to provide a regression GUI, either locally or remotely, to guide an operator through providing parameters to control aspects of the performance of a regression analysis with the selected experiment design. In so doing, the processor 2550 may be caused to operate the network interface 2590 to distribute and coordinate the performance of the regression analysis among the multiple node devices 2300 through the distribution of the selected design profile 2531s thereamong, and may be caused to further operate the network interface 2590 to receive the results data 2730 indicating the results of the regression analysis.

Turning more specifically to FIG. 7B, as an alternative to the multiple node devices 2300 of the embodiment of the distributed processing system 2000 of FIG. 7A, an alternate embodiment of the coordinating device 2500 in the embodiment of the distributed processing system 2000 of FIG. 7B may additionally incorporate one or more of the processors 2350, and/or may incorporate the storage 2360. The storage 2360 may store one or more of the regression routine 2370, the selected design profile 2531s, one or more of the data set portion(s) 2131, and/or the results data 2730. In this alternate embodiment of the coordinating device 2500, each of the one or more processors 2350 may be a graphics processing unit (GPU) incorporating a relatively large quantity of the processing cores 2355 to take the place of the node device grid 2003 in the embodiment of the distributed processing system 2000 of FIG. 7A.

As will be familiar to those skilled in the art, there is an increasingly commonplace trend toward replacing grids of numerous separate computing devices with a single computing device equipped with a relatively small number of GPUs (e.g., under a dozen) to utilize the considerably higher degree of parallelism supported by their internal architectures, including what may be support for dozens, hundreds, thousands, or still greater quantities of threads of execution. Over time, the characteristics of the operations that need to be performed to more quickly render graphical images of ever high resolutions and color depths have encouraged the development of GPUs that incorporate numerous processing cores that each have relatively limited instruction sets, but which are able to perform those limited instructions in parallel across a relatively large number of threads. It has been found that, where at least a portion of an analysis is amenable to being performed using GPU(s), a considerable increase in speed of performance of such analyses and/or the elimination of the need for a whole grid of separate computing devices may be realized by doing so. Thus, the processor 2550 of the coordinating device may distribute the selected design profile 2531s and/or coordinate the provision of the one or more data set portions 2131 to the storages 2360 for access by the one or more processors 2350 to enable such a widely parallel performance of the regression analysis of a selected experiment design.

FIG. 8 illustrates an example of performing a combination of generating one or more experiment designs, comparing and selecting from among multiple candidate experiment designs, performing a regression analysis of a selected experiment design, and/or performing the selected experiment design. More specifically, FIG. 8 illustrates aspects of the manner in which the routines 2510, 2540, 2570 and/or 2370 may be executed cooperatively within embodiments of the distributed processing system 2000 of either of FIG. 7A or 7B to provide a series of GUIs 3100, 3400 and 3700 to visually guide such generation, comparison, selection and/or regression analysis of experiment designs to arrive at a selected experiment design for use in testing and/or understanding aspects of a studied system.

As recognizable to those skilled in the art, each of the control routine 2140, the regression routine 2370, the generation routine 2510, the design routine 2540 and the regression routine 2570, including the components of which each may be composed, are selected to be operative on whatever type of processor or processors that are selected to implement applicable ones of the processors 2150, 2350 and/or 2550. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 2150, 2350 and/or 2550. Where one or more device drivers are included, those device drivers may provide support for any of a variety of other components, whether hardware or software components, of the data devices 2100, the node devices 2300 and/or the coordinating device 2500.

As has been discussed, in executing the generation routine 2510, the processor 2550 of the coordinating device 2500 may be caused, either locally through the input device 2520 and/or the display 2580 of the coordinating device 2500, or remotely through the input device 2720 and/or the display 2780 of the viewing device 2700, to provide a generation GUI 3100. The generation GUI 3100 may include a definition GUI to guide an operator through providing parameters to define an experiment design and associated model, and/or a variants GUI to guide the operator through evaluating automatically generated variants of an experiment design. The processor 2550 may then be caused to store the definition of each of one or more generated experiment designs (including variants) and associated models as one of the generated design profiles 2531g of the design profile data 2530 stored within the storage 2560 of the coordinating device 2500.

The variants GUI may present the multiple variants that are automatically generated from a single experiment design in a table. Further, in addition to the automated generation of multiple variants, a relatively limited set of analyses may also be performed on each of the variants, and the results of those analyses may also be presented for each of those variants in the table. The variants GUI may provide the ability to sort the rows and/or columns of the table based on the values of a selected one of the presented parameters or analysis results, and/or may provide the ability to designate any one of the variants at any time as the reference variant to cause the analyses results of the other variants to be presented as levels of difference from the analysis results of the designated reference variant.

In executing the design routine 2540, the processor 2550 of the coordinating device 2500 may also be caused, either locally or remotely through the viewing device 2700, to similarly provide a comparison GUI 3400 to guide an operator through choosing one or more of the available experiment designs defined in corresponding ones of the available design profiles 2531 to become candidate experiment designs that are to be compared as part of selecting a single candidate experiment design to become the experiment design selected for use. As available experiment designs are so chosen, corresponding available design profiles 2531a within the design profile data 2530 may be made available to the design routine 2540 as candidate design profiles 2531c.

As will be explained in greater detail, following the selection of two or more candidate experiment designs to be so compared, the processor 2550 may be caused to perform an automated matching of factors and/or terms between the candidate experiment designs based on characteristics of the factors and/or the terms, and/or additionally based on the texts of identifiers assigned to each of the factors and/or terms. In so doing, the processor 2550 may be caused to employ various matching rules retrieved from the rules data 2535 and/or indications of known synonyms retrieved from the vocabulary data 2533.

Also in providing the comparison GUI 3400, the processor 2550 may be caused to guide the operator through providing parameters for the performance of the comparison, thereby guiding the operator through the consideration of various aspects of the candidate experiment designs in selecting a single one of the candidate experiment designs to be subjected to regression analysis and/or to be performed. In so doing, the processor 2550 may be caused to employ various templates retrieved from the rules data 2535 to generate and visually present various sets of graphs of corresponding aspects of the candidate experiment designs. One or more of the sets of graphs may advantageously exploit various features of the HVS to improve the ease and/or speed with which similarities and/or differences among the candidate experiment designs are able to be recognized, thereby speeding the selection of one of the candidate experiment designs.

In executing the regression routine 2570, the processor 2550 of the coordinating device 2500 may be caused, either locally or remotely through the viewing device 2700, to similarly provide a regression GUI 3700 to guide an operator through providing parameters to control aspects of the performance of a regression analysis with the selected experiment design. With one of the candidate experiment designs having been selected to become the selected experiment design, a single one of the candidate design profiles 2531c may be made available to the regression routine 2570 as a single selected design profile 2531s.

As an operator is so guided through providing parameters for various aspects of performing a regression analysis on the selected experiment profile, the processor 2550 may be caused by further execution of the regression routine 2570 to generate a sequence of instructions that are executable by the processors 2550 and/or 2350 to cause performance of the regression analysis, and may include such a sequence of instructions in the selected design profile 2531s (which may then be stored within the design profile data 2530). In so generating such executable instructions, the processor 2550 may be caused to employ various templates retrieved from the rules data 2535 to generate and visually present a human readable portion of the executable instructions for performing the regression analysis.

The processor 2550 may then be caused to operate the network interface 2590 to distribute the selected design profile 2531s and to coordinate the performance of the regression analysis among the multiple node devices 2300 (as discussed in reference to FIG. 7A), and may be caused to further operate the network interface 2590 to receive the results data 2730 indicating the results of the regression analysis. Alternatively, the processor 2550 may be caused to distribute the selected design profile 2531s and coordinate the performance of the regression analysis among multiple processing cores 2355 of one or more processors 2350 incorporated within the coordinating device 2500 (as discussed in reference to FIG. 7B). The one or more processors 2350, either within the node devices 2300 or within the coordinating device 2500, may then be caused by their execution of multiple instances of the regression routine 2370 at least partially in parallel to perform the regression analysis using simulated data and/or one or more of the data set portions 2131 of a data set 2130.

Following the performance of the regression analysis, the processor 2550 may be further caused to coordinate the presentation of the results data 2730 to the operator. Alternatively or additionally, the processor 2550 may be further caused to operate the network interface 2590 to transmit the selected design profile 2531s to the one or more data devices 2100 as part of coordinating the performance of the selected experiment design by the one or more data devices 2100 in embodiments in which the one or more data devices 2100 are capable of controlling the studied system. In such embodiments, each of the processors 2150 may be caused by execution of the control routine 2140 to vary one or more factors of the studied system in accordance with the selected experiment design, as indicated in the selected design profile 2531s, such that the one or more processors 2150 of the one or more data devices 2100 may actually perform the test(s) of the selected experiment design.

Figure 9A:
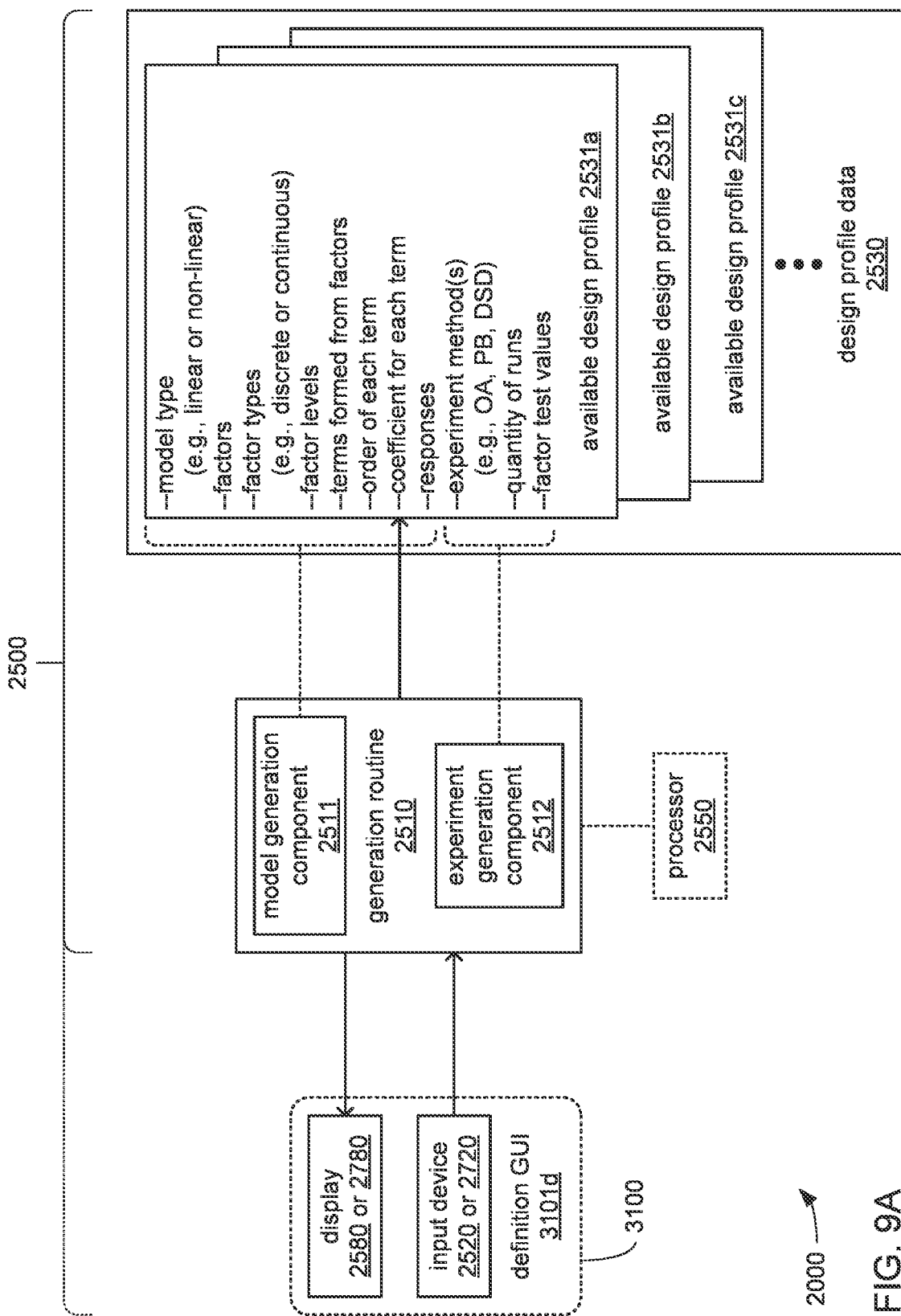
FIGS. 9A and 9B, together, illustrate an example of generation and/or refinement of experiment design(s).
Figure 9B:
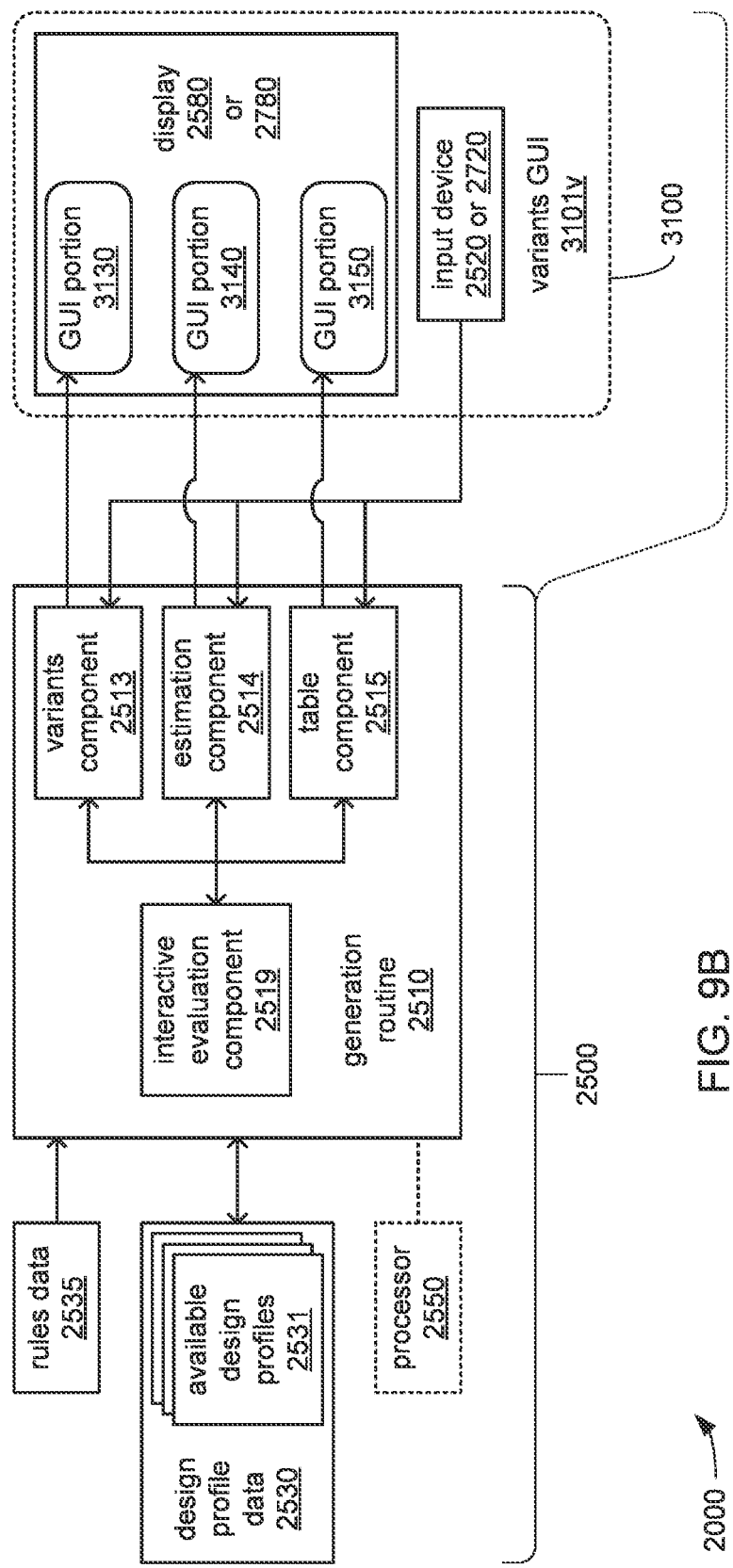

FIGS. 9A and 9B, together, depict aspects of an example of the provision of two parts of the generation GUI 3100, specifically a definition GUI 3101d to guide the generation of a new experiment design and associated model, and a variants GUI 3101v to guide the generation of variants thereof. Still more specifically, FIGS. 9A-B, together, depict aspects of the execution of portions of the generation routine 2510 by the processor 2550 of the coordinating device 2500 to provide the GUIs 3101d and 3101v. As depicted, the generation routine 2510 may include a model generation component 2511, an experiment generation component 2512, a variants component 2513, an estimation component 2514 and/or a table component 2515. As also depicted, the GUIs 3101d and 3101v may be provided either locally via the display 2580 and the input device 2520 of the coordinating device 2500, or remotely through the network 2999 and via the display 2780 and the input device 2720 of the viewing device 2700.

Turning to FIG. 9A, in executing the generation routine 2510, the processor 2550 may be caused by its execution of the model generation component 2511 to visually present one or more portions of the definition GUI 3101d to guide an operator through the provision of various parameters that define a new model of a studied system. By way or example, such portions of the definition GUI 3100d may include various menus, staged pop-up messages, a page-by-page "wizard" or other visual technique to prompt an operator to provide indications of such details of a new model as, and not limited to, the model type of the model (e.g., linear or non-linear), the factors and/or responses of the model, the factor type of each factor (e.g., continuous or categorical), the terms formed from the factors, the coefficients of the terms, the order of each factor (e.g., first order, second order, third order, etc.), and/or identifiers for the factors, terms and/or responses.

Also in executing the generation routine 2510, the processor 2550 may be caused by its execution of the experiment generation component 2512 to visually present one or more other portions of the definition GUI 3101d to guide an operator through the provision of various parameters that define a new experiment design associated with the new model, and for use in testing the studied system. By way or example, such other portions of the definition GUI 3101d may prompt the operator to provide indications of such details of a new associated experiment design as, and not limited to, the experiment design generation method used (e.g., orthogonal array, Placket-Burman design, definitive screening design, etc.), the quantity of runs to be performed, testing values for the factors, etc.

Following or during the provision of such parameters, the processor 2550 may be caused to store indications of such parameters and/or other information defining the model and associated experiment design as a new available design profile 2531 (e.g., the depicted example available design profile 2531a) within the design profile data 2530. Despite this description of the provision and use of the GUIs 3101d and 3101v to generate a new combination of experiment design and associated model that becomes a new available design profile 2531 in the design profile data 2530, it should be noted that embodiments are possible in which the design profile data 2530 may be provided to the distributed system 2000 with multiple available design profiles 2531 for multiple combinations of experiment designs and associated models already included, such that one may be selected and used without requiring the generation of a new experiment design and associated model.

As previously discussed, the parameters so provided may be at least partially based on one or more constraints desired to be imposed on whatever testing that may be performed on the studied system. By way of example, there may be budgetary, material supply and/or time constraints that limit the quantity of runs of any test that may be performed. As will shortly be explained, such generation of a new experiment design and associated model may be undertaken in order to have available an experiment design that embodies such constraints, and thus, can be used as a reference to which other experiment designs may be compared to determine whether exceeding one or more of such constraints may be justified by the benefits that may be realized.

Turning to FIG. 9B, also in executing the generation routine 2510, the processor 2550 may be caused to execute various ones of the components 2513, 2314 and/or 2315 to provide various GUI portions 3130, 3140 and/or 3150, respectively, to guide an operator through the provision of various inputs used to generate a set of variants of a single experiment design, and/or to guide an operator through an evaluation of such variants. The interactive evaluation component 2519 may be caused to be executed at least partially in parallel with the executions of one or more of the components 2513-2515 to enable recurring repetitions of the generation of differing sets of variants based on received changes to input parameters for such generation, and/or to enable recurring repetitions analyses and presentations of such sets of variants also based on changing inputs.

Figure 10A:
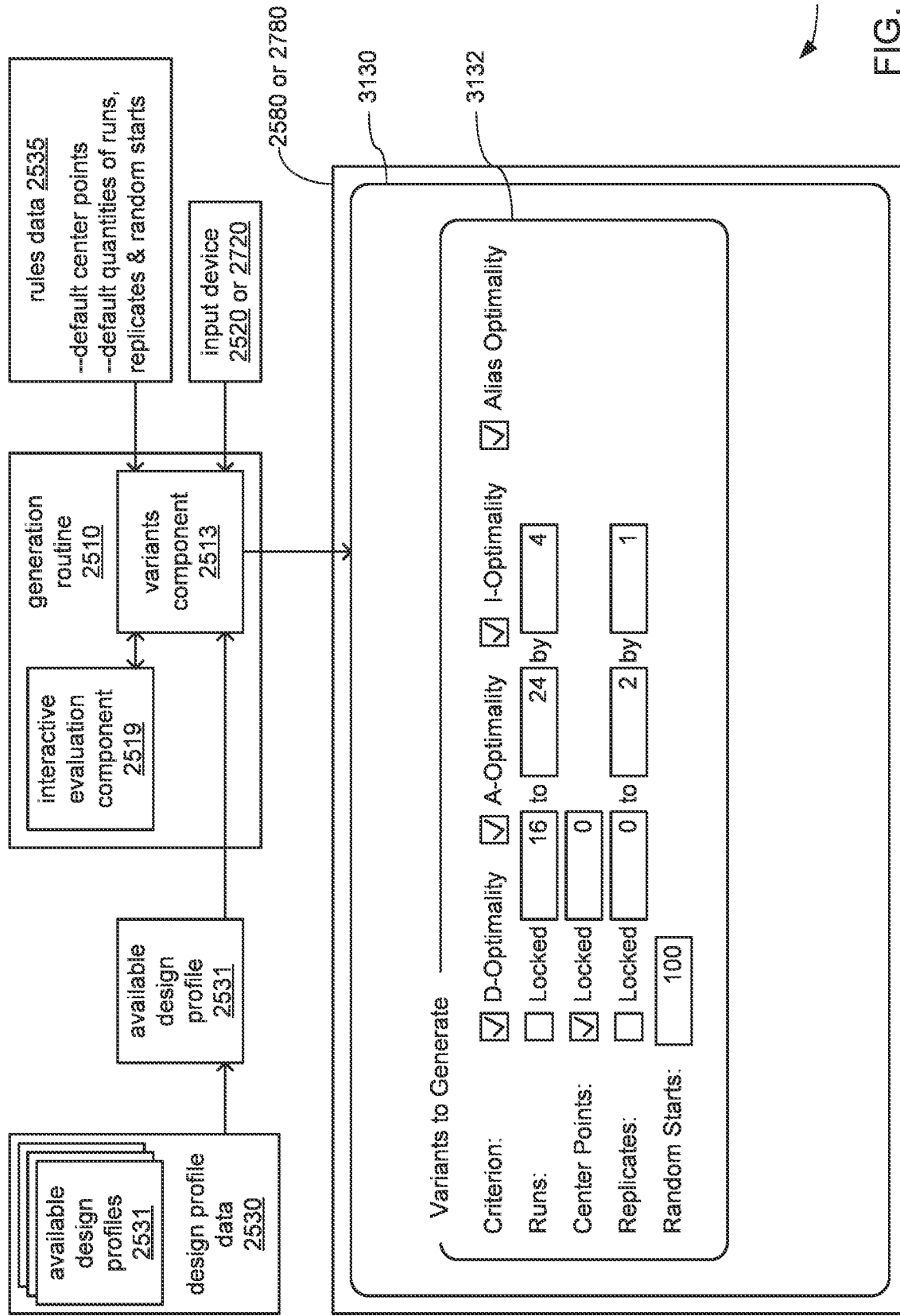

FIG. 10A depicts, in greater detail, aspects of the provision of the GUI portion 3130 to guide the generation of a set of variants of a single experiment design. Although not specifically shown, in executing the variants component 2513, an operator may be prompted through selecting a single experiment design that has just been defined through an earlier execution of the generation components 2511 and 2512 (as described above), and/or selecting a single experiment design from among those defined within one of the available design profiles 2531 stored within the design profile data 2530.

Regardless of the exact manner in which a single experiment design is chosen to serve as the basis for the generation of variants, in further executing the variants component 2513, the processor 2550 may be caused to present a menu 3132 of options for specifying aspects of the variety of variants that are to be included in the set of variants that are to generated. Each option of the set of options defines a range and/or a stepping interval of variation in one parameter for the set of variants that is to be generated. Taken together, the set of options effectively defines the outer bound and density for multiple dimensions of variation in the set of variants that is to be generated.

As depicted, among the parameters that may be so varied may be a selection of optimality types that may be included in the set of variants, including and not limited to, determinant optimality (D-optimality), average optimality (A-optimality), integrated optimality (I-optimality), and alias optimality. Still other types of optimality known to those skilled in the art may be included in addition to and/or in lieu of those specifically depicted as being available for selection.

As also depicted, at least a subset of the parameters that may be varied may be made selectable by specifying the upper and lower quantities of a range along with a stepping interval by which other quantities within range are specified. Parameters that may be so specified include, and are not limited to, quantities of runs, values for center points, and quantities of replicates. As further depicted, still other parameters may be more simply specified as a single quantity, including and not limited to, a quantity of random starts.

Further, in executing the interactive evaluation component 2519 as at least the variants component 2513 is also executed, the processor 2550 may be caused to monitor for the receipt of selections and/or entry of parameters for generation of a set of variants made via an input device (e.g., one of the input devices 2520 or 2720) within the GUI portion 3130. In some embodiments, a cursor, crosshairs or other visual element (not shown) may be presented to provide a visual indication of the current focal point of a corresponding pointing device (e.g., a mouse, trackpad, joystick, etc.) that may be used by an operator to make such selections in a manner that will be familiar to those skilled in the art. Alternatively or additionally, a text input device (e.g., a keyboard, predictive text keypad, etc.) may be used by an operator to make such selections through entry of text specifying quantities and/or other numerical values.

FIG. 10B depicts, in greater detail, aspects of the provision of the GUI portion 3140 to guide the evaluation of a generated set of variants of a single experiment design. In executing the estimation component 2514, the processor 2550 may be caused to present a listing 3142 of terms where each term is accompanied by an indication of whether that term is to be included in evaluating each of the variants in the set of variants specified through the GUI portion 3130, as described above. As depicted, and as will be recognizable to those skilled in the art, the terms included in the listing 3142 may include both primary terms (e.g., the depicted example lower order terms $X1$ through $X5$), as well as other terms (e.g., the depicted higher order terms that are each a combination of two of the depicted primary terms $X1$ through $X5$).

As will be recognizable to those skilled in the art, it is often not possible to use direct analytical approaches based on a model associated with an experiment design to estimate all of the lower and higher order terms that are desired to be evaluated as part of evaluating an experiment design. This may arise from limitations of the model associated with the experiment design, limits in the amount of available observation data for the terms, etc. More specifically, it is frequently possible to estimate all of the first order terms based on a model, but just a subset of the higher order terms. As a result, and as depicted in the example listing 3142 of FIG. 10B, it is often possible to specify that all of the primary terms are required to be estimated based on a model in evaluating an associated experiment design, as shown with the depicted example indications that the inclusion of each of the primary terms $X1$ through $X5$ is necessary. In contrast, it may not be possible similarly require the inclusion of even a subset of the higher order terms, as also shown.

However, in some embodiments, the estimation component 2514 may include the ability to employ Bayesian modification techniques to augment the analytical analysis that directly employs the model associated with an experiment design with the use of inferences for at least a subset of the higher order terms. Still, even the combination of direct analytical techniques and Bayesian modification techniques may not be sufficient to enable an estimation of all of the higher order terms. Thus, in further executing the estimation component 2514, the processor 2550 may be caused to limit the number and/or order of terms that are able to be required to be included to be estimated based on a model to just the primary terms, if not also a limited subset of the higher order terms. In so doing, the processor 2550 may be caused, by default, to present the listing 3142 as specifying that inclusion of at least each of the primary terms as necessary, if not also one or more of the higher order terms. As a further default, the processor 2550 may be caused to present the listing 3142 as specifying the inclusion of at least a subset of the higher order terms as being included to be estimated only if possible through use of Bayesian modification techniques.

As an alternative to presenting such "if possible" indications for at least higher order terms that cannot be included in an analytical analysis, it may be that the processor 2550 is caused, by default, to present the listing 3142 as specifying each of such higher order terms as "inestimable" (not specifically shown). This may be part of the processor 2550 being caused to not employ Bayesian modification techniques, by default, and being caused to employ Bayesian modification techniques in response to an operator changing one or more of such indications of "inestimable" to "if possible" to trigger the use of Bayesian modification techniques.

In executing the interactive evaluation component 2519 as at least the estimation component 2514 is also executed, the processor 2550 may continue to be caused to monitor for the receipt of selections of indications of which terms are required to be included (e.g., "necessary"), versus selections of terms to be conditionally included (e.g., "if possible"), or not included. In some embodiments, it may be that the processor 2550 is caused, in response to each time a change is made to such indications within the listing 3142, to again determine to what degree it is possible to require terms to be included, and to change one or more of such indications to reflect what is possible.

By way of example, it may be that an operator seeks to enable more of the higher order terms to be required to be included in the use of direct analytical approaches by reducing the quantity of primary terms that are so required by changing the indications for one or more of the primary terms from "necessary" to "if possible". In response to such a change, the processor 2550 may be caused to determine that this enables one or more of the higher order terms are able to be included in the use of direct analytical approaches. This may then lead to the processor 2550 being caused to automatically change the indication of "if possible" for those one or more higher order terms from "if possible" to "necessary" to reflect that such an opportunity is now available.

Figure 10C:
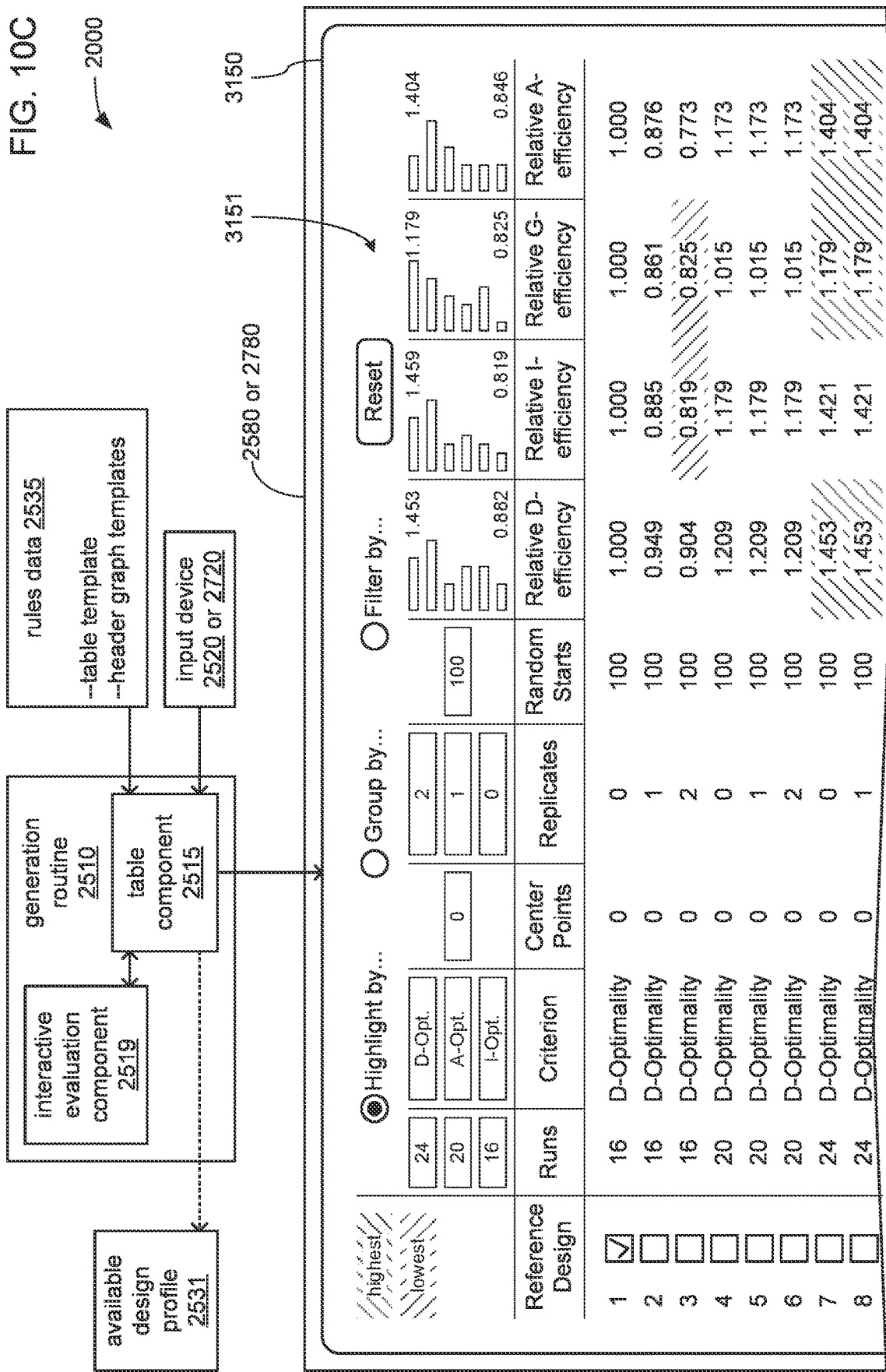
Figure 10D:
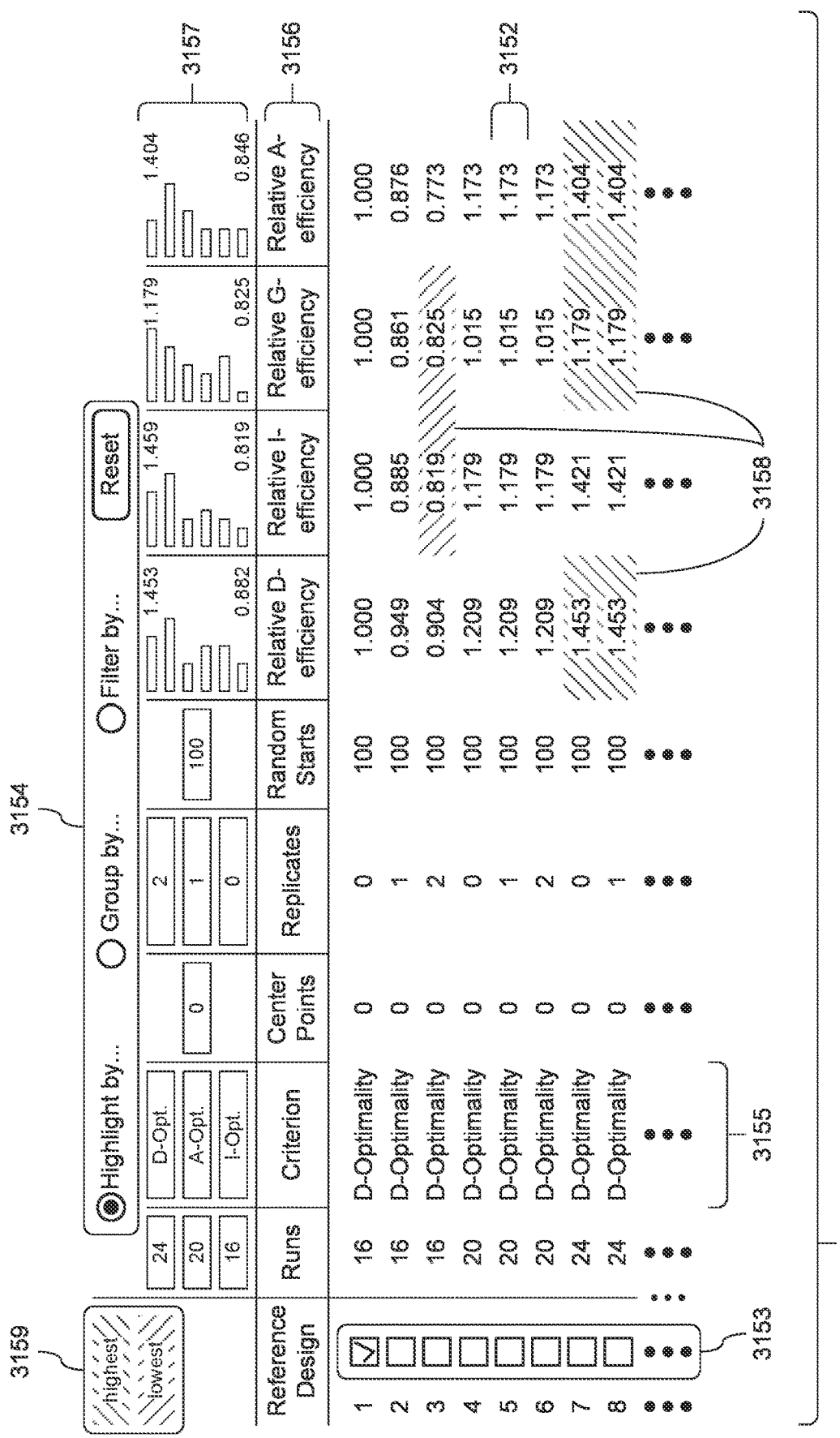

FIGS. 10C and 10D, together, depict, in greater detail, aspects of the provision of the GUI portion 3150 to present the results of the generation and analysis of a set of variants of a single experiment design, as well as to enable an operator to manipulate the presentation of results in various ways to better enable the identification of variants that exhibit more desirable characteristics. More specifically, in executing the table component 2515, the processor 2550 may be caused to present a table 3151 in which the parameters and results of analyses for each generated variant is presented in a separate row 3152. Each such parameter and analysis result may be presented in a separate column 3155 with a corresponding header 3156 of text describing what information is provided within each column 3155.

In executing the table component 3151 to generate indications of values for the results of each analysis performed on each variant, the processor 2550 may be caused to determine which results value is highest and/or lowest within each column 3155 of results values, and may then be further caused to provide highlighting 3158 and/or other visual indications for those highest and lowest values. Alternatively or additionally, such highlighting and/or other visual indications may be provided for mean values, median values and/or other particular values within each column 3155 in lieu of and/or in addition to providing such indications for highest and/or lowest values. As an aid to an operator, a visual guide 3159 to such visual indications may be provided as part of the table 3151 (as depicted), adjacent to the table 3151, or elsewhere within the GUI portion 3150.

In executing the interactive evaluation component 2519 as at least the table component 2514 is also executed, the processor 2550 may continue to be caused to support the provision of various mechanism in the GUI portion 3150 for allowing an operator to manipulate the manner in which the table 3151 is presented in various ways that may enable the operator to better identify one or more of the generated variants that at least tend to exhibit one or more desired characteristics. By way of example, the processor 2550 may monitor the input device 2520 or 2570 for the receipt of input by an operator to change the relative positions of various ones of the columns 3155 by widely known and used "drag-and-drop" manipulations of the headers 3156 thereof. Alternatively or additionally, the processor 2550 may similarly monitor for the receipt of input by an operator to cause the sorting of the rows 3152 by the values within a particular column 3155 by such widely known and used approaches as selecting the header 3156 of that column 3155 one or more times.

Beyond the provision of the descriptive headers 3156 for each column 3155, further execution of the table component 2515 to generate the table 3151 may also cause the processor 2550 to additionally generate and present a separate header graph 3157 for each column. Each header graph 3157 may be a bar graph providing a visual depiction of the distribution of values within its corresponding column 3155. In embodiments in which one or more values within a column 3155 has been highlighted with highlighting 3158, the one or more bars within the header graph 3157 for that column 3155 that correspond to those one or more values, may also be similarly highlighted (such highlighting 3158 may be within such bar(s) and/or may surround such bar(s)). In also executing the interactive evaluation component 2519 along with the table component 2515, the processor 2550 may be caused to monitor the input device 2520 or 2570 for instances of one of the bars within one of the header graphs 3157 being selected, thereby selecting a particular value that is present within the corresponding column 3155 within one or more rows 3152. In response, the processor 2550 may highlight those one or more rows 3152, and/or may reorganize the rows 3152 in various ways.

As depicted, the processor 2550 may be caused to provide a set of controls 3154 by which the particular functions that are performed by such selection of each of the bars of each of the header graphs 3157 may be dynamically changed by an operator. More specifically, and as depicted, there may be a set of "radio buttons" in the set of controls 3154 that allow an operator to specify what function is performed when one of the bars is selected. Among those functions may be the highlighting of row(s) 3152 in which the value associated with a selected bar is present, the grouping together of row(s) 3152 in which the value associated with a selected bar is present, or the filtering of rows(s) 3152 to just the one(s) in which the value associated with a selected bar is present.

In some embodiments, it may be that such use of the bars within the header graphs 3157 is additive in a manner implementing an "or" function such that selecting more than one bar within a single header graph 3157 for a single column 3155 causes the highlighting of, grouping of and/or filtering down to, all of the rows 3152 that have one of the values corresponding to any one of those selected bars within that single column 3155. Alternatively or additionally, in some embodiments, it may be that such use of the bars within the header graphs 3157 is additive in a manner implementing an "and" or "intersection" function such that selecting more than one of the bar across more than one header graph 3157 for more than one column 3155 results in the highlighting of, grouping of and/or filtering down to, just the rows 3152 that have all of the values associated with all of the bars that have been selected for each those columns 3155.

As additionally depicted, it may be that the set of controls 3154 additionally includes an "undo button" that may be selected by an operator to cause an undoing of the effects of the most recent selection(s) of one or more bars of one or more of the header graphs 3157. Such an undoing of such effects may include, at a minimum, the undoing of the filtering such that rows 3152 that had been filtered out such that they have ceased to be visible within the table 3151 may be made visible, again.

In some embodiments, beyond providing support for various approaches to reorganizing rows and/or columns within the table 3151, further execution of both the table component 2514 and interactive evaluation component 2519 may cause the processor 2550 to both present, and monitor for the use of, a set of reference design selection controls 3153 by which an operator may dynamically change which one of the variants generated from a single experiment design is to be treated as the reference variant. As previously discussed, the values for the results of the analyses automatically performed on each of the variants following the generation of the set of variants may be presented as values indicative of a level of difference of each of the non-reference variants from the reference variant.

In some embodiments, the initial selection of which variant is the reference variant may, by default, be the variant that most closely resembles the original single experiment design from which the set of variants is generated. Alternatively, the initial default selection of reference variant may be based on which variant is presented in the first row 3152 of the table 3151.

Regardless of which variant is initially selected by default, an operator may find it advantageous to be able to dynamically change the reference variant as part of employing the table 3151 to identify one or more variants having desirable characteristic(s). In response to an operator using the set of reference design selection controls 3153 to change the reference variant, the processor 2550 may be caused to repeat the performance of difference calculations that were used to derive new results values for each non-reference variant that indicates levels of differences from the results values of the newly selected reference variant. Additionally, the processor 2550 may be caused to repeat the generation of the header graphs 3157 to cause each to reflect the distribution of the new results values derived as levels of differences from the results values of the newly selected reference variant. Thus, such recalculations of results values and regenerations of the header graphs 3157 for at least the columns 3155 that contain results of the analyses of the set of variants may be performed each time a different variant is selected to be the next reference variant.

Figure 11:
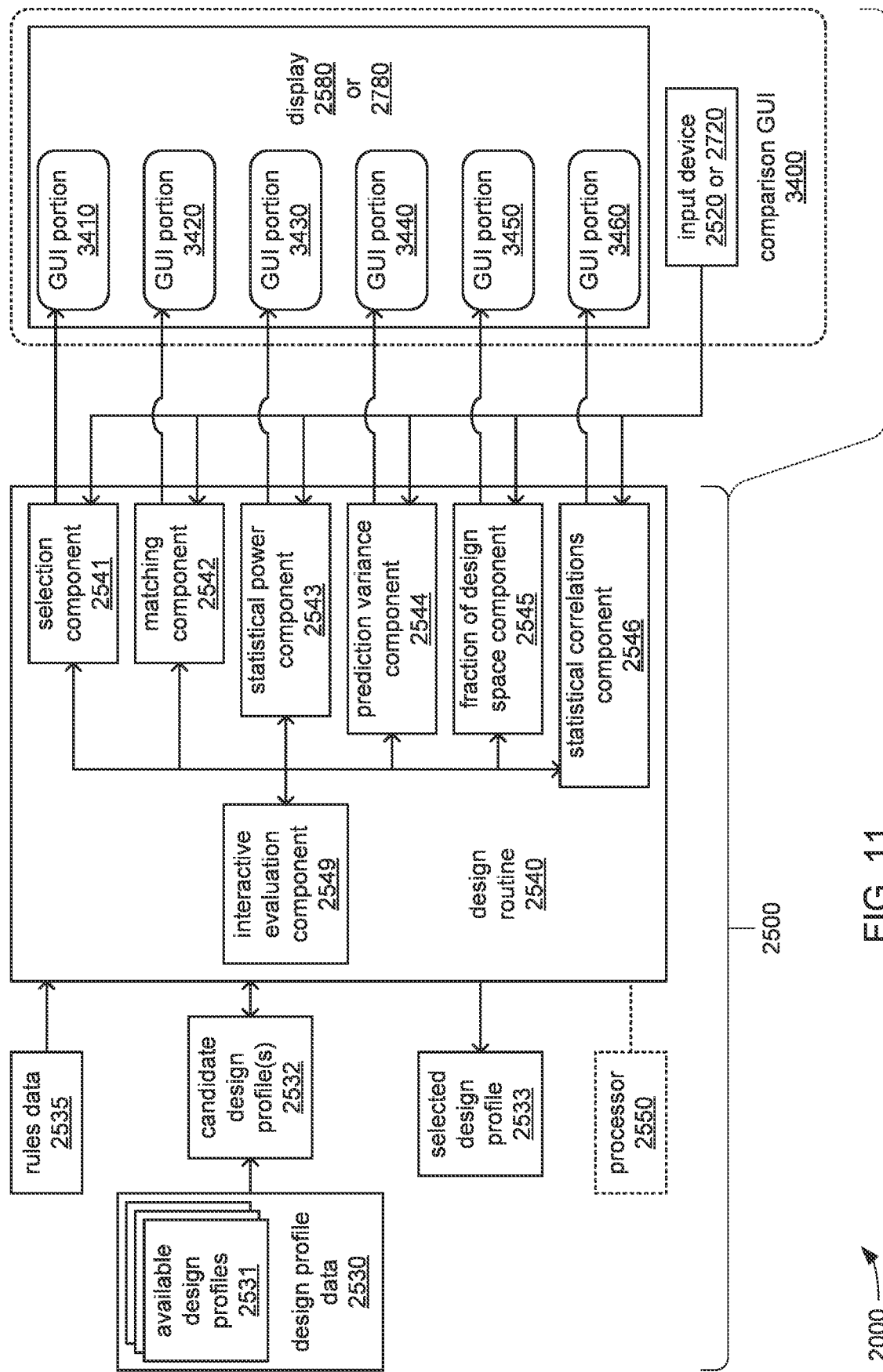
FIG. 11 illustrates an example of guiding the comparison of candidate experiment design(s) to select a single experiment design.

FIG. 11 depicts aspects of an example of the provision of the GUI 3400 to guide the comparison of two or more candidate experiment designs defined in corresponding candidate design profiles 2532. More specifically, FIG. 11 depicts aspects of the execution of the design routine 2540 by the processor 2550 of the coordinating device 2500 to provide various portions of the GUI 3400, and to perform calculations related to at least a subset of those portions of the GUI 3400. As depicted, the design routine 2540 may include a selection component 2541, a matching component 2542, a statistical power component 2543, a prediction variance component 2544, a fraction of design space component 2545, and/or a statistical correlation component 2546 that are each cause the provision of a GUI portion 3410, 3420, 3430, 3440, 3450 and/or 3460, respectively. As also depicted, the design routine 2540 may include an interactive evaluation component 2549 to coordinate the operation of each of the components 2541 through 2546 in performing various calculations and/or in providing their associated GUI portions 3410 through 3460, respectively.

In executing the design routine 2540, the processor 2550 may be caused to execute the interactive evaluation component 2549 to recurringly derive numerical values and/or other information as part of providing comparisons between corresponding aspects of each one of multiple candidate experiment designs that are selected for comparison. Also, the processor 2550 may be caused to do so as those candidate experiment designs are selected for comparison and/or as various parameters of each of those candidate experiment designs are provided. Thus, the processor 2550 may be caused to execute the interactive evaluation component 2549 at least partially in parallel with one or more of the other components 2541-2546.

As additionally depicted, and similar to the earlier discussed provision of the GUI 3100, the GUI 3400 may be provided either locally via the display 2580 and the input device 2520 of the coordinating device 2500, or remotely through the network 2999 and via the display 2780 and the input device 2720 of the viewing device 2700.

Figure 12A:
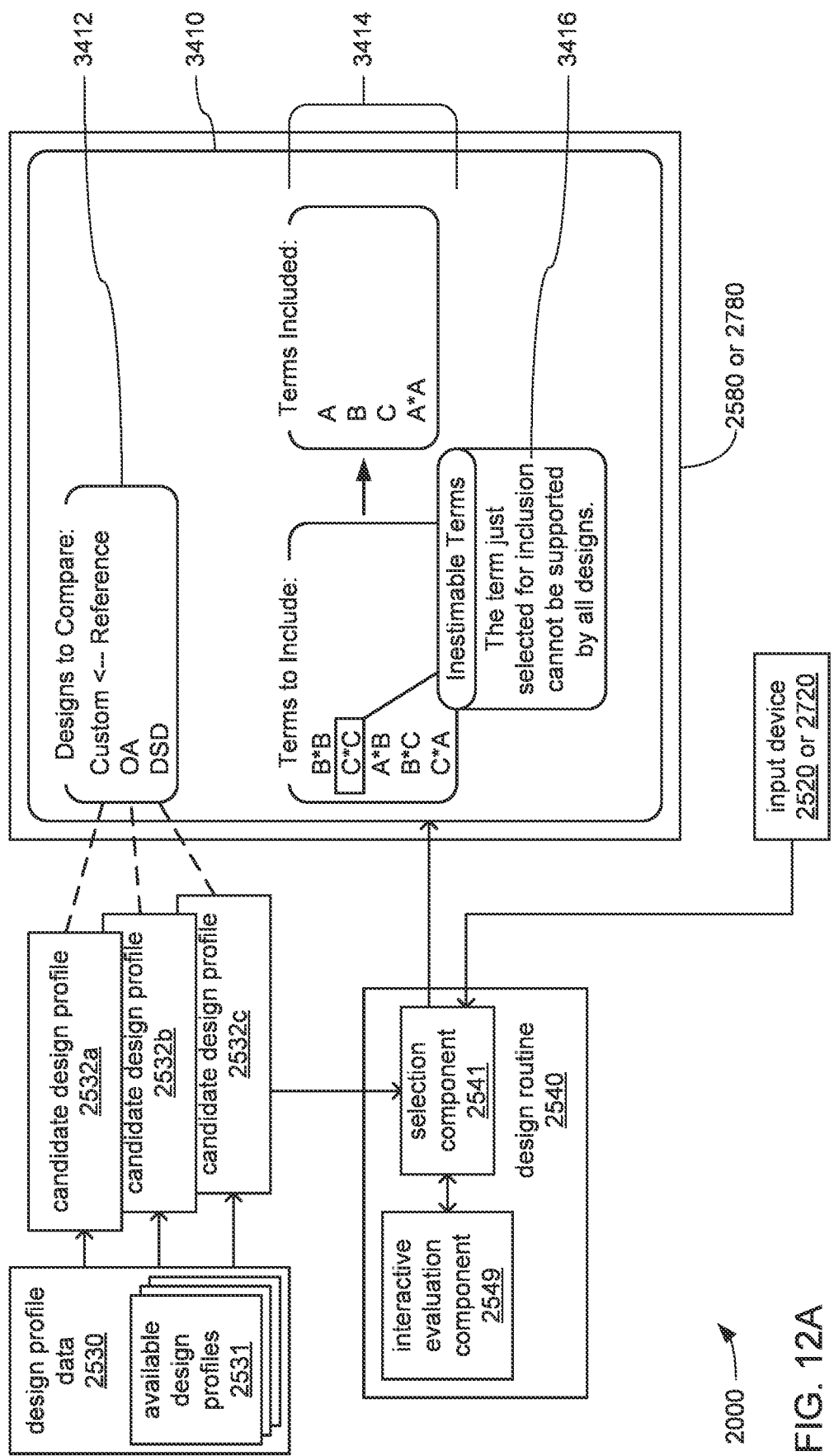
FIGS. 12A, 12B, 12C, 12D, 12E and 12F, together, illustrate additional details of the comparison of candidate experiment designs of FIG. 11.

FIG. 12A depicts, in greater detail, aspects of the provision of the GUI portion 3410 to guide the selection of the multiple candidate experiment designs to be compared. In executing the selection component 2541, the processor 2550 may be caused to present a selection list 3412 or other similar visual element in the GUI portion 3410 by which an operator may be guided through selecting two or more candidate experiment designs to be compared. As depicted, definitions for experiment designs may be stored as available design profiles 2531 within the design profile data 2530, thereby enabling definitions of the experiment designs that are selected for comparison to be retrieved by retrieving corresponding ones of the available design profiles 2531. More specifically, and as previously discussed, each selection of an experiment design defined within one of the available design profiles 2531 may cause the provision of a copy thereof in the form of a corresponding candidate design profile 2532 (e.g., the specifically depicted example candidate design profiles 2532a-c) to the design routine 2540. In some embodiments, the selection list 3412 may present each of the available experiment designs with a text identifier given to each one, which as depicted, may be descriptive of the experiment design generation method used in each.

As also depicted, the selection list 3412 may include a textual element that indicates which one of the multiple candidate experiment designs that are selected for comparison is designated as a reference. In embodiments in which one of the candidate experiment designs is so designated as a reference, one or more of the comparisons of corresponding aspects the candidate experiment designs may be organized in a manner in which the comparisons are (at least by default) between that reference and each of the other candidate experiment designs that are selected for comparison.

Also in executing the selection component 2541, the processor 2550 may be caused to present side-by-side selection lists 3414 or other similar visual elements in the GUI portion 3410 by which an operator may be guided through selecting terms of the models associated with the candidate experiment designs to be included in the comparisons. As depicted, the side-by-side lists 3414 may include a list of terms not yet selected for inclusion in the comparisons, but available for selection, visually presented adjacent to another list of terms that are already in the set of terms selected for inclusion in the comparisons.

Further in executing the selection component 2541, the processor 2550 may be caused to monitor for the receipt of selections of candidate experiment designs for comparison and/or terms to be included in the comparisons made via an input device (e.g., one of the input devices 2520 or 2720). In some embodiments, a cursor, crosshairs or other visual element (not shown) may be presented to provide a visual indication of the current focal point of a corresponding pointing device (e.g., a mouse, trackpad, joystick, etc.) that may be used by an operator to make such selections in a manner that will be familiar to those skilled in the art. Alternatively or additionally, a text input device (e.g., a keyboard, predictive text keypad, etc.) may be used by an operator to make such selections through entry of text identifiers associated with experiment designs and/or terms. Regardless of the exact mechanism by which an operator provides input indicating selections of candidate experiment designs for comparison, the processor 2550 may be caused to respond to such input by retrieving corresponding candidate design profile(s) 2532, as just discussed. The processor 2550 may also be caused to respond to input indicating selections of terms for inclusion in the comparisons by retrieving parameters corresponding to those selected terms from the retrieved one or more candidate design profiles 2532 (e.g., parameters defining the one or more factors from which each term is formed, etc.).

In executing the interactive evaluation component 2549 at least partially in parallel with the selection component 2541, the processor 2550 may be caused to respond to each selection of a candidate experiment design and each selection of a term to be added to the set of terms to be included in the comparison by recurringly performing an analysis of the set of terms with each of the experiment designs selected for comparison. In so doing, the processor 2550 may be caused to recurringly determine whether the set of terms is unsupportable with any of the candidate experiment designs that have been selected for comparison. If so, then the processor 2550 may be caused to present a notice 3416 that the current set of terms selected for inclusion in the comparisons is not able to be supported by one or more of the candidate experiment designs. More specifically, and where such an unsupportable situation is created by the addition of a particular term to the set, the processor 2550 may be caused to present an embodiment of the notice 3416 that indicates that the term most recently selected for inclusion in the set of terms causes the set of terms to be "inestimable" with one or more of the candidate experiment designs selected for comparison. In some embodiments, the processor 2550 may be caused to await the receipt of input from the operator indicating acknowledgement of the notice 3416, and may respond to such input by removing the most recently selected term from the set. In so doing, the processor 2550 may be caused to modify the presentation of the selection lists 3414 to place the just removed term from the list indicating the set of selected terms and into the list of terms that are available for selection, but not yet selected.

Figure 12B:
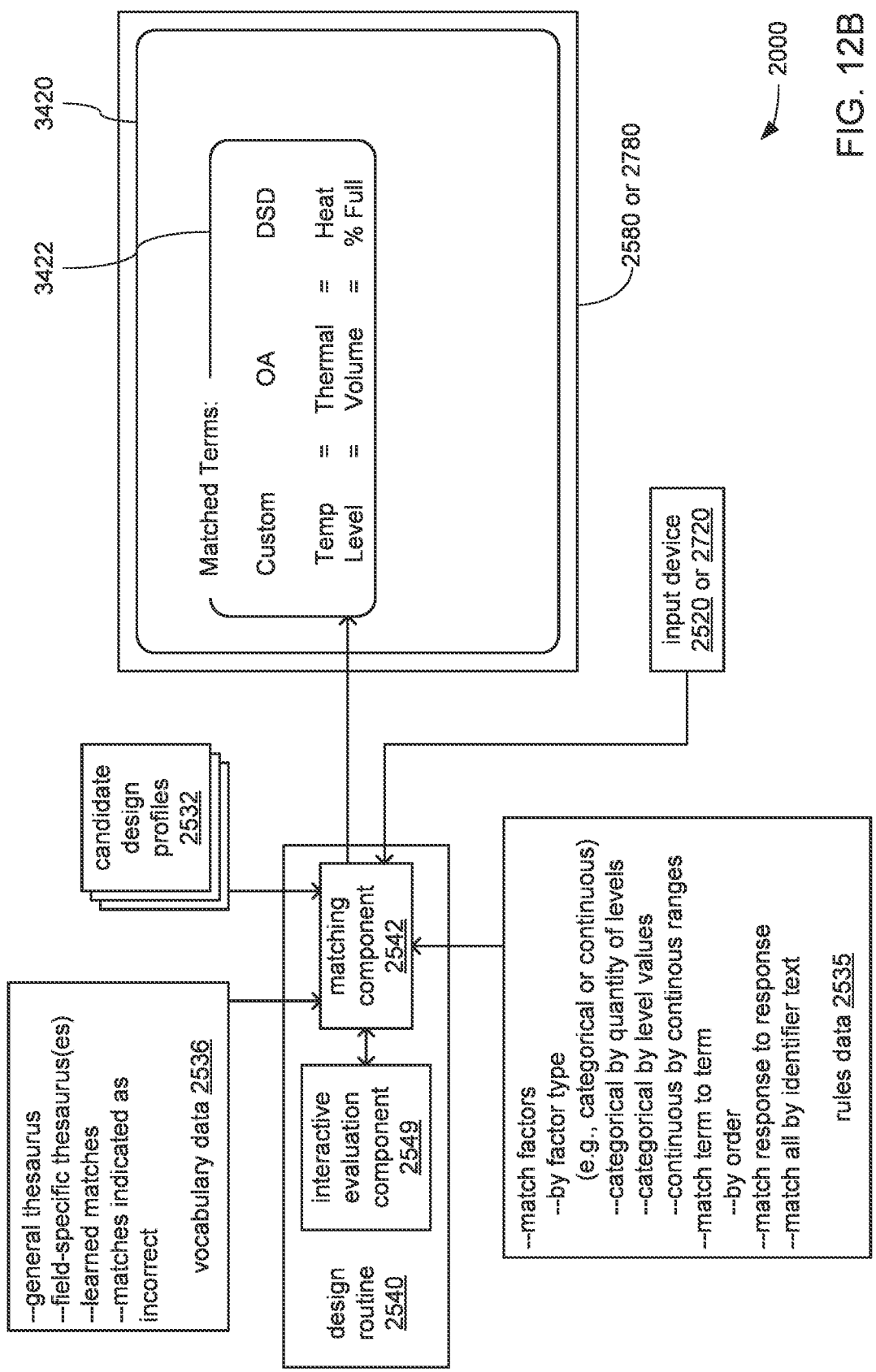

FIG. 12B depicts aspects of the provision of the GUI portion 3420 to guide the generation of matches between terms of the models associated with the multiple candidate experiment designs in greater detail. In executing the matching component 2542, the processor 2550 may be caused to analyze various characteristics of the factors, terms and/or responses of each model associated with one of the candidate experiment designs to identify matches therebetween. Indications of such characteristics may be retrieved by the processor from the candidate design profiles 2532 that are associated with the candidate experiment designs. The processor 2550 may also retrieve a set of rules to be followed by the processor 2550 in performing such an analysis and matching from the rules data 2535.

In following such retrieved rules in executing the matching component 2542, the processor 2550 may initially attempt to match factors by the factor type of each factor of each model. By way of example, the processor 2550 may be caused to at least initially identify matches between factors of different models based on whether each factor is of a continuous factor type that may have any value within a continuous range of numerical values, or is of a categorical factor type that may have a value from among a set of discrete values. Following such initial matching of factors by factor type, the processor 2550 may be caused to match factors of the continuous factor type (if there are any) by matching their ranges of values, and/or may be caused to match factors of the categorical type (if there are any) by matching their quantities of levels and/or the values of their levels.

Alternatively or additionally, in following such retrieved rules, the processor 2550 may be caused to identify matches between terms of different models based on their order (e.g., 1st order, 2nd order, 3rd order, etc.). Also alternatively or additionally, the processor 2550 may be caused to identify matches between factors, between terms and/or between responses of different models by matching the texts of their identifiers. By way of example, the processor 2550 may be caused to search and retrieve indications of matches between words based on meaning within the vocabulary data 2533. In some embodiments, the vocabulary data 2533 may include a relatively general thesaurus and/or a field-specific thesaurus (e.g., industry-specific thesaurus, culture-specific thesaurus, technology-specific thesaurus, region-specific thesaurus) that may be deemed to be applicable.

As depicted, upon identifying one or more matches among factors, terms and/or responses, the processor 2550 may be caused by execution of the matching component 2542 to present a listing 3422 or other similar visual element of the identified matches. The processor 2550 may be further caused to monitor for the receipt of input from the operator that indicates that one or more of the matches identified by the processor 2550 is incorrect and/or input from the operator specifying one or more additional matches not successfully made by the processor 2550. In response to such corrective input, the processor 2550 may store indications of matches specified by the operator as learned matches and/or may store indications of incorrect matches made by the processor 2550 within the vocabulary data 2533.

Figure 12C:
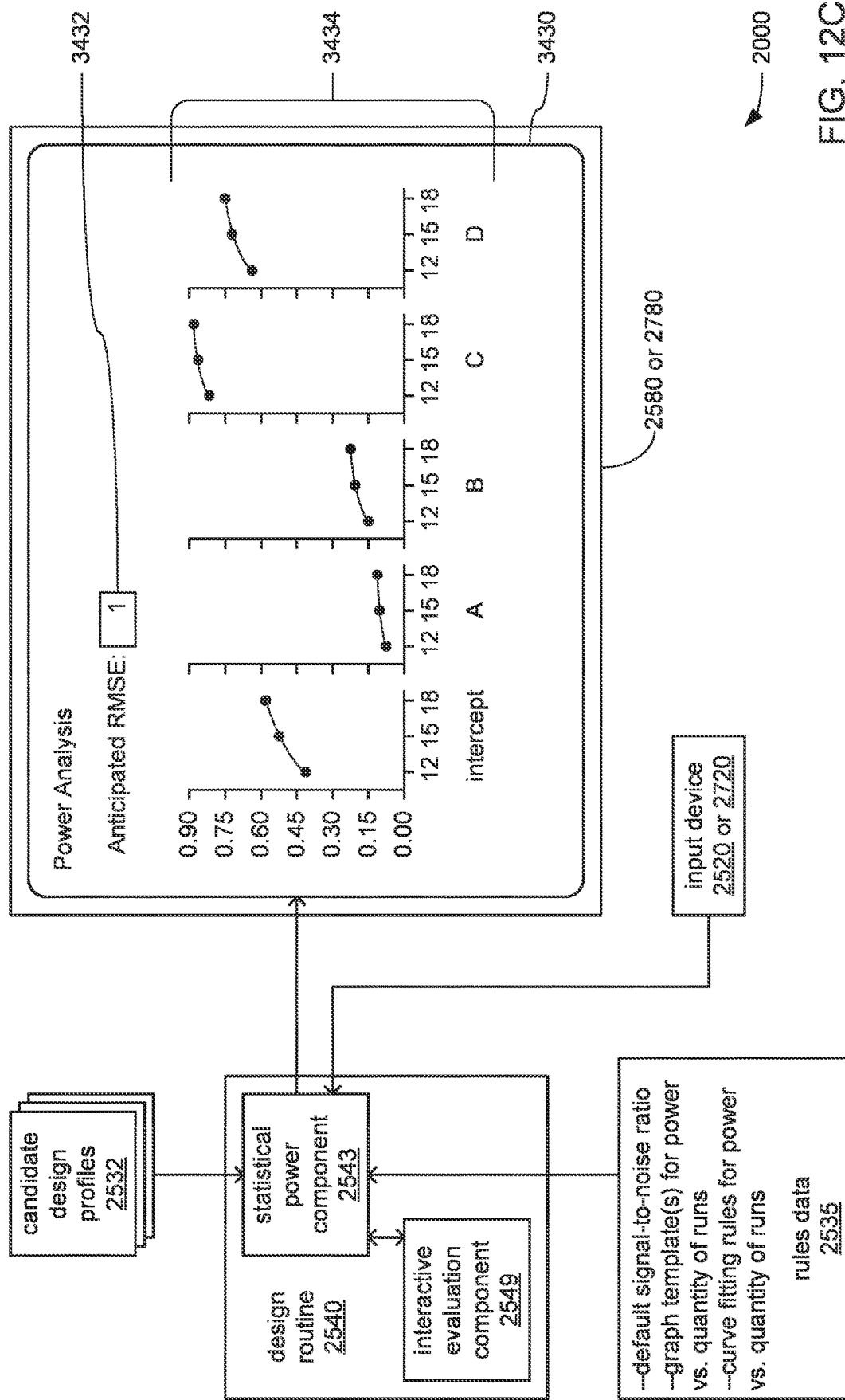

FIG. 12C depicts aspects of the provision of the GUI portion 3430 to guide the generation and consideration of a set of graphs comparing statistical power for terms among the multiple candidate experiment designs in greater detail. In executing the statistical power component 2543, the processor 2550 may be caused to analyze the terms that have been selected for inclusion in the comparisons among the candidate experiment designs, based on a selected signal-to-noise ratio, and may then generate and present a set of comparative graphs based on the analyses. In so doing, the processor 2550 may also retrieve a set of rules to be followed by the processor 2550 in performing such analyses and/or in generating the comparative graphs from the rules data 2535.

In following such retrieved rules in executing the statistical power component 2543, the processor 2550 may employ a predetermined statistical power calculation and/or an initial value for signal-to-noise ratio by default to derive the statistical power of each term of the set of terms selected for inclusion in the comparisons for each of the candidate experiment designs. The processor 2550 may then be caused to generate, for each term of the set of terms, a graph of a set of graphs 3434 of statistical power vs. candidate experiment design. Within each graph of the set of graphs 3434, the statistical power of a term may be plotted as a separate point for each candidate experiment design. In so doing, the processor 2550 may retrieve and employ a template from the rules data 2535 for generating each graph and/or may employ curve-fitting rules for fitting a curve to the plotted points within each graph.

In some embodiments, the rule data 2535 may include a rule that limits the performance of such analyses and the generation of the set of graphs 3434 to situations in which the candidate experiment designs differ only in the quantity of runs. Thus, in such situations, the resulting graphs provide a depiction of statistical power vs. quantity of runs for each term. Such an embodiment of the set of graphs 3434 may be so generated and then presented by the processor 2550 as part of guiding the selection of one of the candidate experiment designs for use by providing a graphical comparison of the relative degree of benefit that may be realized for each higher quantity of runs. Where the experiment design selected as the reference is based on constraints of cost, time and/or availability of materials, and is therefore the candidate experiment design with the lowest quantity of runs, such a visual presentation of fitted curves depicting what is often diminishing returns in statistical power with each increase in the quantity of runs may enable the operator to more quickly identify what may be deemed to be an acceptable tradeoff in incurring an increase in cost, time and/or consumption of available materials to perform a particular quantity of runs that may be greater than the quantity associated with the reference.

As depicted, the processor 2550 may be caused to arrange the set of graphs 3434 adjacent to each other in a horizontally extending manner (i.e., side-by-side in a "landscape" orientation). Such an arrangement of the set of graphs may be deemed desirable to advantageously exploit the "landscape" orientation of the binocular vision of the HVS. As will be familiar to those skilled in the art, it is currently believed that the manner in which the HVS functions to both identify what is in the FOV and perceive stereoscopic depth includes the covering of the FOV of each eye in a two-dimensional array of multiple types of feature detector in which each type of feature detector is implemented with a neuron that is sensitive to the presence of a particular feature within a particular portion of the FOV, such as a simple shape (e.g., a line, curve or corner) formed by one or more transitions between adjacent colors and/or transitions between light and dark. It is also believed that there are multiple layers of such coverage of the FOV of each eye in which a form of averaging is employed to reduce the resolution of the images captured by each eye for each successive layer to allow feature detectors in each of the successive layers to detect features across increasingly larger portions of the FOV of each eye. It is further believed that the perception of stereoscopic vision is based on comparisons between what is detected by the feature detectors at each level between the FOVs of the left and right eyes to identify both similarities and differences therebetween.

Efforts to apply such current theories of how the HVS functions to developing binocular image processing systems to identify objects and perceive depths in machines have met with a considerable degree of success, thereby increasing confidence in the correctness of such theories. Thus, the fitted curve within each of the graphs may advantageously provide a small set of simple shapes that form each of the curves that may be readily detected by a relatively small quantity of adjacent feature detectors within the FOV of each eye. Also, the horizontal or "landscape" orientation of the adjacent placement of the graphs in the set of graphs 3434 may advantageously exploit the left-versus-right feature-to-feature comparison at multiple levels within the HVS to enable speedier recognition of similarities in the fitted curves between adjacent ones of the graphs, thereby enabling a speedier identification of an acceptable tradeoff between quantity of runs to perform and the relative degree of increase in statistical power that may be realized, given the likely diminishing returns of each further increase in the quantity of runs.

As also depicted, the processor 2550 may be caused to present a visual indicator 3432 of the signal-to-noise ratio on which the calculations that derived the statistical power values within the set of graphs 3434 are based. In executing the interactive evaluation component 2549 at least partially in parallel with the statistical power component 2543, the processor 2550 may be caused to await receipt of an indication of input received from an operator that is indicative of a change to the displayed signal-to-noise ratio. The processor 2550 may be caused to respond to each such change by recurringly repeating the calculations that derived the statistical power values within the set of graphs 3434, and recurringly regenerating and re-presenting all of the graphs within the set of graphs 3434 to all reflect the same change in the signal-to-noise ratio. In this way, the operator may be interactively provided with answers to "what-if" questions of what would be the various values of statistical power for different signal-to-noise ratios that may be expected and/or known to be applicable to the studied system.

Figure 12D:
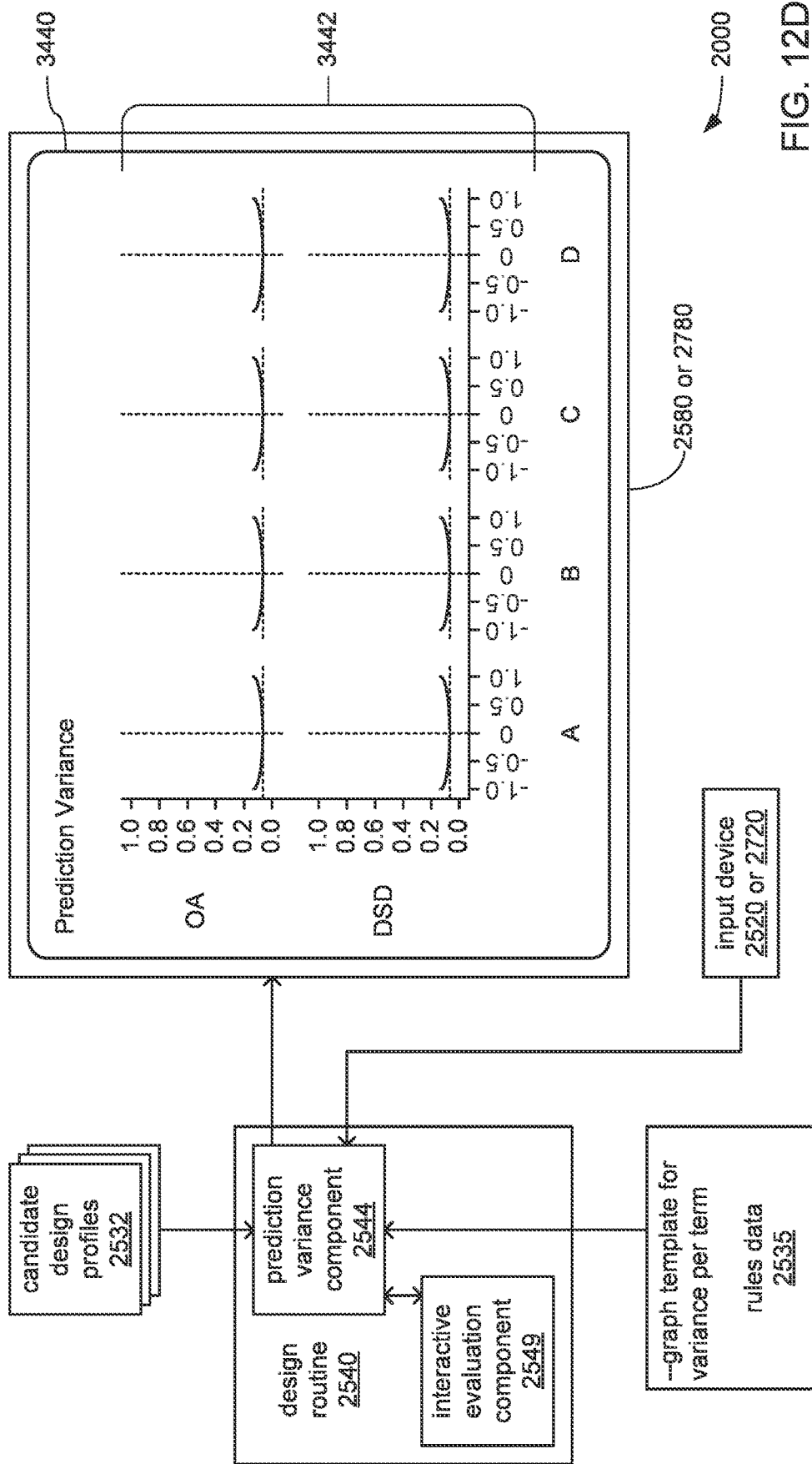

FIG. 12D depicts aspects of the provision of the GUI portion 3440 to guide the generation and consideration of a set of graphs comparing the prediction variance for terms among the multiple candidate experiment designs in greater detail. In executing the prediction variance component 2544, the processor 2550 may be caused to analyze the terms that have been selected for inclusion in the comparisons among the candidate experiment designs, and may then generate and present a set of comparative graphs based on the analyses. In so doing, the processor 2550 may also retrieve a set of rules to be followed by the processor 2550 in performing such analyses and/or in generating the comparative graphs from the rules data 2535.

In following such retrieved rules in executing the prediction variance component 2544, the processor 2550 may employ a predetermined prediction variance calculation to derive the prediction variance of each term of the set of terms selected for inclusion in the comparisons for each of the candidate experiment designs. The processor 2550 may then be caused to generate, for each term of the set of terms and for each of the candidate experiment designs, a graph of a set of graphs 3442 of prediction variance. Within each graph of the set of graphs 3442, a vertical line may be included that may be positioned at a default location at a zero value along the horizontal axis within a single design space that is identical across all of the graphs. In some embodiments, such a default location of the vertical line across all of the graphs may be specified as part of a template for generating the graphs that may be retrieved by the processor 2550 from the rules data 2535.

In executing the interactive evaluation component 2549 at least partially in parallel with the prediction variance component 2544, the processor 2550 may be caused to await receipt of an indication of input received from an operator that is indicative of a change to the displayed position of the vertical line along the horizontal axis in one of the graphs of the set of graphs 3442. The processor 2550 may be caused to respond to each such change by recurringly repeating the calculations that derived the prediction variances for each term for each candidate design experiment, and recurringly regenerating and re-presenting all of the graphs within the set of graphs 3442 to all reflect the same change in the position of the vertical line along the horizontal axis, and the same type of change in all of the resulting depicted curves for prediction variance across the design space.

Figure 12E:
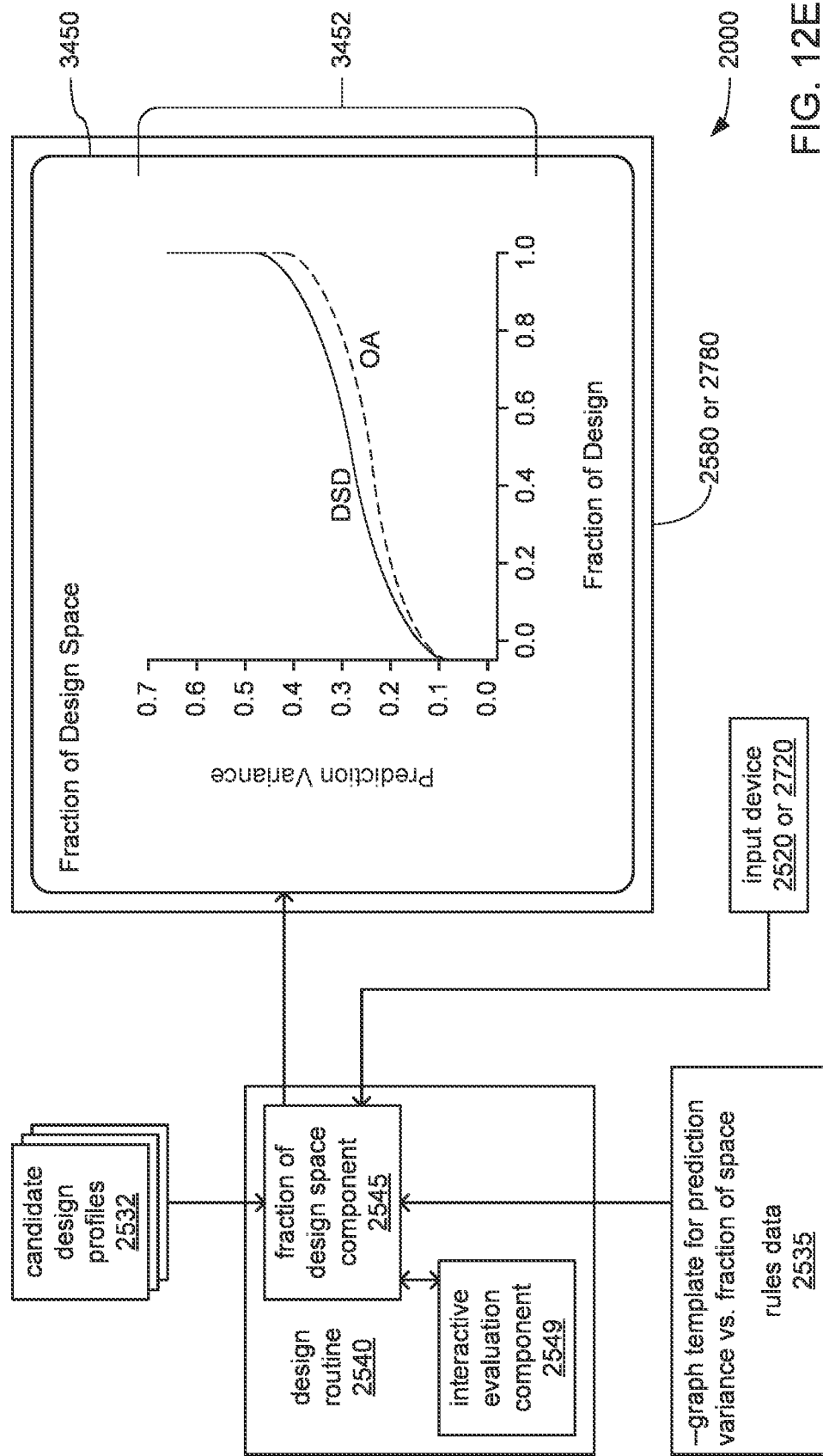

FIG. 12E depicts aspects of the provision of the GUI portion 3450 to guide the generation and consideration of a combined graph comparing the fraction of design space of each of the candidate experiment designs in greater detail. In executing the fraction of design space component 2545, the processor 2550 may be caused to analyze each of the candidate experiment designs to generate, and then present, a combined graph 3452 of the fraction of design space for all of the candidate experiment designs. In so doing, the processor 2550 may also retrieve a set of rules to be followed by the processor 2550 in performing such analyses and/or in generating the combined graph 3452 from the rules data 2535, including a template.

Figure 12F:
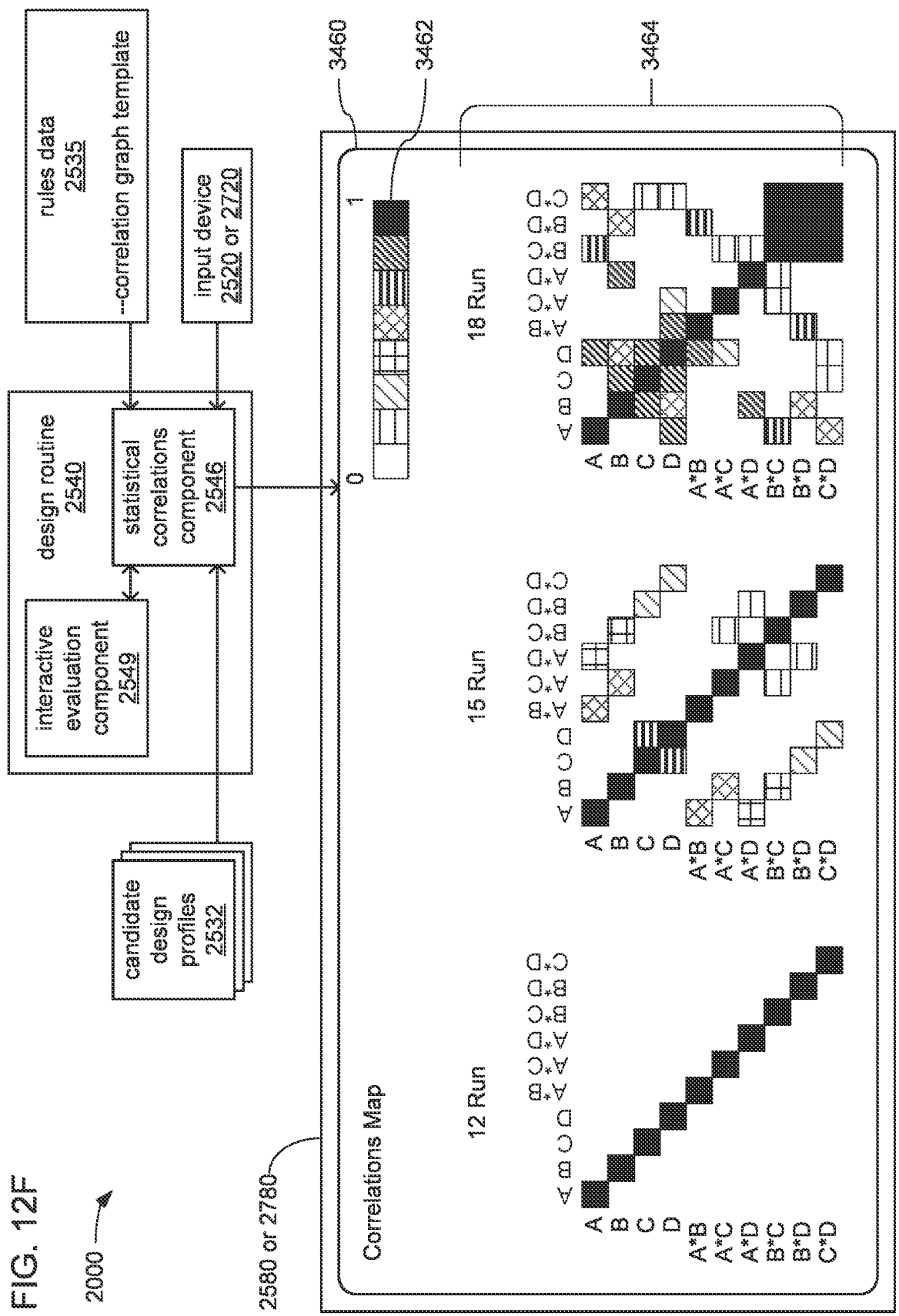

FIG. 12F depicts aspects of the provision of the GUI portion 3460 to guide the generation and consideration of a set of graphs comparing the degree of correlation between terms within each of the candidate experiment designs in greater detail. In executing the statistical correlations component 2546, the processor 2550 may be caused to analyze, within each of the candidate experiment designs, the terms that have been selected for inclusion in the comparisons to derive degrees of correlation between each possible pair of terms. The processor 2550 may then, for each of the candidate experiment designs, generate a correlation graph with all of the terms arranged in the same order along each of the horizontal and vertical axes, and with visual indications at each intersection visually depicting the derived degree of correlation between the terms of the corresponding pair. The processor may then also be caused to visually present the correlation graph so generated for each of the candidate experiment designs adjacent to each other in a set of correlation graphs 3464. Along with the set of correlation graphs 3464, the processor 2550 may additionally be caused to present a scale of the visual indications of the degree of correlation used in the correlation graphs. In so doing, the processor 2550 may also retrieve a set of rules to be followed by the processor 2550 in performing such analyses and/or in generating the correlation graphs from the rules data 2535, including a correlation graph template.

Again, as depicted, the processor 2550 may be caused to arrange the correlation graphs of the set of correlation graphs 3464 adjacent to each other in a horizontally extending manner (i.e., side-by-side in a "landscape" orientation). As discussed earlier, such a horizontally extending adjacent arrangement of the set of correlation graphs 3464 may again be deemed desirable to advantageously exploit the "landscape" orientation of the binocular vision of the HVS, including the stereoscopic comparisons believed to be routinely performed by the HVS at each level of feature detectors between the FOVs of the left and right eyes to identify both similarities and differences therebetween. Stated differently, such a horizontal side-by-side arrangement of such correlation graphs that use such visual indicators of degrees of correlation allow an operator to quickly identify, almost within a single glance, both degrees of similarity and degrees of difference in the visually indicated degrees of correlation among terms within each of the candidate experiment designs.

In some embodiments, the processor 2550 may additionally be caused to present a GUI portion (not shown) that allows for the selection of the scale of visual indicators of degrees of correlation from among multiple different scales of such visual indicators. In some embodiments, different ones of such scales may each include a different form of color coding. Each different form of color coding may include a range of progressively changing proportioned mixtures between two different colors that may, as entirely separate colors, each define one of the minimum and maximum degrees of correlation at the opposite ends of the scale. By way of example, such a scale may include the separate colors red and blue marking the minimum and maximum degrees of correlation, and a progressively changing series of mixtures of different proportions of red and blue forming various different purple colors marking various degrees of correlation between the minimum and maximum degrees of correlation. Alternatively or additionally, different ones of such scales may include different ranges of gray shading of a single color. Also alternatively or additionally, and as specifically depicted, different ones of such scales may include a series of different filling patterns that each provide a different degree of fill of a single color, thereby defining a scale that transitions from no filling to fully filled.

As will be familiar to those skilled in the art, in an experiment design, a high degree of correlation between terms can result in the masking of the influence of a particular factor in controlling one or more responses such that the importance of the particular factor may be overlooked. Alternatively, such a high degree of correlation between terms can cause a misleading inflation of the influence of a particular factor in controlling one or more responses such that valuable time and resources may be wasted in focusing on understanding the particular factor's influence and/or attempting to manipulate the particular factor to control one or more responses. Thus, an experiment design that includes one or more pairs of relatively highly correlated terms may not only provide little or no insight into an important linkage that may exist between factors and responses, but may also provide a misleading impression of there being an important linkage between factors and responses that may not actually exist and/or that may not actually be so important.

The terms may be arranged in the same order along each of the horizontal and vertical axes specifically to cause the diagonal symmetry that can be seen in FIG. 12F in the display of visual indicators of degrees of correlation. One of the results of this diagonal symmetry is the formation of a visually distinct diagonal line of intersections in each graph at which each term is paired with itself, and thus, where it would be expected that there would be complete symmetry. As depicted, each of these intersections along this diagonal line may be marked with an visual indicator that indicates such maximum correlation. Doing so may be deemed desirable to create a simple, easily identified visual reference of the location of each individual correlation graph in relation to the others of the set of correlation graphs 3464 in which the ends of the diagonal line so created denote diagonally opposite corners that quickly define the horizontal and vertical boundaries of each individual correlation graph.

As also depicted, the terms may be arranged along each of the horizontal and vertical axes such that lower order terms are arranged towards one end of the diagonal line and higher order terms are arranged towards the other end of the diagonal line. As will be familiar to those skilled in the art, the fact that many higher order terms are formed by the combining of two or more factors increases the likelihood that higher degrees of correlation will be encountered between higher order terms than between lower order terms. Thus, as depicted, this may produce a region of indications of relatively high degrees of correlation in the corner of one or more of the correlation graphs where the intersections correspond to pairs of higher order terms.

As will be familiar to those skilled in the art, relatively high degrees of correlation between lower order terms that are formed from single factors may be an indication that an experiment design is susceptible to masking and/or misrepresenting the degree of influence that one or more particular factors may have on particular responses, especially if it proves to be the case that a particularly important factor is subject to such high correlation. In contrast, where there is minimal correlation between lower order terms, there is far less risk of not detecting the influence of an important factor or of a factor being given an outsized apparent degree of influence in an experiment design, even if there are higher degrees of correlation between higher order terms.

By arranging the terms along the horizontal and vertical axes based on the order of the terms such that pairs of lower order terms are positioned toward one end of the diagonal line while pairs of higher order terms are positioned toward the other end, the ability is provided to more quickly visually distinguish experiment designs that are more likely to be successful in illuminating linkages between factors and responses from experiment designs that may not be. This also tends to advantageously exploit the aforedescribed multilayer left-right feature comparisons made by the HVS, since regions of clustered visual indications of high degrees of correlations that appear in one corner corresponding to pairs of lower order terms or in the other corner corresponding to pairs of higher order terms become features that are detected by the feature detectors of the HVS. Such features then feed into left-right comparisons at layers where the feature detectors each cover a larger portion of the FOV of each eye such that there is an ability to relatively speedily detect the difference between a correlation graph that shows such a region in one corner (and towards one of the left or right sides) and another correlation graph that shows such a region in the opposite corner (and towards the other of the left or right sides).

As depicted, the entirety of the rectangular area defined by each of the correlation graphs may be entirely filled in with visual indicators of degrees of correlation such that, except for the pairings of each term to itself along the diagonal line, the presentation of visual indicators of degree of correlation for all possible pairs of terms is actually repeated in a manner that is diagonally mirrored on opposite sides of the diagonal line. Alternate embodiments are possible in which such mirrored repetition is avoided by presenting only one set of such visual indicators in a manner that fills a triangular-shaped portion of the rectangular area of each graph on only one side of the diagonal line. However, it may be deemed desirable to provide such mirrored repetition in the presentation of the visual indicators, since doing so provides a greater volume of such indications, and in a manner that still generally advantageously exploits the innate multilayer left-right feature comparisons of the HVS.

In executing the interactive evaluation component 2549 at least partially in parallel with the statistical correlations component 2546, the processor 2550 may be caused to await receipt of an indication of input received from an operator that is indicative of a change to the set of terms selected to be included in the comparisons of the candidate experiment designs. The processor 2550 may be caused to respond to each such change by recurringly repeating the analyses that derive correlations between terms and/or recurringly repeating the generation and presentation of the set of correlation graphs 3464 to reflect each changed set of terms.

Figure 13:
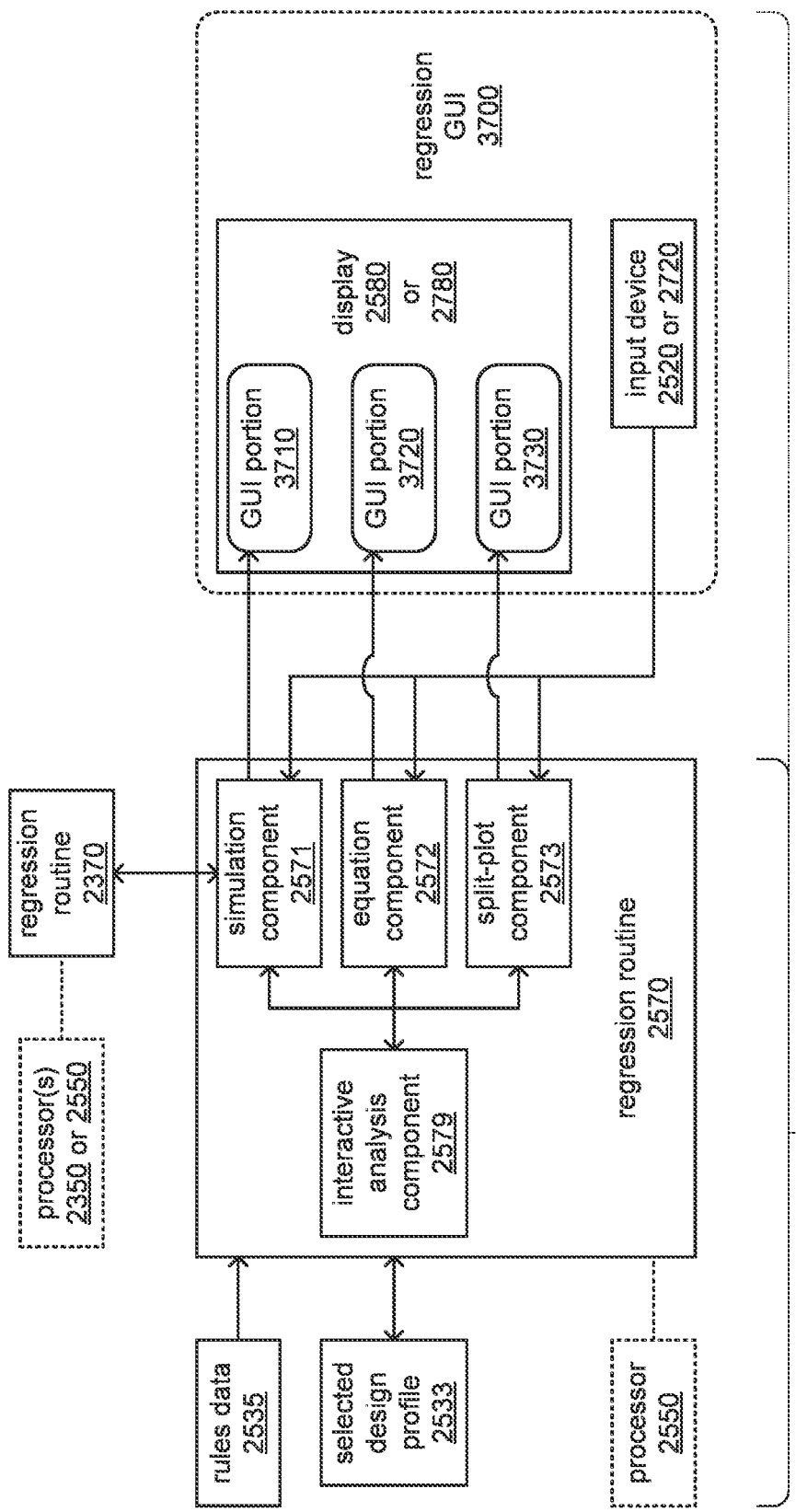
FIG. 13 illustrates an example of guiding the performance of a regression analysis of a selected experiment design.

FIG. 13 depicts aspects of an example of the provision of the regression GUI 3700 to guide the performance of a regression analysis with a selected experiment design (e.g., an experiment design selected from among the candidate experiment designs compared through use of the comparison GUI 3400). More specifically, FIG. 13 depicts aspects of the execution of the regression routine 2570 by the processor 2550 of the coordinating device 2500 to provide the regression GUI 3700. FIG. 13 also depicts aspects of the execution of the regression routine 2370 by at least one processor 2350 of the coordinating device 2500 or of the multiple node devices 2300 to perform the regression analysis, including the generation of simulated data. As depicted, the regression routine 2570 may include a simulation component 2571, an equation component 2572, a split-plot component 2573 and/or an interactive analysis component 2579. As also depicted, and similar to the earlier discussed provision of the generation GUI 3100 and the comparison 3400, the regression GUI 3700 may be provided either locally via the display 2580 and the input device 2520 of the coordinating device 2500, or remotely through the network 2999 and via the display 2780 and the input device 2720 of the viewing device 2700.

In executing the regression routine 2570, the processor 2550 may be caused to execute the interactive analysis component 2579 to recurringly derive numerical values and/or generating executable instructions as part of guiding an operator through preparations for and/or performance of the regression analysis with a selected experiment design. Also, the processor 2550 may be caused to do so as various parameters for the performance of the regression analysis are provided. Thus, the processor 2550 may be caused to execute the interactive analysis component 2579 at least partially in parallel with one or more of the other components 2571-2573.

Figure 14A:
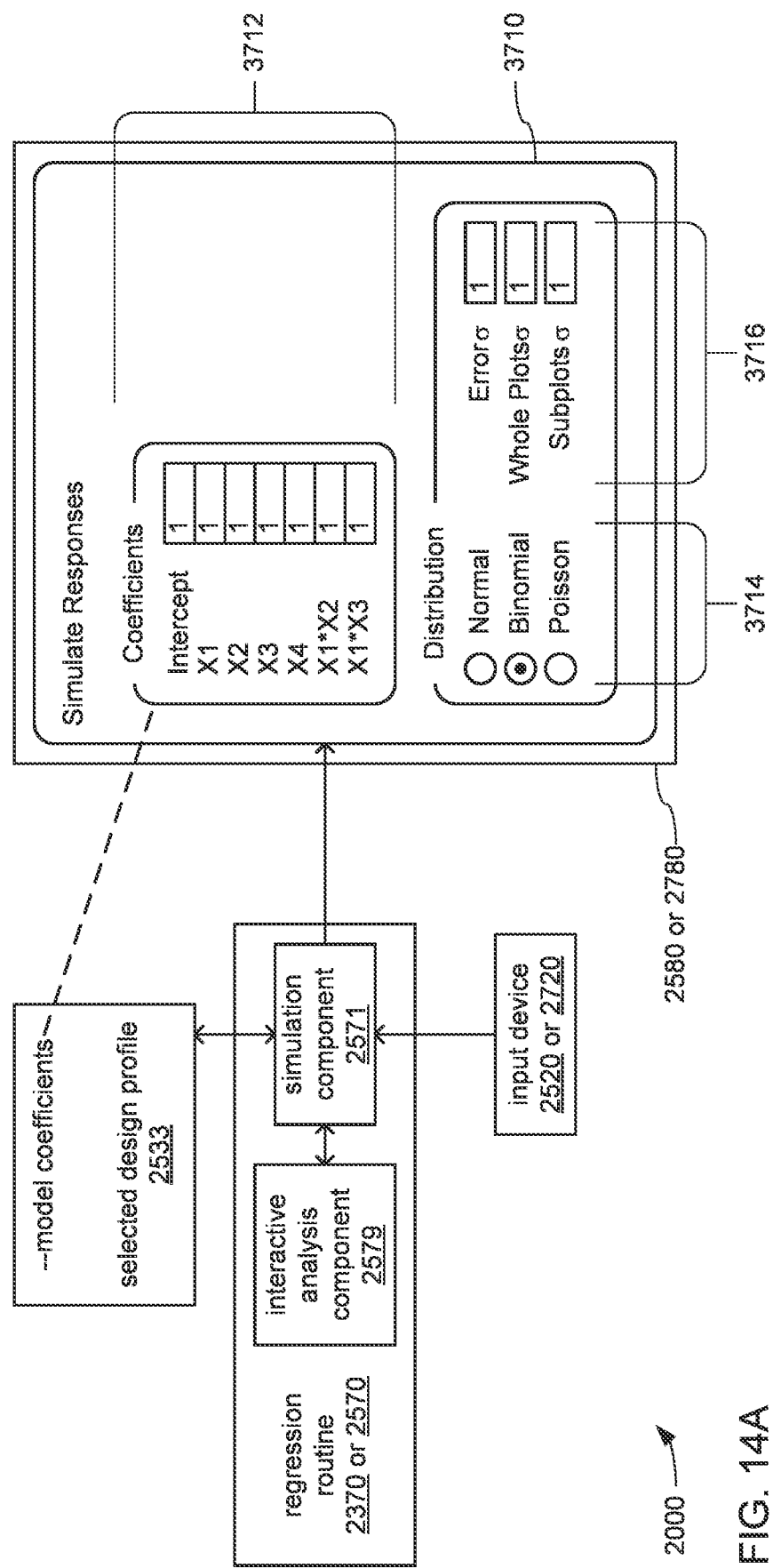
FIGS. 14A, 14B, 14C, 14D and 14E, together, illustrate additional details of the guidance of performance of the regression analysis of FIG. 13.

FIG. 14A depicts aspects of the provision of the GUI portion 3710 to guide the provision of various parameters for the performance of the regression analysis with a selected experiment design in greater detail. Where the selected experiment design on which the regression analysis to be performed is an experiment design that was selected from among the earlier discussed candidate experiment designs, the guiding of an operator via the GUI 3400 to select one of the candidate experiment designs for regression analysis may have resulted in the processor 2550 being caused to store various parameters that define the selected experiment design as part of its corresponding candidate design profile 2532, and a copy of that candidate design profile 2532 may then be provided to the regression routine 2570 as the selected design profile 2533. Alternatively or additionally, the processor 2550 may be caused by execution of the regression routine 2570 to provide an opportunity within the regression GUI 3700 for the operator to select an experiment design from among the available experiment designs with the design profile data 2530 to become the selected experiment design with which regression is to be performed, and a copy of its corresponding available design profile 2531 may then be provided to the regression routine 2570 as the selected design profile 2533.

In executing the simulation component 2571, the processor 2550 may be caused to present a set of entry boxes 3712 or other similar visual elements in the GUI portion 3710 in which default coefficients of the model associated with the selected experiment design may be visually presented, and/ or by which an operator may provide alternate coefficients. In some embodiments, the default coefficients may be retrieved by the processor 2550 from the selected design profile 2533, which may have been copied from one of the candidate design profiles 2532, as previously discussed. Thus, the default coefficients may have been introduced during the comparison of the candidate experiment designs, where the same coefficients may have been used across all of the candidate experiment designs. However, as has been discussed, the default coefficients may have been provided through the use of the generation GUI 3100 to enter a definition of the experiment design and its associated model, including the coefficients.

Also in executing the simulation component 2571, the processor 2550 may be caused to present prompts for the provision of various parameters for the generation of simulated data. More specifically, the processor 2550 may be caused to present "radio buttons" 3714 or another type of selectable visual element in the GUI portion 3710 by which one of a list of types of distribution for the generation of the simulated data may be selected. Alternatively or additionally, the processor 2550 may be caused to present one or more entry boxes 3716 or other similar visual elements in the GUI portion 3710 in which default parameters for degree of error may be visually presented, and/or by which an operator may provide alternate parameters for degree of error. As depicted, a single entry box may be presented in which a single error parameter may be specified that may be applicable to all factors, or one or more additional entry boxes may also be presented in which one or more separate additional error parameters may be specified for one or more factors that are indicated as difficult to vary in a split-plot or split-split-plot experiment design.

Figure 14B:
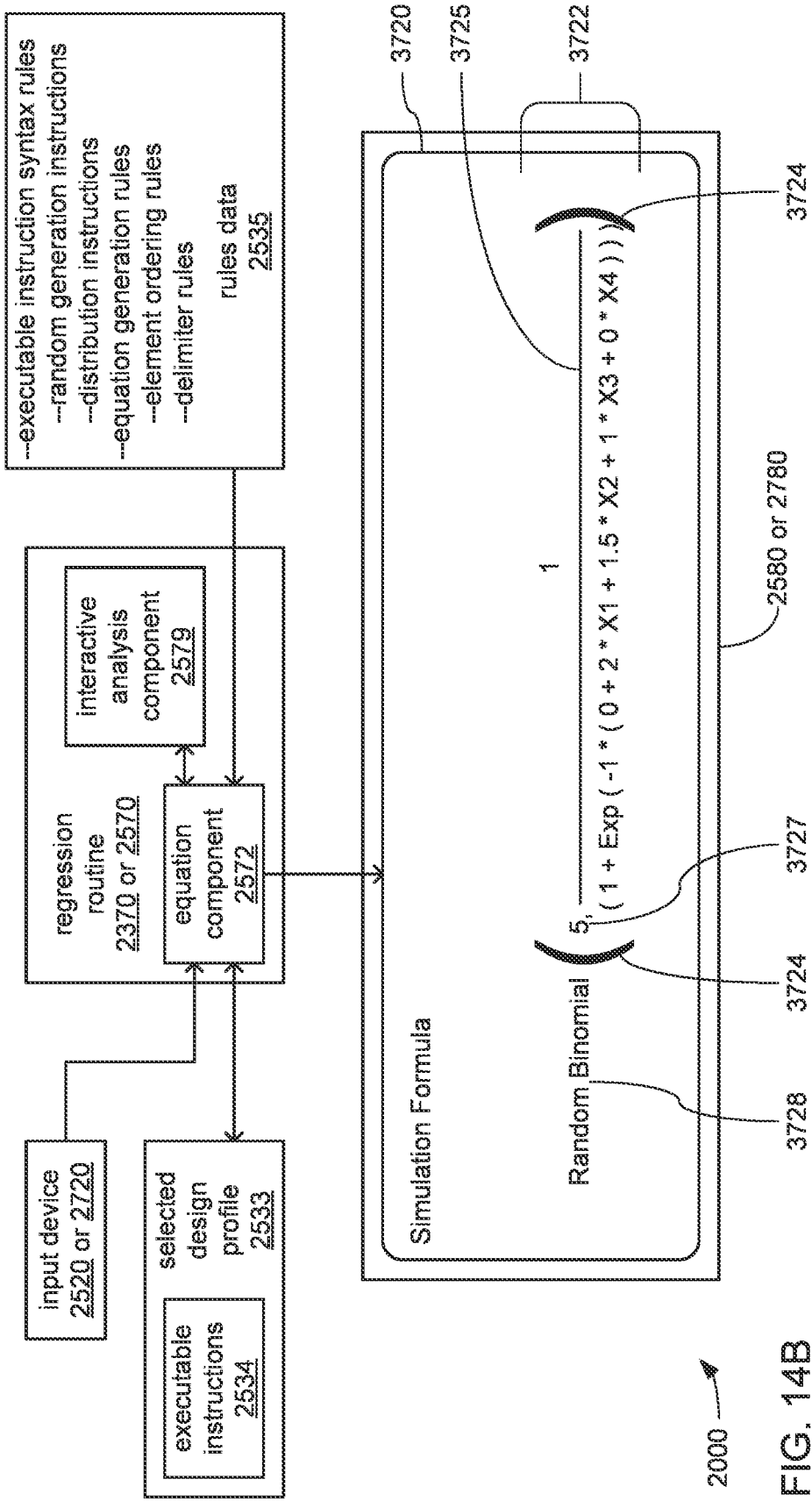

FIG. 14B depicts aspects of the provision of the GUI portion 3720 to guide the generation and consideration of executable instructions that, when executed, control the performance of the regression analysis, including the manner in which simulated data used in the regression analysis is to be generated. In executing the equation component 2572, the processor 2550 may be caused to first generate executable instructions 2534 that may be executed by one or more processors (e.g., the processor 2550 or the one or more processors 2350) to perform the regression analysis with the selected experiment design defined in the selected design profile 2533. In generating the executable instructions 2534, the processor 2550 may be caused to retrieve one or more rules from the rules data 2535 that may include syntax rules to be followed in generating the executable instructions 2534, and such rules may be associated with and/or explicitly specify a pre-selected programming language. Alternatively or additionally, the processor 2550 may be caused to retrieve one or more pre-selected algorithms and/or portions of executable instructions that implement one or more pre-selected algorithms for the random generation of simulated data, including doing so in a manner that results in the simulated data having the type of distribution selected via the previously discussed GUI portion 3710. Also, In generating the executable instructions 2534, the processor 2550 may be caused to incorporate various parameters that may be provided to control the performance of the regression analysis, including and not limited to, the terms of the associated model that have been selected for inclusion in the selected experiment design, various characteristics of the factors from which the terms are formed, the coefficients for the terms and any intercept value, various characteristics of the responses, the quantity of runs, input values to be given to the factors, and/or a quantity of iterations to be performed of the regression analysis (including iterations of generating simulated data). Following the generation of the executable instructions 2534, the processor 2550 may be caused to store the executable instructions 2534 as part of the selected design profile 2533.

Also in executing the equation component 2572, the processor 2550 may be caused to generate a human readable expression 3722 of a portion of the executable instructions 2534 that includes, and is not limited to including, the terms and/or coefficients of the associated model in mathematical notation, and/or an identifier of the selected type of distribution 3728 for the simulated data and/or of the quantity of iterations 3727 of the regression analysis to be performed. The processor 2550 may then be caused to present the human readable expression 3722. In generating the executable instructions 2534, the processor 2550 may be caused to retrieve one or more rules from the rules data 2535 for generating the human readable expression 3722, such as ordering of various elements, and/or mathematical notation syntax rules concerning delimiters that may be used to separate and organize the various elements. By way of example, in employing mathematical notation syntax rules, the processor 2550 may be caused to separate various elements with pairs of brackets 3724 and/or one or more of a vinculum 3725 (e.g., to separate a numerator from a denominator in expressing a division operation).

In executing the interactive analysis component 2579 at least partially in parallel with the equation component 2742, the processor 2550 may be caused to respond to each provision and/or change in a parameter for performing the regression analysis by recurringly regenerating the executable instructions 2534, and/or by recurringly regenerating and/or re-presenting the human readable expression 3722 of a portion of the executable instructions 2534. The parameters that, upon being provided and/or changed through use of the GUI portion 3710 and/or other GUI portions, may trigger such recurring operations by the processor 2550 may include, and are not limited to, the coefficients, the intercept value, the type of distribution, degree(s) of error and/or the quantity of iterations of the regression to be performed.

Figure 14C:
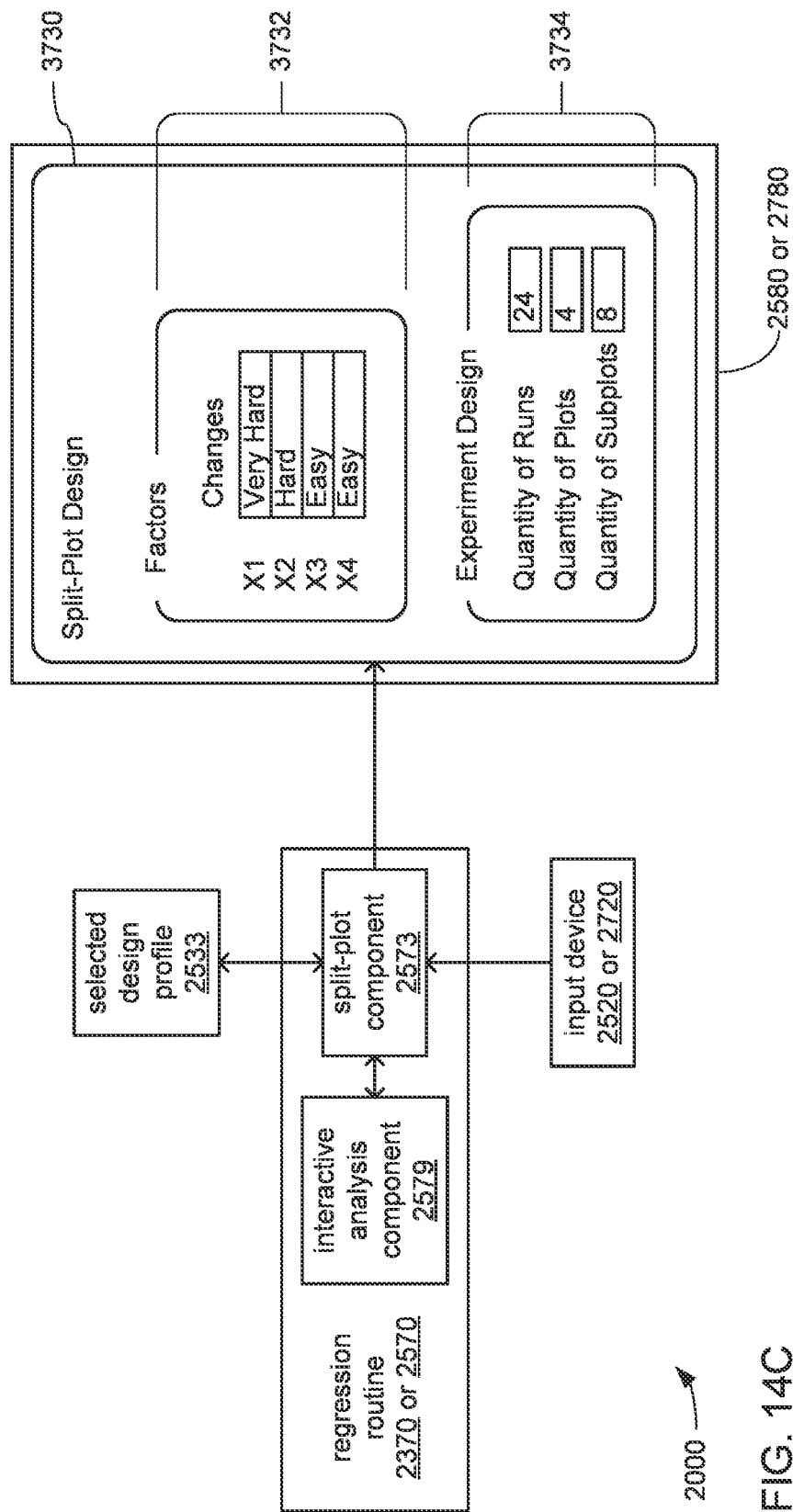
Figure 14D:
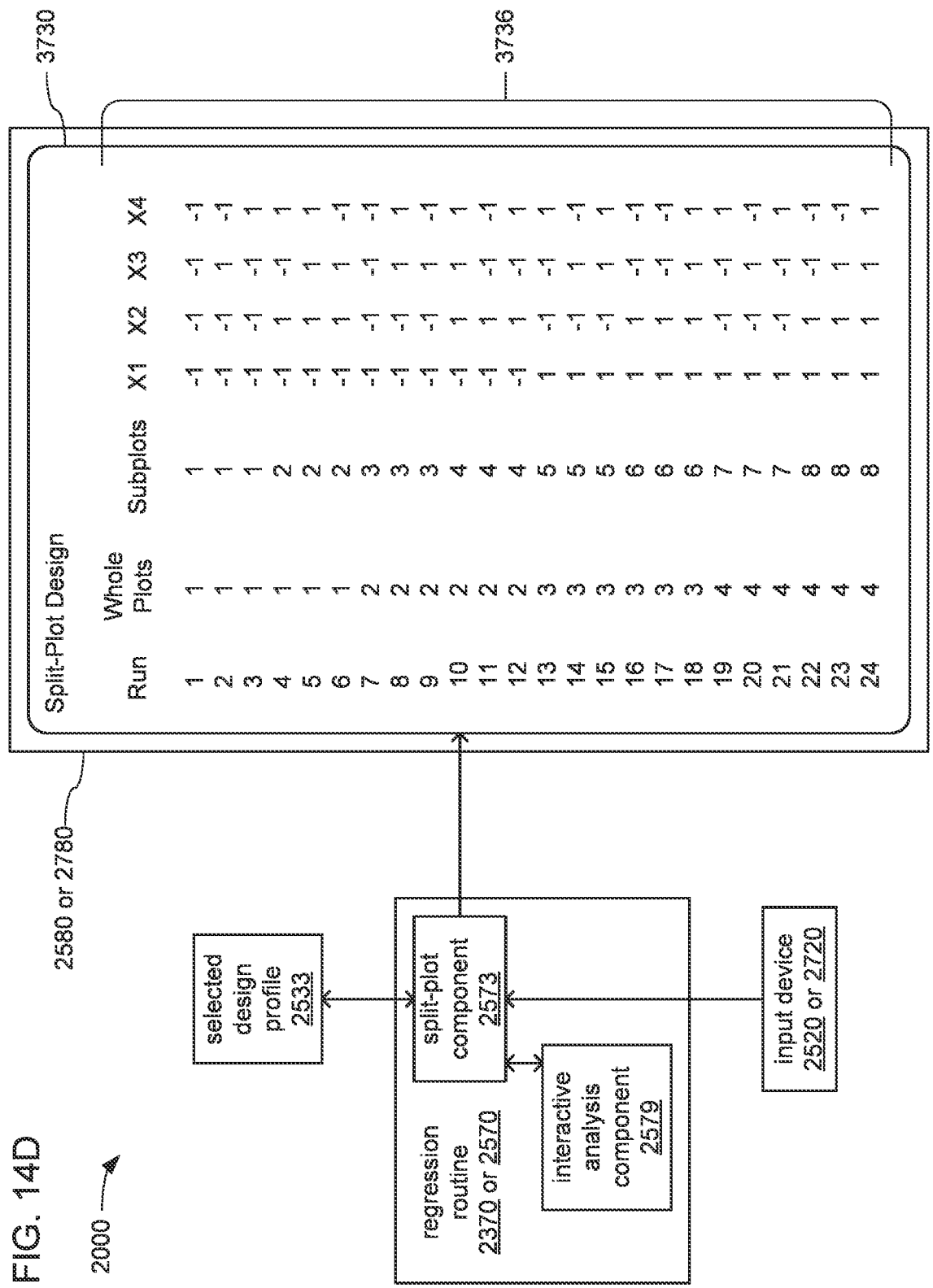

FIGS. 14C and 14D, together, depict aspects of the provision of the GUI portion 3730 to guide the provision of parameters and generation of portions of the executable instructions 2534 associated with the selected experiment design becoming a split-plot or split-split-plot design.

Turning more specifically to FIG. 14C, in executing the split-plot component 2573, the processor 2550 may be caused to present a set of entry boxes 3732 or other similar visual elements in the GUI portion 3730 in which a single default degree of difficulty in varying all factors may be visually presented, but by which an operator may provide one or more alternate indications of degree of difficulty in varying one or more of the factors. Also in executing the split-plot component 2573, the processor 2550 may be caused to present one or more other entry boxes 3734 or other similar visual elements in the GUI portion 3730 in which, at least initially, a default parameter for quantity of runs may be visually presented. However, in response to the entry of one or more degrees of difficulty in varying a factor are entered into one or more of the entry boxes 3732, the processor 2550 may be caused to augment the single entry box 3734 for quantity of runs with one or more additional entry boxes 3734 for quantity of plots and/or subplots, depending on whether the selected experiment design is caused to become a split-plot experiment design or split-split-plot experiment design.

In executing the interactive analysis component 2579 at least partially in parallel with the split-plot component 2743, the processor 2550 may be caused to respond to each provision and/or change in a parameter indicative of a split-plot experiment design or split-split-plot experiment design by recurringly regenerating and re-presenting one or more of the GUI portions 3710, 3720 and 3730 to prompt the operator to provide further parameters. By way of example, the processor 2550 may be caused to regenerate and re-present the GUI portion 3710 with the one or more entry boxes 3716 additionally including an entry box in which a default degree of error for whole plots in at least a split-plot experiment design, and enabling provision of a different degree of error for whole plots by the operator. Also by way of example, the processor 2550 may be caused to augment the GUI portion 3730 to additionally include a table depicting an order in which factors may be varied during the performance of the selected experiment design to minimize the instances in which one or more particular factors may be varied, such as the table 3736 depicted in FIG. 14D.

Alternatively or additionally, in executing the interactive analysis component 2579 at least partially in parallel with the split-plot component 2743, the processor 2550 may be caused to respond to each provision and/or change in a parameter indicative of a split-plot experiment design or split-split-plot experiment design by recurringly regenerating the executable instructions 2534 to accommodate separate degrees of error for each factor indicated as more difficult to vary and/or to accommodate associated changes in the manner in which simulated data is to be generated. Correspondingly, the processor 2550 may be caused to recurringly regenerate and/or re-present the human readable expression 3722 of a portion of the executable instructions 2534.

Figure 14E:
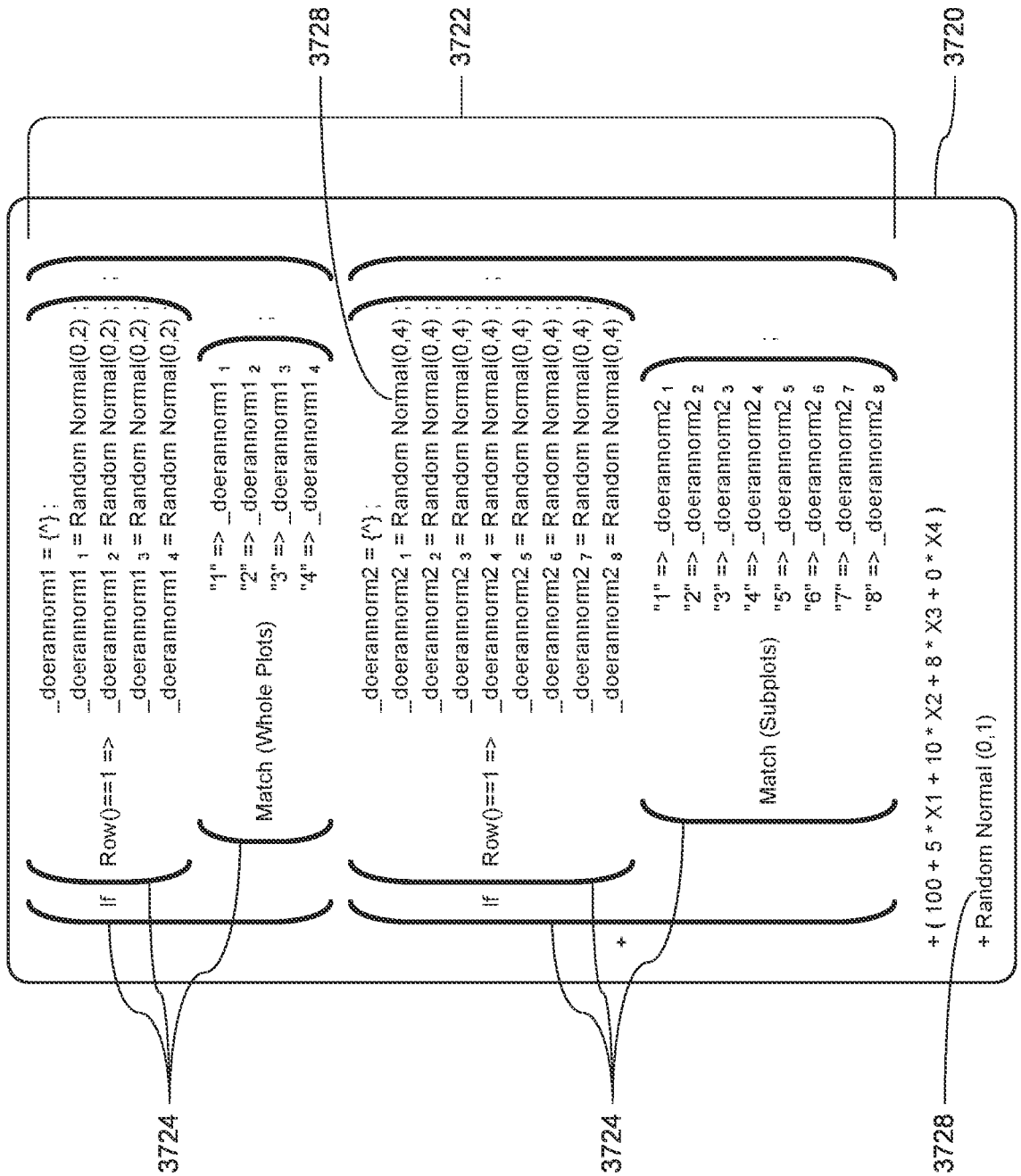

FIG. 14E depicts an example of an alternate human readable expression 3722 that reflects a change of the selected experiment design to a split-split-plot design. As depicted, multiple pairs of brackets 3724 are used to provide clear visual separation of a portion of the executable instructions that minimizes the varying of one factor in whole plots, from another portion that minimizes the varying of another factor in subplots, and from still other portions that implement fully random varying of the remaining factors. Also again, there are explicit identifiers of the type of distribution 3728 selected for the simulated data.

Following completion of the provision of parameters for the performance of the regression analysis with the selected experiment design, and following the generation of the executable instructions 2534 therefrom, the processor 2550 may be caused by further execution of the regression routine 2570 to distribute the executable instructions 2534 to the one or more processors 2350 to cause performance of the regression analysis. Again, in some embodiments, the executable instructions 2534 may be incorporated into or be other accompanied by the selected design profile 2533 such that the selected design profile 2533 may be distributed to the one or more processors 2350. In some embodiments, and in addition to the distribution of the executable instructions 2534, the processor 2550 may be further caused to at least coordinate the distribution of one or more of the data set portions 2131 thereamong. Also again, in various embodiments, the one or more processors 2350 may be incorporated into the multiple node devices 2300 or within the coordinating device. Thus, in differing embodiments, the executable instructions 2534 and/or the one or more data set portions 2131 may be distributed among multiple node devices 2300, or among storage locations within storage 2360 for access by the one or more processors 2350 within the coordinating device 2500.

Regardless of the physical location(s) of the one or more processors 2350, in executing the regression routine 2370, each of the one or more processors 2350, and/or each of the processing cores 2355 of each of the one or more processors 2350, may be caused to execute the executable instructions 2534 distributed thereto, and in so doing, perform at least one iteration of the regression analysis with the selected experiment design. The processor 2550 may be caused by its execution of the regression routine 2570 to coordinate the multiple, and at least partially parallel, performances of the regression analysis. As part of each iteration of each such performance, and as per the executable instructions 2534, simulated data is randomly generated in a manner that meets the specified distribution.

From the iterations of the regression analysis, the results data 2730 may be generated to provide an indication of the results of the regression analysis. As previously discussed, the results data 2730 may be presented by the processor 2550 (e.g., through use of the display 2580 or 2780), or may be transmitted to the viewing device 2700 for presentation to the operator via the processor 2750 thereof. Following the performance of the regression analysis, and in embodiments in which the one or more data devices 2100 control the studied system, the selected design profile 2533 may be transmitted to the one or more data devices 2100 to enable for use thereby in performing the selected experiment design.

Returning to FIGS. 7A and 7B, in various embodiments, each of the processors 2150, 2350, 2550 and 2750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 2550 of the coordinating device 2500 or the controller 2507 may be selected to efficiently perform an analysis of the multiple experiment designs and/or associated models. Alternatively or additionally, the processor 2350 of each of the node devices 2300 may be selected to efficiently perform a regression analysis while generating simulated data at least partially in parallel. By way of example, the processor 2350 may incorporate a single-instruction multiple-data (SIMD) architecture, may incorporate multiple processing pipelines, and/or may incorporate the ability to support multiple simultaneous threads of execution per processing pipeline.

In various embodiments, each of the routines 2140, 2370, 2510, 2540, 2570 and 2740, including the components of which each is composed, may be selected to be operative on whatever type of processor or processors that are selected to implement applicable ones of the processors 2150, 2350, 2550 and/or 2750 within corresponding ones of the devices 2100, 2300, 2500 and/or 2700. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2350, 2550 and/or 2750. Where one or more device drivers are included, those device drivers may provide support for any of a variety of other components, whether hardware or software components, of the devices 2100, 2300, 2500 and/or 2700.

In various embodiments, each of the storages 2160, 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2360 of one or more of the node devices 2300 that stores one or more of the data set portions 2131 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 2520 and 2720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 2580 and 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2580 of the coordinating device 2500 and/or the display 2780 of the viewing device 2700 may be a touch-screen display such that the input device 2520 may be incorporated into the display 2580 and/or the input device 2720 may be incorporated into the display 2780. In such embodiments, the input device 2520 and/or the input device 2720 may be a touch-sensitive component of the display 2580 and/or the display 2780, respectively.

In various embodiments, the network interfaces 2190, 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); the BLUETOOTH® standard; the ZIGBEE® standard; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 2390 of one or more of the node devices 2300 that stores one or more of the data set portions 2131 may be implemented with multiple copper-based or fiber-optic based network interface ports to provide redundant and/or parallel pathways in exchanging one or more of the data set portions 2131 with the one or more storage devices 2100.

Figure 15A:
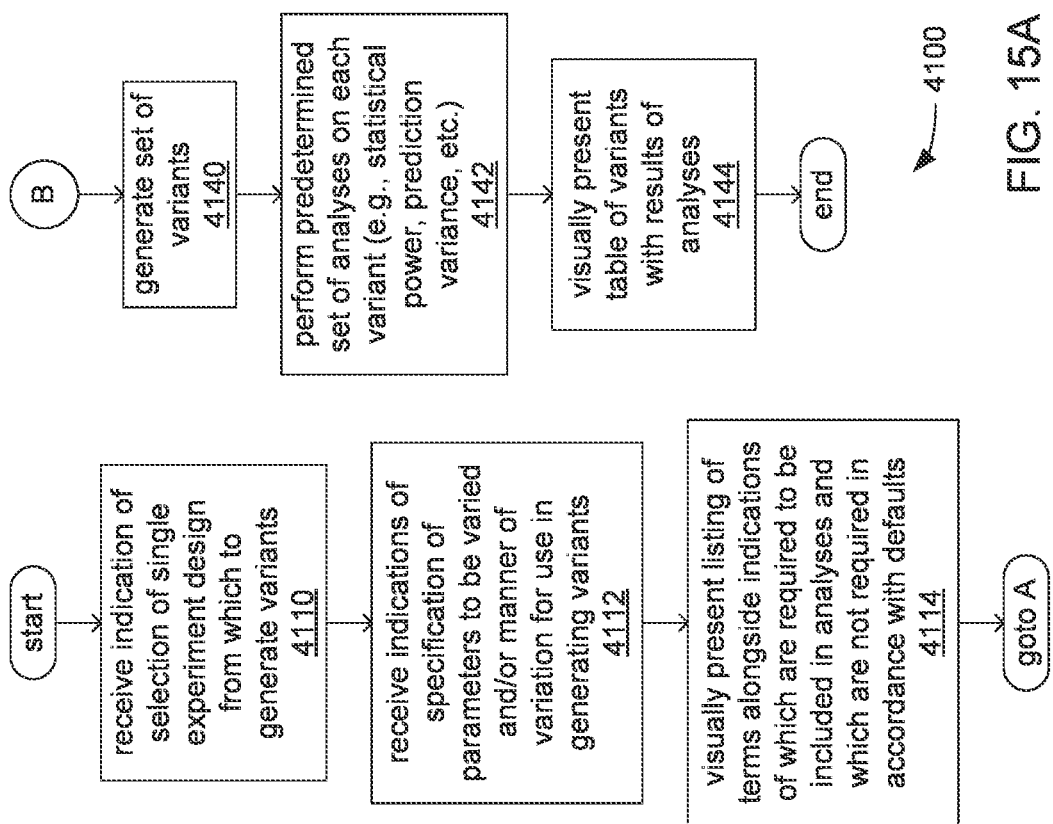

FIGS. 15A and 15B, together, illustrate an example embodiment of a logic flow 4100. The logic flow 4100 may be representative of some or all of the operations executed by one or more embodiments described herein. More specifically, the logic flow 4100 may illustrate operations performed by the processor 2550, and/or performed by other component(s) of the coordinating device 2500 in executing the generation routine 2510 to guide generation, analysis and/or presentation of a set of variants of a single experiment design.

At 4110, a processor of a coordinating device of a distributed processing system (e.g., the processor 2550 of the coordinating device 2500 of the distributed processing system 2000) may receive an indication of the selection a single experiment design from which to generate variants.

At 4112, the processor of the coordinating device may receive indications from the operator of specifications for one or more parameters that are to be varied as part of generating a set of variants of the single experiment design.

At 4114, the processor may visually present a listing of terms of the experiment design alongside indications of which ones are required to be included in the performance of a pre-selected set of analyses on each variant that is to be generated, and indications of which ones are not required (see FIG. 10B). As previously discussed, the indications of terms that are not required to be so included may include (for at least some terms) indications of being conditionally included, if possible.

At 4120, the processor may monitor input device(s) (e.g., the input devices(s) 2520 of the coordinating device 2500 or the input device(s) 2720 of the viewing device 2700) for either input indicative of a command to proceed with generating the set of variants, or input indicative of a change made by an operator to a term from being required to be included in the set of analyses to not being so required (e.g., a change from "necessary" to "if possible"). At 4122, a check is made as to whether an input indicative of such a change has been received. If not, then at 4124, a check is made as to whether the command to generate the set of variants has been received. If so, then the processor is caused to generate the set of variants at 4140.

However, if at 4124, no command to generate the set of variants has been received, then, at 4130, the processor may monitor the input device(s) for either an input indicative of a command to proceed with generating the set of variants, or input indicative of a change made by the operator to a term from not being required to be included in the set of analyses to being so required.

However, if at 4122, input indicative of a change in a term from being required to be included in the set of analyses to not being so required has been received, then at 4123, a check is made as to whether this change results in enabling a change in one or more other terms from not being required to be so included, to being so required. If not, at 4123, then the check is made at 4124 for receipt of a command to generate the set of variants.

However, if at 4123, it is so possible to make such a change to one or more other terms, then the processor may visually present an indication of such a possibility at 4126, before performing the monitoring for input from the input device(s) at 4130.

At 4132, a check is made as to whether an input indicative of a change in a term from not being required to be included in the set of analyses to being required to be so included If not, then at 4134, a check is made as to whether the command to generate the set of variants has been received. If so, then the processor is caused to generate the set of variants at 4140.

However, if at 4134, no command to generate the set of variants has been received, then the processor may return to performing the monitoring at 4120.

However, if at 4132, input indicative of a change in a term from not being required to be included in the set of analyses to being so required has been received, then at 4133, a check is made as to whether this change results in there being too many terms now being required to be so included. If not, at 4133, then the check is made at 4134 for receipt of a command to generate the set of variants.

However, if at 4133, the quantity of terms now required to be included in the set of analyses is greater than can be supported, then the processor may visually present an indication of such an unsupportable condition at 4136, before reversing that change at 4137, and then returning to performing the monitoring for input from the input device(s) at 4120.

At 4140, the processor is caused to generate the set of variants from the single experiment design based on the earlier received parameters. At 4142, the processor performs the set of analyses on each of the variants (e.g., deriving statistical power, prediction variance, etc.).

At 4144, the processor visually presents a table of the set of variants, including values indicative of the results of the set of analyses for each variant (see FIGS. 10C and 10D).

Figure 16:
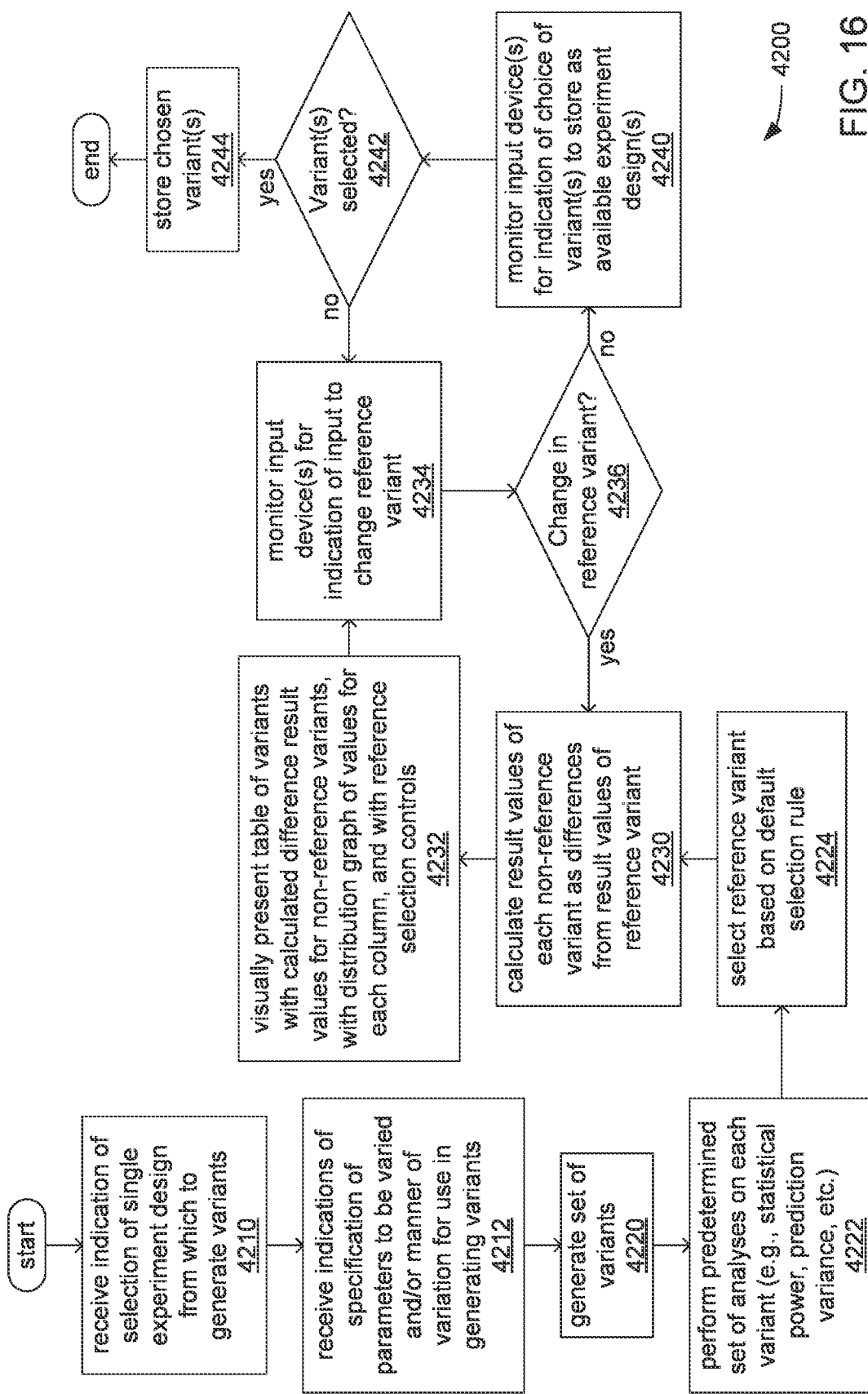
FIG. 16 illustrates an example embodiment of a logic flow of guiding generation, analysis and visual evaluation of a set of variants from a single experiment design.

FIG. 16 illustrates an example embodiment of a logic flow 4200. The logic flow 4200 may be representative of some or all of the operations executed by one or more embodiments described herein. More specifically, the logic flow 4200 may illustrate operations performed by the processor 2550, and/or performed by other component(s) of the coordinating device 2500 in executing the generation routine 2510 to guide generation, analysis and/or evaluation of a set of variants of a single experiment design.

At 4210, a processor of a coordinating device of a distributed processing system (e.g., the processor 2550 of the coordinating device 2500 of the distributed processing system 2000) may receive an indication of the selection a single experiment design from which to generate variants. At 4212, the processor of the coordinating device may receive indications from the operator of specifications for one or more parameters that are to be varied as part of generating a set of variants of the single experiment design.

At 4220, the processor is caused to generate the set of variants from the single experiment design based on the earlier received parameters. At 4222, the processor performs the set of analyses on each of the variants (e.g., deriving statistical power, prediction variance, etc.). At 4224, the processor is caused to automatically select one of the variants to become the reference variant based on one or more rules for making such a default selection.

At 4230, the processor is caused to calculate the values for the results of the analyses performed on each non-reference variant as levels of difference from the values for the results of the analyses performed on the reference variant. At 4232, based at least in part on the result values calculated at 4230, the processor is caused to generate and visually present a table of the set of variants (see FIGS. 10C and 10D). As previously discussed, the table may include header graphs indicative of the distribution of values within each column of the table, and/or may include reference selection controls that enable an operator to dynamically change which variant of the set of variants is now the reference variant.

At 4234, the processor may monitor input device(s) (e.g., the input devices(s) 2520 of the coordinating device 2500 or the input device(s) 2720 of the viewing device 2700) for input indicative of use of the reference selection controls to change the current reference variant. At 4236, a check is made as to whether such an indication of a change in reference variant has been received. If so, then the processor may be caused to repeat the calculation of the result values at 4230 to generate new values for the results that are indicative of differences between the values of each of the non-reference variants and those of the reference variant. As previously discussed, such a recalculation of the result values may be followed by a regeneration of the header graphs to reflect the correspondingly changed distributions of at least the result values.

However, if at 4236, no such input indicative of a change in the reference variant has been received, then at 4240, the processor may monitor the input device(s) for input indicative of a choice of one or more of the variants to be stored as available experiment design(s). At 4242, a check is made as to whether such an indication of a selection of one or more of the variants has been received. If so, then the selected variants are stored as available experiment designs at 4244. However, if not, the processor may return to performing the monitoring for input at 4234.

Figure 17A:
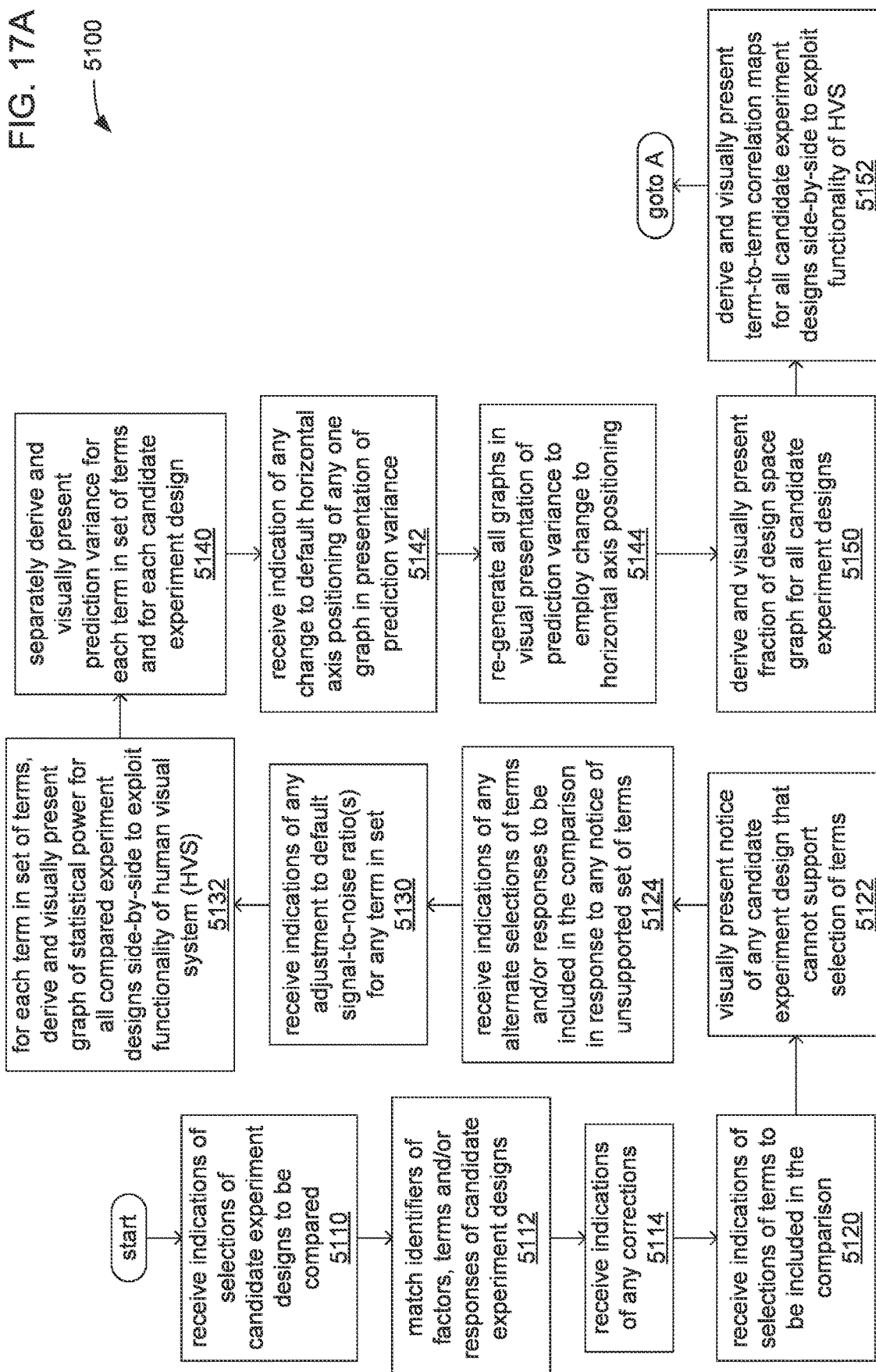
FIGS. 17A and 17B, together, illustrate an example embodiment of a logic flow of guiding generation, selection and performances of regression analyses with experiment designs of FIG. 15.
Figure 17B:
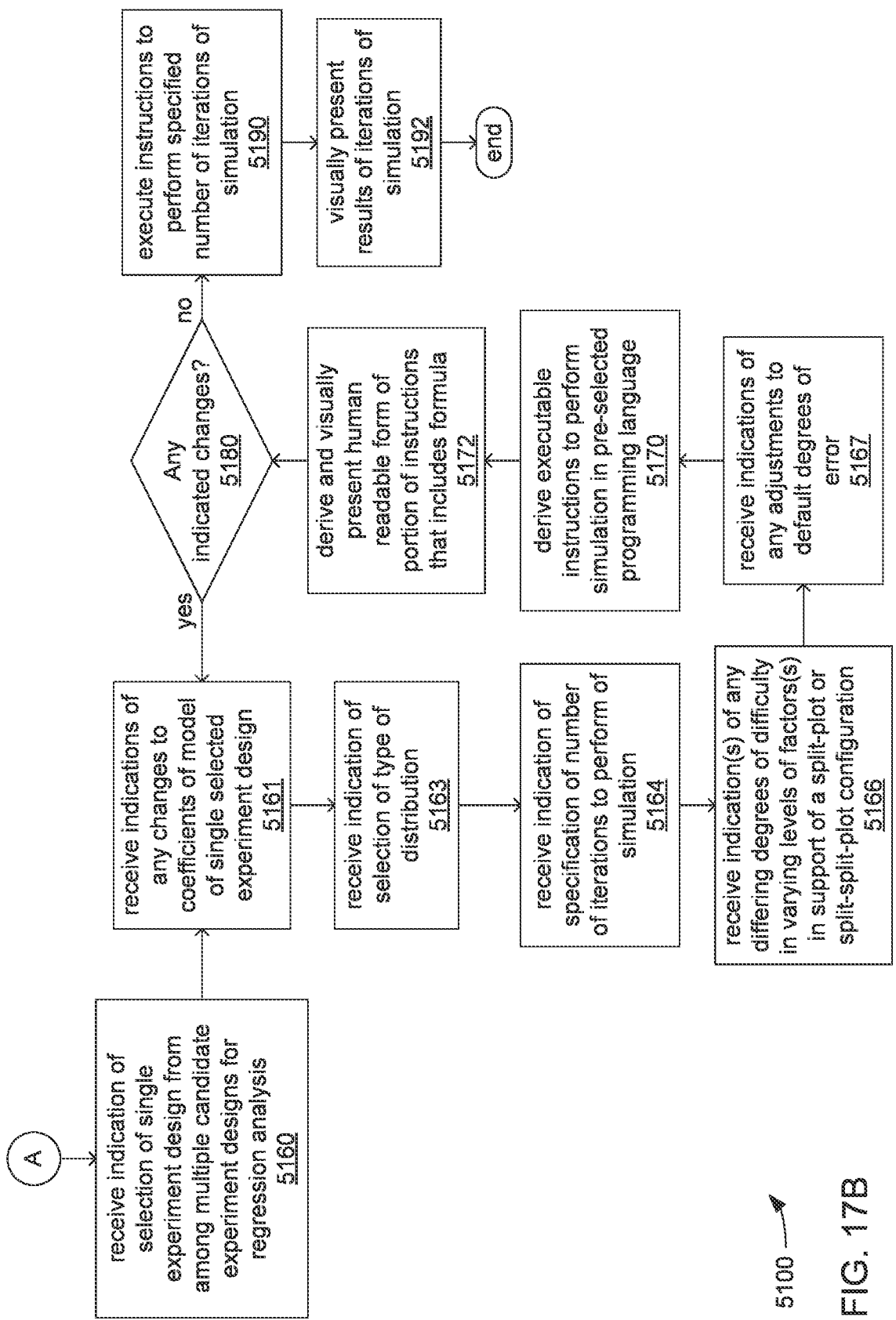

FIGS. 17A and 17B, together, illustrate an example embodiment of a logic flow 5100. The logic flow 5100 may be representative of some or all of the operations executed by one or more embodiments described herein. More specifically, the logic flow 5100 may illustrate operations performed by the processor 2550 and/or the one or more processors 2350, and/or performed by other component(s) of each of the coordinating device 2500 and/or the multiple node devices 2300, respectively, in executing corresponding ones of the design routine 2540, the regression routine 2570 and/or the regression routine 2370 to guide selection of, and the performance of a regression analysis with, a single experiment design for use.

At 5110, a processor of a coordinating device of a distributed processing system (e.g., the processor 2550 of the coordinating device 2500 of the distributed processing system 2000) may receive indications of selections of two or more candidate experiment designs to be compared. As previously discussed, the processor 2550 may present the GUI portion 3410 (see FIG. 12A) to guide an operator of the coordinating device 2500 (either directly or remotely through another device, such as the viewing device 2700) to provide input indicating such selections.

At 5112, the processor of the coordinating device may employ various characteristics of the factors, terms and/or responses of each of the models associated with one of the candidate experiment designs to identify and present matches thereamong. At 5114, the processor may receive indications from the operator of corrections to one or more of such automatically identified matches. If any such indications are received, the processor may effect such corrections by changing one or more matches so indicated as being in error. As previously discussed, in addition to effecting such corrections, the processor may also be caused to store indications of such corrections by storing indications of learned matches for future use.

At 5120, the processor of the coordinating device may receive indications of selections of terms that are to be included in the set of terms to be used in the comparisons among the candidate experiment designs. At 5122, the processor may be caused to present an indication that the set of terms is not able to be supported by one or more of the candidate experiment designs such that one or more of the terms within the set needs to be removed so that the set is able to be supported. At 5124, where such an indication was presented by the processor, the processor may receive indications of an alternate selection of one or more terms for inclusion in the set of terms for comparison. As previously discussed, the processor 2550 may present the GUI portion 3410 to guide the operator to provide input indicating such selections, including generating and visually presenting the notice 3416 (see FIG. 12A) to the effect that the set of terms current selected is not supportable.

At 5130, the processor of the coordinating device may receive indications of an adjustment to the signal-to-noise ratio(s) to which one or more of the terms may be subject. At 5132, the processor may derive the statistical power of each term and for each of the candidate experiment designs. The processor may then generate a graph, for each term, that plots the statistical power of that term across all of the candidate experiment designs. The processor may further visually present all of the graphs (one per term) adjacent to each other in a manner that may form a horizontally extending row of the graphs (i.e., side-by-side) to exploit the innate left-right feature comparison capabilities of the HVS. As previously discussed, for each such graph of the set of graphs 3434 of statistical power vs. candidate experiment design in GUI portion 3400 (see FIG. 12C), the processor 2550 may be further caused to fit a curve to the plotted points of statistical power vs. candidate experiment design.

At 5140, the processor of the coordinating device may derive the prediction variance of each term and for each of the candidate experiment designs. The processor may then generate a graph, for each term and for each candidate experiment design, that plots the prediction variance, and present those graphs in adjacent to each other in multiple horizontal rows where each row corresponds to one of the candidate experiment designs. At 5142, the processor may receive indications from the operator of a change to the default horizontal positioning within the design space of a vertical line. At 5144, if such an indication is received, the processor may effect such corrections by regenerating all of the graphs to reflect the new horizontal positioning.

At 5150, the processor of the coordinating device may derive and present a combined graph that overlays the fraction of design space for all of the candidate experiment designs. At 5152, the processor may derive the degree of correlation between each possible pair of terms that may be formed from the set of terms selected for use in the comparisons of the candidate experiment designs. The processor may then generate and visually present a correlation graph, one each per candidate experiment design, where all of the terms are arranged in identical order along each of the horizontal and vertical axes, and in which visual indicators are positioned at each intersection within the graph that corresponds to one of the possible pairs of terms. The processor may further present the correlation graphs adjacent to each other and arranged horizontally in a single row (e.g., side-by-side) to exploit the left-right feature comparison capabilities of the HVS. As previously discussed, the visual indicators used may be selected from a scale of visual indicators that may form a scale of progressive transition from one color to another, a progressive transition between light and dark on a grayscale, etc., that may be presented as part of the GUI portion 3460 (see FIG. 12F).

At 5160, the processor of the coordinating device may receive an indication of a selection of an experiment design that may be from among the multiple candidate experiment designs, for regression analysis. At 5161, the processor may receive an indication of a change to default coefficient(s) for one or more of the terms of the model associated with the selected experiment design. At 5163, the processor may receive an indication of a selection of a type of distribution for the random generation of simulated data. At 5164, the processor may receive an indication of a quantity of iterations of the regression analysis to be performed. As previously discussed, the processor 2550 may be caused to present GUI portion 3710 to guide an operator through providing such parameters (see FIG. 14A).

At 5166, the processor of the coordinating device may receive an indication of there being a higher degree of difficulty in varying one or more particular factors than for the other factors. At 5167, the processor may receive an indication of the one or more particular factors having a higher degree of difficulty in being varied also being subject to a different degree of error. As previously discussed, the processor 2550 may be caused to present GUI portion 3730 to guide an operator through providing such parameters (see FIG. 14C). As also previously discussed, following receipt of an indication of there being a different degree of difficulty in varying one or more particular factors, the processor 2550 may be caused to present additional prompts to additionally guide an operator through providing separate additional parameters for whole plots and/or subplots, such as the additional entry boxes 3716 by which separate degrees of error may be provided for whole plots and/or subplots.

At 5170, based on the parameters provided by the operator and/or from any unchanged default parameters, the processor of the coordinating device may be caused to generate a sequence of executable instructions (e.g., the executable instructions 2534) in a pre-selected programming language for performing the regression analysis. At 5172, the processor may also be caused to generate and visually present a human readable form of a portion of the executable instructions that employs the mathematical syntax of a formula to expresses the performance of the regression analysis (e.g., the human readable expression 3722, examples of which are depicted in FIGS. 14B and 14E). As previously discussed, such a human readable expression may include the values of the coefficients and/or any intercept, may specify the selected type of distribution to be achieved in the random generation of simulated data, and/or may specify the quantity of iterations of the regression analysis to be performed.

At 5180, the processor of the coordinating device may check whether any indication has been received of operation of an input device to make changes to one or more of the earlier provided parameters. If so, then the processor may return to receiving and/or acting on the provision of revised versions of various parameters at 5161 through 5167.

However, if at 5180, there are no such indications of changes to parameters, then at 5190, the processor of the coordinating device may proceed with either directly executing the executable instructions to perform the specified quantity of iterations of the regression analysis, or may coordinate the distribution and performance of the iterations of the regression analysis by multiple other processors and/or processor cores (e.g., the one or more processors 2350 and/or processor cores 2355). As previously discussed, such other processors and/or processor cores may be incorporated into multiple node devices with which the coordinating device may communicate via a network (e.g., the multiple node devices 2300 via the network 2999). Alternatively, and as also previously discussed, such other processor(s) and/or processor cores may be incorporated into the coordinating device (e.g., as one or more GPUs).

Upon completion of the specified quantity of iterations of the regression analysis, the processor of the coordinating device may visually present the results thereof at 5192.

Figure 18:
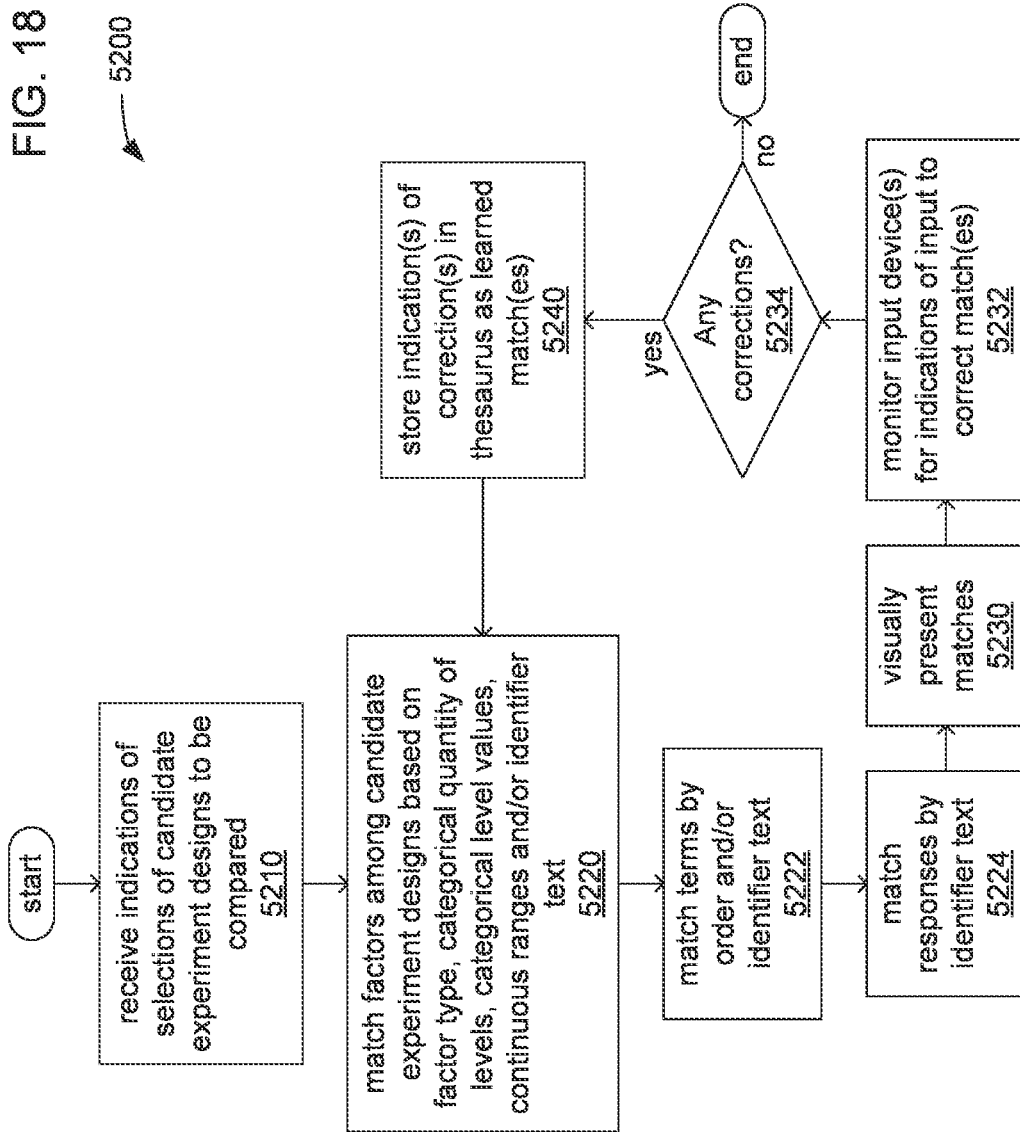
FIG. 18 illustrates an example embodiment of a logic flow of matching factors among experiment designs in the guidance of selection of an experiment design of FIGS. 16A-B.

FIG. 18 illustrates an example embodiment of a logic flow 5200. The logic flow 5200 may be representative of some or all of the operations executed by one or more embodiments described herein. More specifically, the logic flow 5200 may illustrate operations performed by the processor 2550, and/or performed by other component(s) of the coordinating device 2500 in executing the design routine 2540 to guide selection of a single experiment design for use.

At 5210, a processor of a coordinating device of a distributed processing system (e.g., the processor 2550 of the coordinating device 2500 of the distributed processing system 2000) may receive indications of selections of two or more candidate experiment designs to be compared. Again, as previously discussed, the processor 2550 may present the GUI portion 3410 (see FIG. 12A) to guide an operator of the coordinating device 2500 to provide input indicating such selections.

At 5220, the processor of the coordinating device may employ various characteristics of the factors of each of the models associated with one of the candidate experiment designs to identify matches thereamong. Among the characteristics that the processor may be caused to use, at least initially, may include, and are not limited to, type of factor (e.g., continuous or categorical), quantities of levels and/or values of the levels for each categorical factor (if any), ranges of values (e.g., the minimum and maximum values of the range of values) for each continuous factor (if any). Where there remain factors yet to be matched, or where there is otherwise remaining uncertainty in the identification of matches between factors, the processor may also employ the texts and/or the meanings of the texts of the identifiers given to each factor. As has been discussed, the processor may employ vocabulary data that may include a thesaurus (e.g., the vocabulary data 2533) in such text-based identification of matches.

At 5222, the processor of the coordinating device may employ various characteristics of the terms of the models associated with one of the candidate experiment designs to identify matches thereamong, including and not limited to, the order of each term (e.g., first order, second order, third order, etc.). Where there remain terms yet to be matched, or where there is otherwise remaining uncertainty in the identification of matches between terms, the processor may also employ the texts and/or the meanings of the texts of the identifiers given to each term.

At 5224, the processor of the coordinating device may employ at least the texts and/or the meanings of the texts of the identifiers given to each response to identify matches thereamong.

At 5230, the processor of the coordinating device may present the matches identified by the processor among factors, terms and/or responses. As previously discussed, the processor 2550 may present such matches through the presentation of the GUI portion 3420 (see FIG. 12B) as part of guiding an operator of the coordinating device 2500 (either directly or remotely through another device, such as the viewing device 2700) to provide input indicating such selections. At 5232, the processor of the coordinating device may monitor one or more input devices for indications of entry of input conveying one or more corrections to the matches identified by the processor at 5220-5224.

At 5234, if such input is received, then the processor of the coordinating device may store an indication of the correction along with and/or as part of the thesaurus. The processor may then repeat some or all of the work of identifying matches at 5220-5224.

Figure 19:
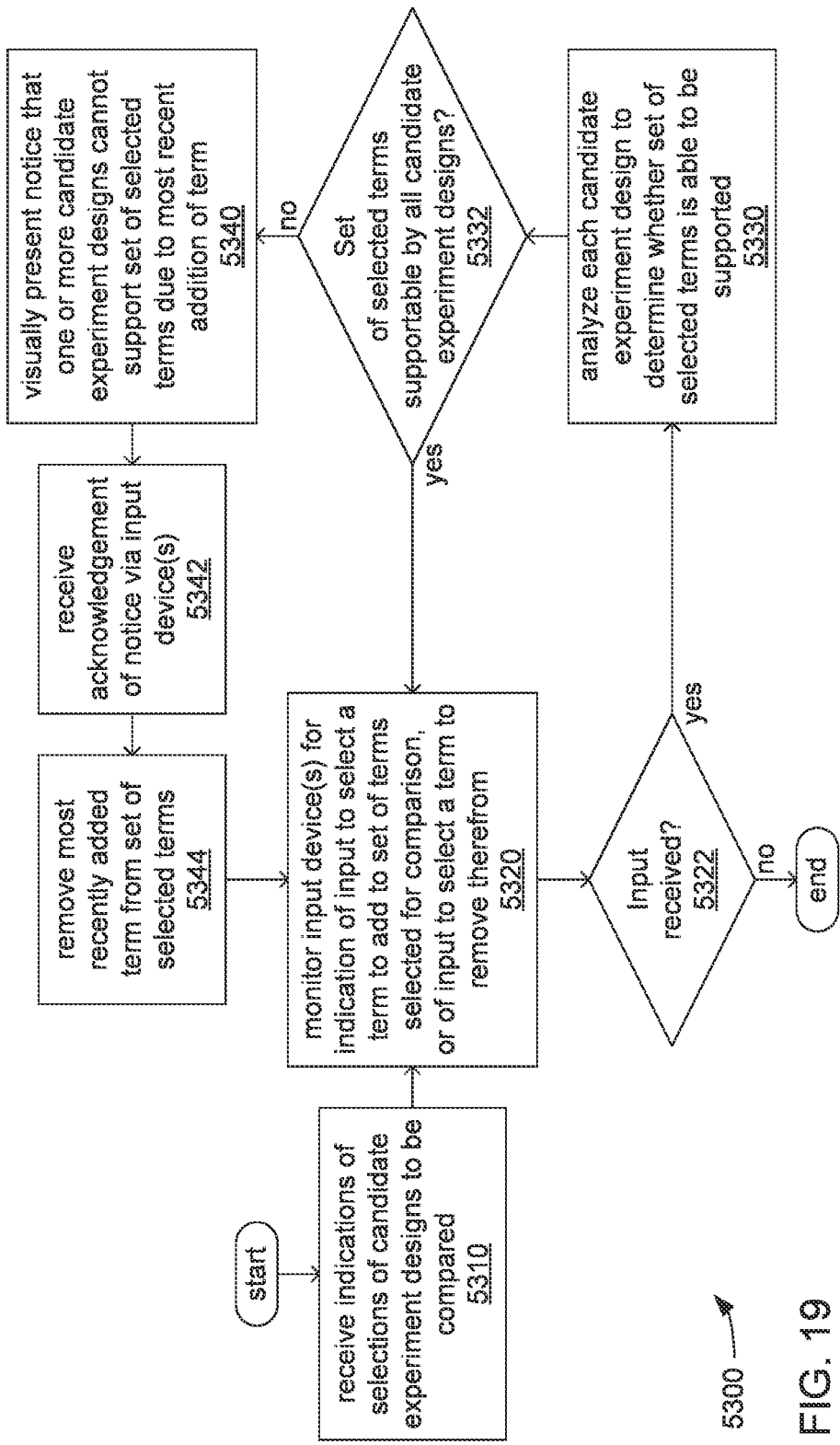
FIG. 19 illustrates an example embodiment of a logic flow of guiding selection of terms in the guidance of selection of an experiment design of FIGS. 16A-B.

FIG. 19 illustrates an example embodiment of a logic flow 5300. The logic flow 5300 may be representative of some or all of the operations executed by one or more embodiments described herein. More specifically, the logic flow 5300 may illustrate operations performed by the processor 2550, and/or performed by other component(s) of the coordinating device 2500 in executing the design routine 2540 to guide selection of a selected experiment design for use.

At 5310, a processor of a coordinating device of a distributed processing system (e.g., the processor 2550 of the coordinating device 2500 of the distributed processing system 2000) may receive indications of selections of two or more candidate experiment designs to be compared. Again, as previously discussed, the processor 2550 may present the GUI portion 3410 (see FIG. 12A) to guide an operator of the coordinating device 2500 to provide input indicating such selections.

At 5320, the processor of the coordinating device may monitor one or more input devices for indications of entry of input indicative of a selection of a term to add to the set of terms to be included in the comparison.

At 5322, if such input is received, then at 5330, the processor of the coordinating device may analyze each of the candidate experiment designs to determine whether one or more of them are unable to support the set of terms selected for inclusion in the comparison following the addition of the just selected term to the set. If, at 5332, the resulting set of terms is supportable by all of the candidate experiment designs, then the processor may return to monitoring one or more input devices at 5320.

However, if at 5332, the set of terms selected for inclusion in the comparison is not supportable by all of the candidate experiment designs, then at 5340, the processor may be caused to present a notice that the set of terms is not able to be supported by one or more of the candidate experiment designs. At 5342, the processor may receive an indication of reception of input indicating an acknowledgement of the notice. In response, the processor may remove the term most recently selected for addition to the set at 5344, and return to monitoring one or more input devices at 5320.

Figure 20:
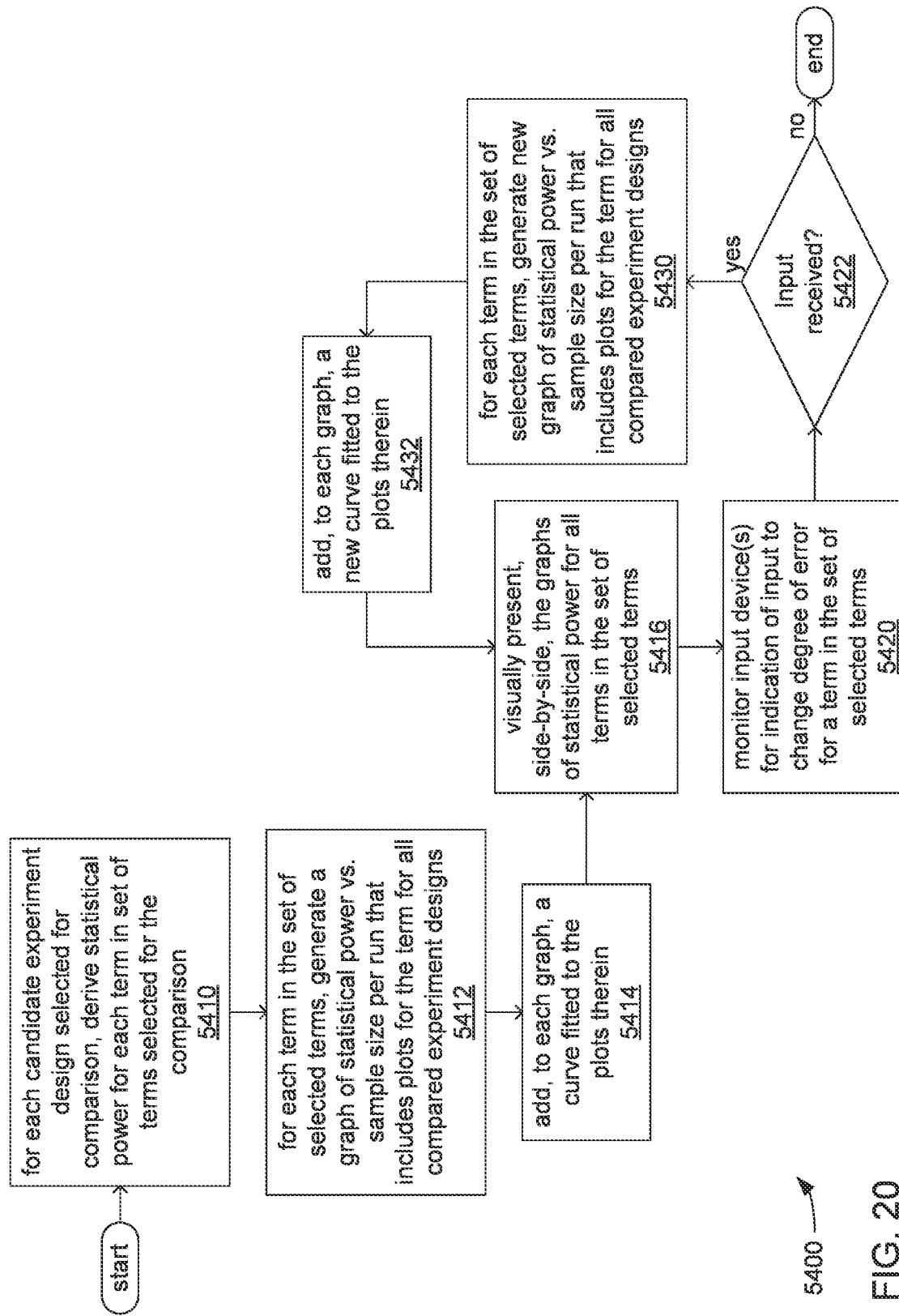
FIG. 20 illustrates an example embodiment of a logic flow of deriving and presenting statistical power in the guidance of selection of an experiment design of FIGS. 16A-B.

FIG. 20 illustrates an example embodiment of a logic flow 5400. The logic flow 5400 may be representative of some or all of the operations executed by one or more embodiments described herein. More specifically, the logic flow 5400 may illustrate operations performed by the processor 2550, and/or performed by other component(s) of the coordinating device 2500 in executing the design routine 2540 to guide selection of a single experiment design for use.

At 5410, a processor of a coordinating device of a distributed processing system (e.g., the processor 2550 of the coordinating device 2500 of the distributed processing system 2000) may derive a statistical power for each term in a set of terms to be included in a comparison of multiple candidate experiment designs, and separately for each one of the candidate experiment designs. At 5412, the processor may then generate, for each term of the set of terms, a graph that plots the statistical power of that term across all of the candidate experiment designs. At 5414, within each of the graphs, the processor may then fit a curve to the plots of the corresponding term for all of the candidate experiment designs. At 5416, the processor may visually present all of the graphs (again, each one corresponding to one of the terms of the set) adjacent to each other in a manner that may form a horizontally extending row of the graphs (i.e., side-by-side) to exploit the innate left-right feature comparison capabilities of the HVS.

At 5420, the processor of the coordinating device may monitor one or more input devices for indications of entry of input indicative of a change to a degree of error for a term in the set of terms. If, at 5422, such input is received, then at 5430, the processor may generate, for each term of the set of terms, a new graph that plots the statistical power of that term across all of the candidate experiment designs. At 5432, within each of the new graphs, the processor may then fit a new curve to the new plots of the corresponding term for all of the candidate experiment designs.

Figure 21:
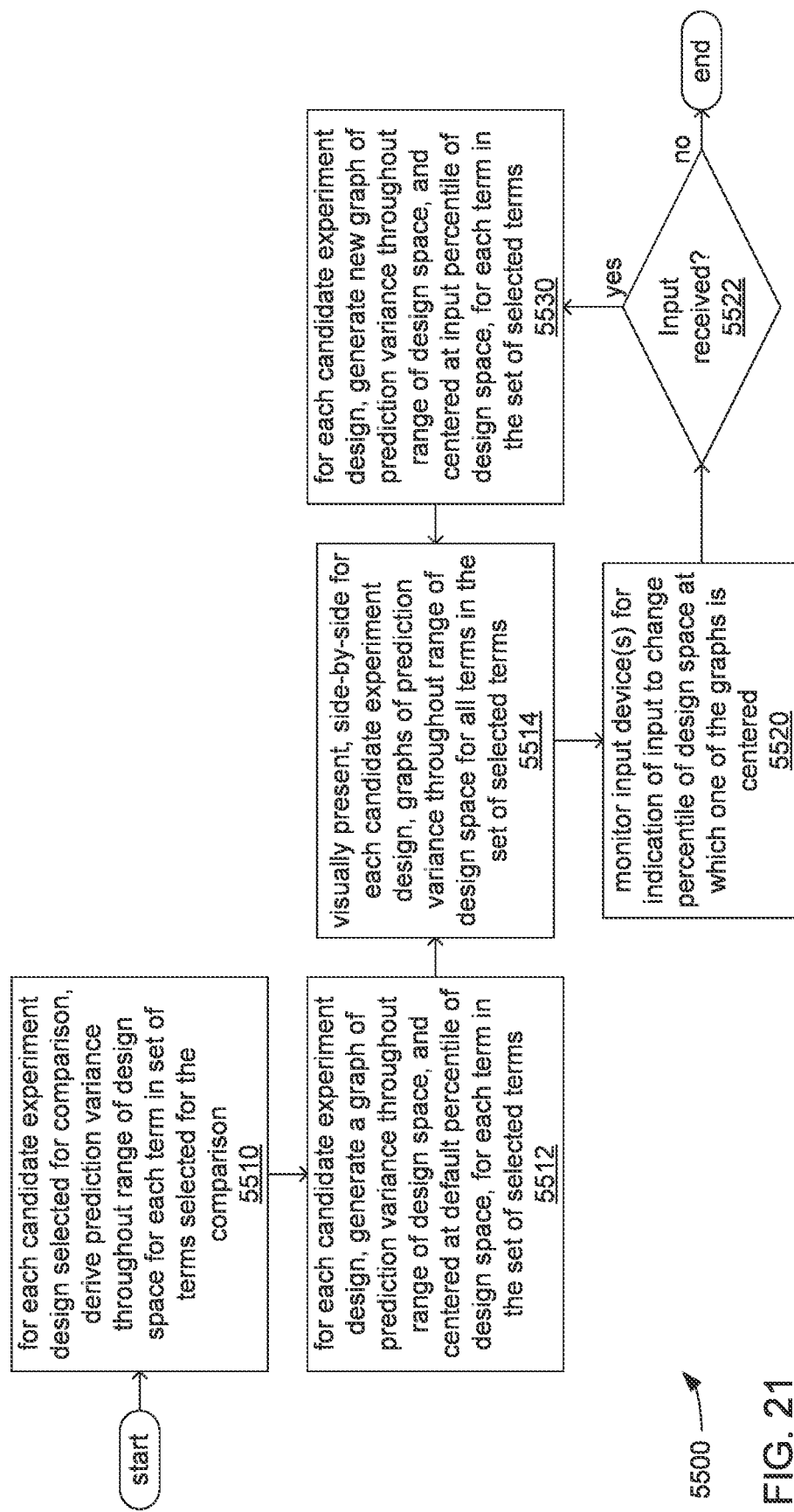
FIG. 21 illustrates an example embodiment of a logic flow of deriving and presenting prediction variance in the guidance of selection of an experiment design of FIGS. 16A-B.

FIG. 21 illustrates an example embodiment of a logic flow 5500. The logic flow 5500 may be representative of some or all of the operations executed by one or more embodiments described herein. More specifically, the logic flow 5500 may illustrate operations performed by the processor 2550, and/or performed by other component(s) of the coordinating device 2500 in executing the design routine 2540 to guide selection of a single experiment design for use.

At 5510, a processor of a coordinating device of a distributed processing system (e.g., the processor 2550 of the coordinating device 2500 of the distributed processing system 2000) may derive a prediction variance for each term in a set of terms to be included in a comparison of multiple candidate experiment designs, and separately for each one of the candidate experiment designs. At 5512, the processor may then generate, for each term and for each candidate experiment design, a graph of the prediction variance throughout the range of design space, and centered at a default percentile of the design space that may be marked by a vertical line positioned along the horizontal axis. At 5514, the processor may present those graphs in adjacent to each other in multiple horizontal rows where each row corresponds to one of the candidate experiment designs.

At 5520, the processor of the coordinating device may monitor one or more input devices for indications of entry of input indicative of a change in the percentile of the design space at which the graph is centered. As previously discussed, such an indication may be as a result of use of a pointing device to horizontally change the position of the vertical line along the horizontal axis. If, at 5522, such input is received, then at 5530, the processor may generate, for each term and for each candidate experiment design, a new graph of the prediction variance throughout the range of design space, and centered at a new percentile of the design space that may be marked by the vertical line at a new position along the horizontal axis. At 5514, the processor may present the new graphs in adjacent to each other in multiple horizontal rows where each row corresponds to one of the candidate experiment designs.

Figure 22:
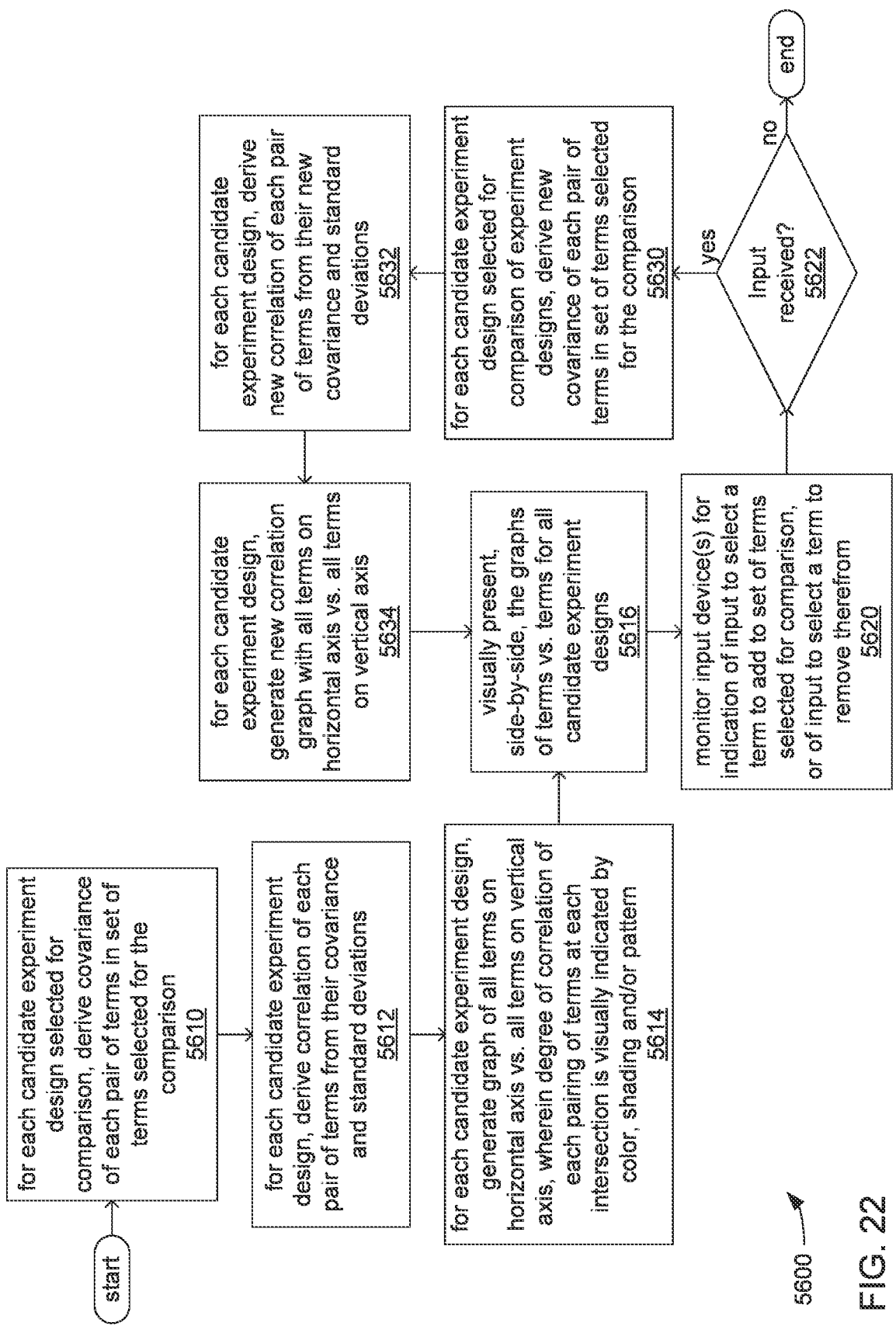
FIG. 22 illustrates an example embodiment of a logic flow of deriving and presenting correlations between terms in the guidance of selection of an experiment design of FIGS. 16A-B.

FIG. 22 illustrates an example embodiment of a logic flow 5600. The logic flow 5600 may be representative of some or all of the operations executed by one or more embodiments described herein. More specifically, the logic flow 5600 may illustrate operations performed by the processor 2550, and/or performed by other component(s) of the coordinating device 2500 in executing the design routine 2540 to guide selection of a single experiment design for use.

At 5610 and 5612, a processor of a coordinating device of a distributed processing system (e.g., the processor 2550 of the coordinating device 2500 of the distributed processing system 2000) may derive the degree of correlation between each possible pair of terms that may be formed from a set of terms to be included in a comparison of multiple candidate experiment designs. More specifically, in some embodiments, the processor may derive the covariance of each possible pair of terms, and then derive the degree of correlation for each of those pairs based on their derived covariance and standard deviations.

At 5614, the processor of the coordinating device may then generate a correlation graph, one each per candidate experiment design, where all of the terms are arranged in identical order along each of the horizontal and vertical axes, and in which visual indicators are positioned at each intersection within the graph that corresponds to one of the possible pairs of terms. As previously discussed, the visual indicators used may be selected from a scale of visual indicators that may form a scale of progressive transition from one color to another, a progressive transition between light and dark on a grayscale, and/or a progressive transition through a series of patterns that transition between no fill and being fully filled in. At 5616, the processor may further present the correlation graphs adjacent to each other and arranged horizontally in a single row (e.g., side-by-side) to exploit the left-right feature comparison capabilities of the HVS.

At 5620, the processor of the coordinating device may monitor one or more input devices for indications of entry of input indicative of a change to the set of terms to either add a term thereto or remove a term therefrom. If, at 5622, such input is received, then at 5630 and 5632, the may again derive the degree of correlation between each possible pair of terms that may be formed from the set of terms. Again, more specifically in some embodiments, the processor may derive the covariance of each possible pair of terms, and then derive the degree of correlation for each of those pairs based on their derived covariance and standard deviations.

At 5634, the processor of the coordinating device may generate a new correlation graph, one each per candidate experiment design, where all of the terms are arranged in identical order along each of the horizontal and vertical axes, and in which visual indicators are positioned at each intersection within the graph that corresponds to one of the possible pairs of terms. At 5616, the processor may then present the new correlation graphs adjacent to each other and arranged horizontally in a single row (e.g., side-by-side) to exploit the left-right feature comparison capabilities of the HVS.

Figure 23A:
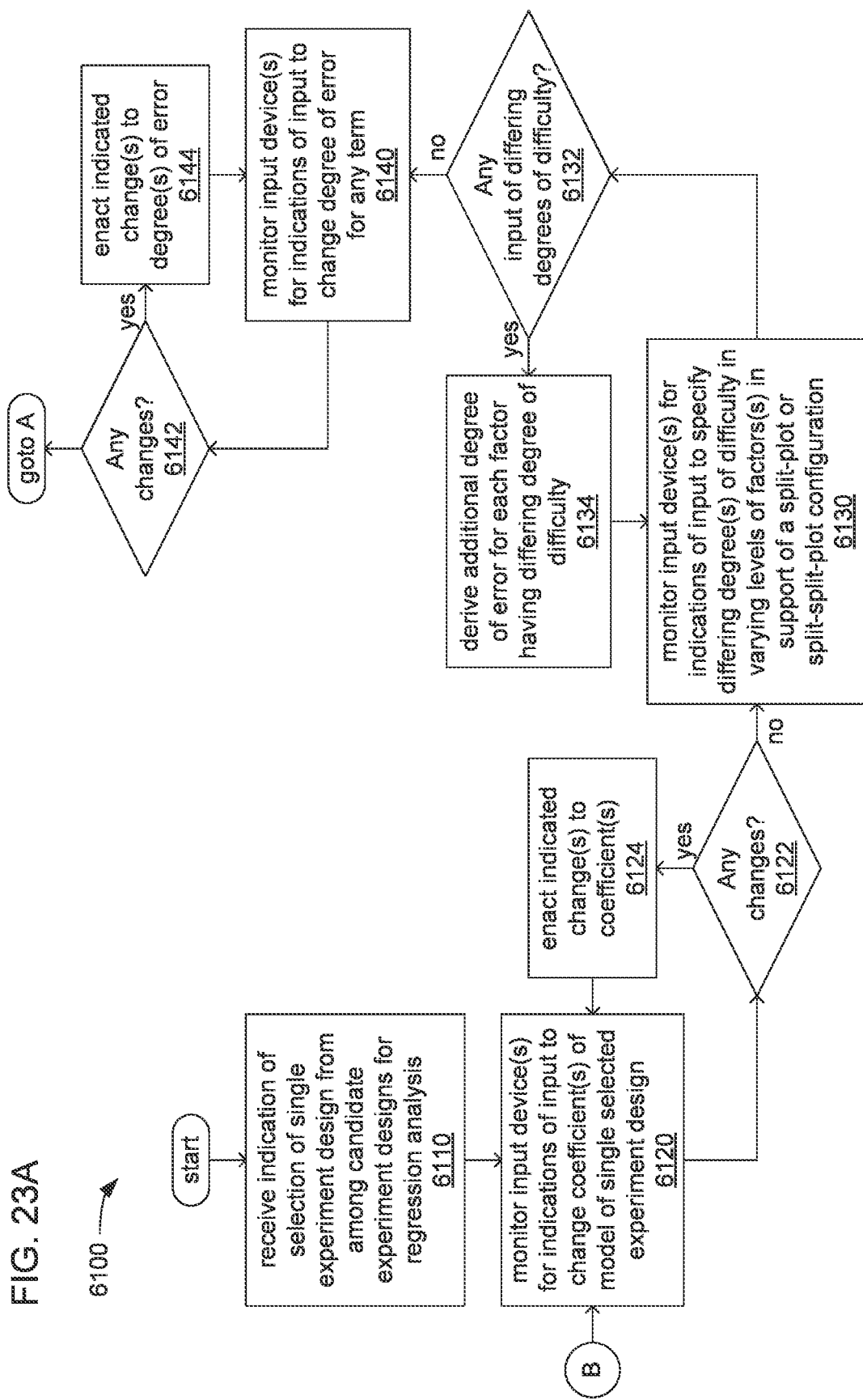
FIGS. 23A and 23B, together, illustrate an example embodiment of a logic flow of the guidance of performance of a regression analysis of FIGS. 16A-B.
Figure 23B:
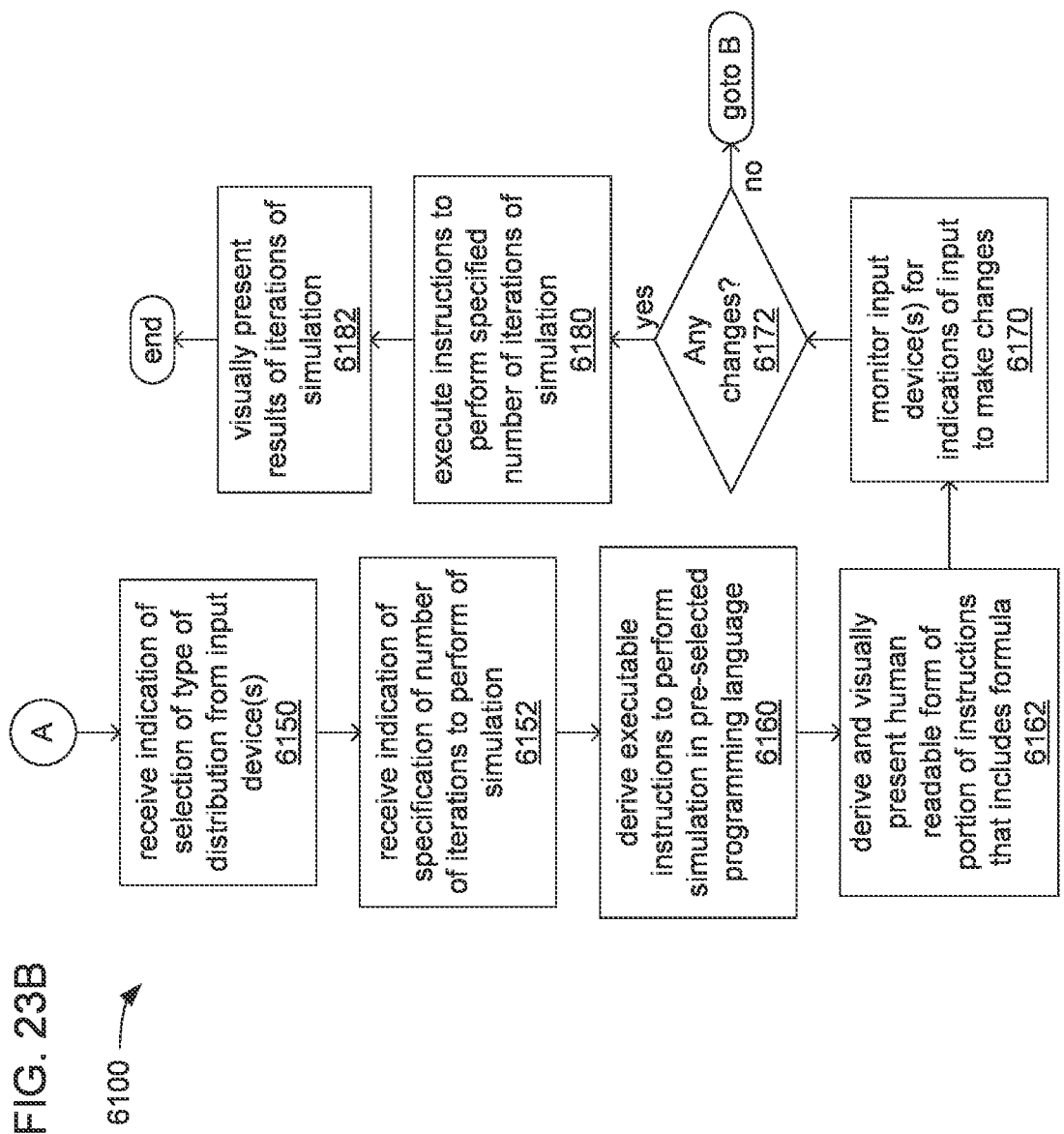

FIGS. 23A and 23B, together, illustrate an example embodiment of a logic flow 6100. The logic flow 6100 may be representative of some or all of the operations executed by one or more embodiments described herein. More specifically, the logic flow 6100 may illustrate operations performed by the processor 2550 and/or the one or more processors 2350, and/or performed by other component(s) of each of the coordinating device 2500 and/or the multiple node devices 2300, respectively, in executing corresponding ones of the regression routines 2570 and/or 2370 to guide the performance of a regression analysis with, a single experiment design for use.

At 6110, a processor of a coordinating device of a distributed processing system (e.g., the processor 2550 of the coordinating device 2500 of the distributed processing system 2000) may receive an indication of a selection of a single experiment design (which may be selected from among multiple previously compared candidate experiment designs) for regression analysis.

At 6120, the processor of the coordinating device may monitor one or more input devices for indications of entry of input indicative of a change to default coefficient(s) for one or more of the terms of the model associated with the selected experiment design. If, at 6122, such input is received, then at 6124, the processor may enact such change(s) to the default coefficient(s), and may return to monitoring for more of such input at 6120.

At 6130, the processor of the coordinating device may monitor the one or more input devices for indications of entry of input indicative of there being a higher degree of difficulty in varying one or more particular factors than for the other factors such that the processor receives an indication that the selected experiment design is to have a split-plot or a split-split-plot configuration. If, at 6132, such input is received, then at 6134, the processor may derive an additional degree of error to which each such factor is to be subject, may present an indication of the additional default degree of error to prompt input indicating a change thereto, and may return to monitoring for more of such input at 6130. Again, as also previously discussed, following receipt of an indication of there being a different degree of difficulty in varying one or more particular factors, the processor 2550 may be caused to present additional prompts to additionally guide an operator through providing separate additional parameters for whole plots and/or subplots, such as the additional entry boxes 3716 by which separate degrees of error may be provided for whole plots and/or subplots.

At 6140, the processor of the coordinating device may monitor the one or more input devices for indications of entry of input indicative of a change to default a degree of error to which one or more of the factors may be subject, such as the separate degree of error that one or more factors indicated as being more difficult to vary may be subject. If, at 6142, such input is received, then at 6144, the processor may enact such change(s) to default degree(s) of error, and may return to monitoring for more of such input at 6140.

At 6150, the processor of the coordinating device may receive an indication of a selection of a type of distribution for the random generation of simulated data. At 6152, the processor may receive an indication of a quantity of iterations of the regression analysis, including the generation of simulated data, is to be performed.

At 6160, based on the parameters provided by the operator and/or from any unchanged default parameters, the processor of the coordinating device may be caused to generate a sequence of executable instructions (e.g., the executable instructions 2534) in a pre-selected programming language for performing the specified quantity of iterations of the regression analysis. At 6162, the processor may also be caused to generate and visually present a human readable form of a portion of the executable instructions that employs mathematical notation to expresses the performance of the regression analysis (e.g., the human readable expression 3722). As previously discussed, such a human readable expression may include the values of the coefficients and/or any intercept, may specify the selected type of distribution to be achieved in the random generation of simulated data, and/or may specify the quantity of iterations of the regression analysis to be performed.

At 6170, the processor of the coordinating device may monitor the one or more input devices for indications of entry of input indicative of a change to one or more of the parameters and/or default parameters upon which the generation of the executable instructions was based. If, at 6172, such input is received, then the processor may return to receiving and/or acting on the provision of revised ones of those parameters at 6120 through 6152.

However, if at 6172, there are no such input, then at 6180, the processor of the coordinating device may proceed with either directly executing the executable instructions to perform the specified quantity of iterations of the regression analysis, or may coordinate the distribution and performance of the iterations of the regression analysis by multiple other processors and/or processor cores (e.g., the one or more processors 2350 and/or processor cores 2355). As previously discussed, such other processors and/or processor cores may be incorporated into multiple node devices with which the coordinating device may communicate via a network (e.g., the multiple node devices 2300 via the network 2999). Alternatively, and as also previously discussed, such other processor(s) and/or processor cores may also be incorporated into the coordinating device (e.g., as one or more GPUs).

Upon completion of the specified quantity of iterations of the regression analysis, the processor of the coordinating device may visually present the results thereof at 6182.

In various embodiments, the division of processing and/or storage resources among the devices, and/or the API architectures supporting communications among the devices, may be configured to and/or selected to conform to any of a variety of standards for distributed processing, including without limitation, IEEE P2413, the ALLJOYN® standard, the IOTIVITY™ standard, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data set portions of data set(s) are not dependent on, nor constrained by, existing API architectures and/or supporting communications protocols. More broadly, there is nothing in the manner in which data set(s) may be organized in storage, transmission and/or distribution via a network that is bound to existing API architectures or protocols.

Some systems may use the HADOOP® framework, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node HADOOP® cluster, as understood by a person of skill in the art. The APACHE™ HADOOP® framework is an open-source software framework for distributed computing.

Implementing some examples at least in part by using machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, and/or some other machine-learning specific processor that implements one or more neural networks using semiconductor (e.g., silicon (Si), gallium arsenide (GaAs)) devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising at least one processor and a storage to store instructions that, when executed by the at least one processor, cause the at least one processor to perform operations comprising:
receive, from an input device communicatively coupled to the at least one processor, an indication of a selection of an experiment design from which a set of variants of the experiment design are to be generated, wherein:
the experiment design is associated with a model of a system under evaluation;
the model comprises a set of terms as inputs to the model, and a set of responses as outputs from the model; and
each term of the set of terms comprises at least one factor of a set of factors that are inputs to the system under evaluation;
receive, from the input device, indications of selections, from among a predefined set of parameters of the experiment design, of a subset of parameters of the experiment design that are to be varied to generate the set of variants;
provide an estimation portion of a graphical user interface (GUI), wherein the at least one processor is caused to perform operations comprising:
present, on a display communicatively coupled to the at least one processor, visual prompts to guide an operator through selecting, from among the set of terms, a first subset of terms to be estimated for each variant based on the model, and a second subset of terms to be estimated for each variant using Bayesian modification;
monitor the input device for indications of selections of terms to be included in the first subset of terms, for indications of selections of terms to be included in the second subset of terms, or for an indication of receipt of a command to generate the set of variants;
in response to each indication of a change in the terms currently included in the first subset of terms, determine whether all of the terms currently included within the first subset are able to be estimated based on the model;
in response to a determination that the first subset of terms includes a quantity of terms greater than is able to be estimated based on the model, present, on the display, an indication that too many terms have been selected for estimation based on the model; or
in response to a determination that the first subset of terms includes a quantity of terms less than is able to be estimated based on the model, present, on the display, an indication that more terms are able to be selected for estimation based on the model; and
in response to receiving the command to generate the set of variants, the at least one processor is caused to perform operations comprising:
generate the set of variants based on the subset of parameters of the experiment design that are to be varied;
for each variant, perform operations comprising:
estimate each term of the first subset of terms based on the model; and
estimate each term of the second subset of terms using Bayesian modification; and
provide a table portion of the GUI, wherein the at least one processor is caused to present, on the display, a table, wherein, for each variant, the table comprises values of the subset of parameters of the experiment design that were used to generate the variant.

2. The apparatus of claim 1, wherein presenting, on the display, an indication that too many terms have been selected for estimation based on the model comprises the at least one processor performing operations comprising:
reversing a most recent change in the terms currently included in the first subset of terms; and
presenting, on the display, an indication that the most recent change in the terms currently included in the first subset of terms has been reversed.

3. The apparatus of claim 1, wherein providing the estimation portion of the GUI further comprises the at least one processor performing operations comprising:
present, on the display, a list of at least first-order terms and second-order terms of the model;
initially present, on the display, and beside each first-order term of the list, an indication of the first-order term as selected to be estimated based on the model as a default;
initially include all first-order terms of the model in the first subset of terms to cause all first-order terms of the model to be estimated based on the model as a default;

for each first-order term of the list, monitor the input device for a change of the indication of being selected to be estimated based on the model to an indication of being selected to not be estimated; and in response to a change, for a first-order term of the list, of the indication of being selected to be estimated based on the model to an indication of being selected to not be estimated, remove the first-order term from the first subset of terms.

4. The apparatus of claim 3, wherein:

the performance of the estimation of each term of the second subset of terms using Bayesian modification is conditioned on the second subset of terms comprising at least one term; and providing the estimation portion of the GUI further comprises the at least one processor performing operations comprising:

initially present, on the display, and beside each second-order term of the list, an indication of the second-order term as not being selected to be estimated as a default;

initially include no second-order terms of the model in either of the first subset of terms or the second subset of terms as a default, such that the second subset is initially an empty set;

for at least one second-order term of the list, present, on the display, an option to change the indication of not being selected to be estimated to an indication of being selected to be estimated using Bayesian modification;

for each term of the list, monitor the input device for a change of the indication of not being selected to be estimated, or of the indication of being selected to be estimated based on the model, to an indication of being selected to be estimated using Bayesian modification; and in response to a change, for a term of the list, of the indication of not being selected to be estimated, or of the indication of being selected to be estimated based on the model, to an indication of being selected to be estimated using Bayesian modification, include the term in the second subset of terms.

5. The apparatus of claim 3, wherein:

the performance of the estimation of each term of the second subset of terms using Bayesian modification is conditioned on the second subset of terms comprising at least one term; and providing the estimation portion of the GUI further comprises the at least one processor performing operations comprising:

initially present, on the display, and beside each second-order term of the list, an indication of the second-order term as being selected to be estimated using Bayesian modification as a default;

initially include all second-order terms of the model in the second subset of terms as a default;

for at least one second-order term of the list, present, on the display, an option to change the indication of being selected to be estimated using Bayesian modification to either an indication of being selected to not be estimated or an indication of being selected to be estimated based on the model;

for each term of the list, monitor the input device for a change of the indication of not being selected to be estimated to either an indication of being selected to not be estimated or an indication of being selected to be estimated based on the model;

in response to a change, for a term of the list, of the indication of being selected to be estimated using Bayesian modification to an indication of being selected to not be estimated, remove the term from the second subset of terms; and in response to a change, for a term of the list, of the indication of being selected to be estimated using Bayesian modification to an indication of being selected to be estimated based on the model, perform operations comprising:

determine whether adding the term to the first subset of terms would cause the first subset of terms to include a quantity of terms greater than is able to be estimated based on the model;

in response to a determination that the first subset of terms would include a quantity of terms greater than is able to be estimated based on the model, present, on the display, an indication that the change results in too many terms to be estimated using the model; and in response to a determination that the first subset of terms would not include a quantity of terms greater than is able to be estimated based on the model, remove the term from the second subset of terms, and add the term to the first subset of terms.

6. The apparatus of claim 3, wherein providing the estimation portion of the GUI further comprises the at least one processor performing operations comprising:

determine a quantity of second-order terms that are able to be estimated based on the model in addition to all of the first-order terms;

initially present, on the display, and beside each second-order term of the quantity of second-order terms of the list, an indication of each second-order term of the quantity of second-order terms as selected to be estimated based on the model as a default;

initially include each second-order term of the quantity of second-order terms of the model in the first subset of terms to cause each second-order term of the quantity of second-order terms of the model to be estimated based on the model as a default;

for at least one first-order term of the list, present, on the display, an option to change the indication of being selected to be estimated based on the model to an indication of being selected to not be estimated;

for each first-order term of the list, monitor the input device for a change of the indication of being selected to be estimated based on the model to an indication of being selected to not be estimated; and in response to a change, for a first-order term of the list, of the indication of being selected to be estimated based on the model to an indication of being selected to not be estimated, perform operations comprising:

remove the first-order term from the first subset of terms;

present, on the display and beside another second-order term of the second-order terms of the list, an indication of the other second-order term as being selected to be estimated using the model; and include the other second-order term in the first subset of terms.

7. The apparatus of claim 1, wherein the at least one processor is further caused to provide a variants portion of the GUI, wherein the at least one processor is caused to perform operations comprising:

present, on the display, visual prompts to guide the operator through selecting, from among the predefined set of parameters of the experiment design, the subset of parameters that are to be varied to generate the set of variants;
present, on the display, visual prompts to guide the operator through specifying a range of values for each parameter of the subset of parameters; and
receive, from the input device, indications of the range of values for each parameter of the subset of parameters.

8. The apparatus of claim 7, wherein providing the variants portion of the GUI further comprises the at least one processor performing operations comprising:
present, on the display, visual prompts to guide the operator through specifying a value by which to step through the range of values specified for each parameter of the subset of parameters; and
receive, from the input device, indications of the value by which to step through the range of values for each parameter of the subset of parameters.

9. The apparatus of claim 1, wherein:
the at least one processor is caused to, in response to receiving the command to generate the set of variants, and for each variant of the set of variants, derive at least one optimality value indicative of at least one optimality type of the variant; and
for each variant, the table further comprises the at least one optimality value.

10. The apparatus of claim 1, wherein providing the table portion of the GUI further comprises the at least one processor performing operations comprising:
present, on the display, visual prompts to guide the operator to either select a variant of the set of variants to become a new version of the experiment design, or return to the variants portion of the GUI to select another subset of parameters to be varied to generate another set of variants of the experiment design; and
monitor the input device for a command to select a variant of the set of variants to become the new version of the experiment design, or for a command to return to the variants portion of the GUI.

11. A computer-program product tangibly embodied in a non-transitory machine-readable storage medium, the computer-program product including instructions operable to cause at least one processor to perform operations comprising:
receive, from an input device communicatively coupled to the at least one processor, an indication of a selection of an experiment design from which a set of variants of the experiment design are to be generated, wherein:
the experiment design is associated with a model of a system under evaluation;
the model comprises a set of terms as inputs to the model, and a set of responses as outputs from the model; and
each term of the set of terms comprises at least one factor of a set of factors that are inputs to the system under evaluation;
receive, from the input device, indications of selections, from among a predefined set of parameters of the experiment design, of a subset of parameters of the experiment design that are to be varied to generate the set of variants;
provide an estimation portion of a graphical user interface (GUI), wherein the at least one processor is caused to perform operations comprising:
present, on a display communicatively coupled to the at least one processor, visual prompts to guide an operator through selecting, from among the set of terms, a first subset of terms to be estimated for each variant based on the model, and a second subset of terms to be estimated for each variant using Bayesian modification;
monitor the input device for indications of selections of terms to be included in the first subset of terms, for indications of selections of terms to be included in the second subset of terms, or for an indication of receipt of a command to generate the set of variants;
in response to each indication of a change in the terms currently included in the first subset of terms, determine whether all of the terms currently included within the first subset are able to be estimated based on the model;
in response to a determination that the first subset of terms includes a quantity of terms greater than is able to be estimated based on the model, present, on the display, an indication that too many terms have been selected for estimation based on the model; or
in response to a determination that the first subset of terms includes a quantity of terms less than is able to be estimated based on the model, present, on the display, an indication that more terms are able to be selected for estimation based on the model; and
in response to receiving the command to generate the set of variants, the at least one processor is caused to perform operations comprising:
generate the set of variants based on the subset of parameters of the experiment design that are to be varied;
for each variant, perform operations comprising:
estimate each term of the first subset of terms based on the model; and
estimate each term of the second subset of terms using Bayesian modification; and
provide a table portion of the GUI, wherein the at least one processor is caused to present, on the display, a table, wherein, for each variant, the table comprises values of the subset of parameters of the experiment design that were used to generate the variant.

12. The computer-program product of claim 11, wherein presenting, on the display, an indication that too many terms have been selected for estimation based on the model comprises the at least one processor performing operations comprising:
reversing a most recent change in the terms currently included in the first subset of terms; and
presenting, on the display, an indication that the most recent change in the terms currently included in the first subset of terms has been reversed.

13. The computer-program product of claim 11, wherein providing the estimation portion of the GUI further comprises the at least one processor performing operations comprising:
present, on the display, a list of at least first-order terms and second-order terms of the model;
initially present, on the display, and beside each first-order term of the list, an indication of the first-order term as selected to be estimated based on the model as a default;
initially include all first-order terms of the model in the first subset of terms to cause all first-order terms of the model to be estimated based on the model as a default;
for each first-order term of the list, monitor the input device for a change of the indication of being selected to be estimated based on the model to an indication of being selected to not be estimated; and in response to a change, for a first-order term of the list, of the indication of being selected to be estimated based on the model to an indication of being selected to not be estimated, remove the first-order term from the first subset of terms.

14. The computer-program product of claim 13, wherein:
the performance of the estimation of each term of the second subset of terms using Bayesian modification is conditioned on the second subset of terms comprising at least one term; and
providing the estimation portion of the GUI further comprises the at least one processor performing operations comprising:
  initially present, on the display, and beside each second-order term of the list, an indication of the second-order term as not being selected to be estimated as a default;
  initially include no second-order terms of the model in either of the first subset of terms or the second subset of terms as a default, such that the second subset is initially an empty set;
  for at least one second-order term of the list, present, on the display, an option to change the indication of not being selected to be estimated to an indication of being selected to be estimated using Bayesian modification;
  for each term of the list, monitor the input device for a change of the indication of not being selected to be estimated, or of the indication of being selected to be estimated based on the model, to an indication of being selected to be estimated using Bayesian modification; and
  in response to a change, for a term of the list, of the indication of not being selected to be estimated, or of the indication of being selected to be estimated based on the model, to an indication of being selected to be estimated using Bayesian modification, include the term in the second subset of terms.

15. The computer-program product of claim 13, wherein:
the performance of the estimation of each term of the second subset of terms using Bayesian modification is conditioned on the second subset of terms comprising at least one term; and
providing the estimation portion of the GUI further comprises the at least one processor performing operations comprising:
  initially present, on the display, and beside each second-order term of the list, an indication of the second-order term as being selected to be estimated using Bayesian modification as a default;
  initially include all second-order terms of the model in the second subset of terms as a default;
  for at least one second-order term of the list, present, on the display, an option to change the indication of being selected to be estimated using Bayesian modification to either an indication of being selected to not be estimated or an indication of being selected to be estimated based on the model;
  for each term of the list, monitor the input device for a change of the indication of not being selected to be estimated to either an indication of being selected to not be estimated or an indication of being selected to be estimated based on the model;
  in response to a change, for a term of the list, of the indication of being selected to be estimated using Bayesian modification to an indication of being selected to not be estimated, remove the term from the second subset of terms; and
  in response to a change, for a term of the list, of the indication of being selected to be estimated using Bayesian modification to an indication of being selected to be estimated based on the model, perform operations comprising:
    determine whether adding the term to the first subset of terms would cause the first subset of terms to include a quantity of terms greater than is able to be estimated based on the model;
    in response to a determination that the first subset of terms would include a quantity of terms greater than is able to be estimated based on the model, present, on the display, an indication that the change results in too many terms to be estimated using the model; and
    in response to a determination that the first subset of terms would not include a quantity of terms greater than is able to be estimated based on the model, remove the term from the second subset of terms, and add the term to the first subset of terms.

16. The computer-program product of claim 13, wherein providing the estimation portion of the GUI further comprises the at least one processor performing operations comprising:
  determine a quantity of second-order terms that are able to be estimated based on the model in addition to all of the first-order terms;
  initially present, on the display, and beside each second-order term of the quantity of second-order terms of the list, an indication of each second-order term of the quantity of second-order terms as selected to be estimated based on the model as a default;
  initially include each second-order term of the quantity of second-order terms of the model in the first subset of terms to cause each second-order term of the quantity of second-order terms of the model to be estimated based on the model as a default;
  for at least one first-order term of the list, present, on the display, an option to change the indication of being selected to be estimated based on the model to an indication of being selected to not be estimated;
  for each first-order term of the list, monitor the input device for a change of the indication of being selected to be estimated based on the model to an indication of being selected to not be estimated; and
  in response to a change, for a first-order term of the list, of the indication of being selected to be estimated based on the model to an indication of being selected to not be estimated, perform operations comprising:
    remove the first-order term from the first subset of terms;
    present, on the display and beside another second-order term of the second-order terms of the list, an indication of the other second-order term as being selected to be estimated using the model; and
    include the other second-order term in the first subset of terms.

17. The computer-program product of claim 11, wherein the at least one processor is further caused to provide a variants portion of the GUI, wherein the at least one processor is caused to perform operations comprising:
  present, on the display, visual prompts to guide the operator through selecting, from among the predefined set of parameters of the experiment design, the subset of parameters that are to be varied to generate the set of variants;
present, on the display, visual prompts to guide the operator through specifying a range of values for each parameter of the subset of parameters; and
receive, from the input device, indications of the range of values for each parameter of the subset of parameters.

18. The computer-program product of claim 17, wherein providing the variants portion of the GUI further comprises the at least one processor performing operations comprising:
present, on the display, visual prompts to guide the operator through specifying a value by which to step through the range of values specified for each parameter of the subset of parameters; and
receive, from the input device, indications of the value by which to step through the range of values for each parameter of the subset of parameters.

19. The computer-program product of claim 11, wherein:
the at least one processor is caused to, in response to receiving the command to generate the set of variants, and for each variant of the set of variants, derive at least one optimality value indicative of at least one optimality type of the variant; and
for each variant, the table further comprises the at least one optimality value.

20. The computer-program product of claim 11, wherein providing the table portion of the GUI further comprises the at least one processor performing operations comprising:
present, on the display, visual prompts to guide the operator to either select a variant of the set of variants to become a new version of the experiment design, or return to the variants portion of the GUI to select another subset of parameters to be varied to generate another set of variants of the experiment design; and
monitor the input device for a command to select a variant of the set of variants to become the new version of the experiment design, or for a command to return to the variants portion of the GUI.

21. A computer-implemented method comprising:
receiving, by at least one processor, and from an input device communicatively coupled to the at least one processor, an indication of a selection of an experiment design from which a set of variants of the experiment design are to be generated, wherein:
the experiment design is associated with a model of a system under evaluation;
the model comprises a set of terms as inputs to the model, and a set of responses as outputs from the model; and
each term of the set of terms comprises at least one factor of a set of factors that are inputs to the system under evaluation;
receiving, by the at least one processor, and from the input device, indications of selections, from among a predefined set of parameters of the experiment design, of a subset of parameters of the experiment design that are to be varied to generate the set of variants;
providing, by the at least one processor, an estimation portion of a graphical user interface (GUI), wherein the method comprises performing operations comprising:
presenting, by the at least one processor, and on a display communicatively coupled to the at least one processor, visual prompts to guide an operator through selecting, from among the set of terms, a first subset of terms to be estimated for each variant based on the model, and a second subset of terms to be estimated for each variant using Bayesian modification;
monitoring, by the at least one processor, the input device for indications of selections of terms to be included in the first subset of terms, for indications of selections of terms to be included in the second subset of terms, or for an indication of receipt of a command to generate the set of variants;
in response to each indication of a change in the terms currently included in the first subset of terms, determining, by the at least one processor, whether all of the terms currently included within the first subset are able to be estimated based on the model;
in response to a determination that the first subset of terms includes a quantity of terms greater than is able to be estimated based on the model, presenting, by the at least one processor, and on the display, an indication that too many terms have been selected for estimation based on the model; or
in response to a determination that the first subset of terms includes a quantity of terms less than is able to be estimated based on the model, presenting, by the at least one processor, and on the display, an indication that more terms are able to be selected for estimation based on the model; and
in response to receiving the command to generate the set of variants, performing operations comprising:
generating, by the at least one processor, the set of variants based on the subset of parameters of the experiment design that are to be varied;
for each variant, performing operations comprising:
estimating, by the at least one processor, each term of the first subset of terms based on the model; and
estimating, by the at least one processor, each term of the second subset of terms using Bayesian modification; and
providing, by the at least one processor, a table portion of the GUI, wherein the method comprises performing operations comprising presenting, by the at least one processor, and on the display, a table, wherein, for each variant, the table comprises values of the subset of parameters of the experiment design that were used to generate the variant.

22. The computer-implemented method of claim 21, wherein presenting, on the display, an indication that too many terms have been selected for estimation based on the model comprises performing operations comprising:
reversing a most recent change in the terms currently included in the first subset of terms; and
presenting, by the at least one processor, and on the display, an indication that the most recent change in the terms currently included in the first subset of terms has been reversed.

23. The computer-implemented method of claim 21, wherein providing the estimation portion of the GUI further comprises performing operations comprising:
presenting, by the at least one processor, and on the display, a list of at least first-order terms and second-order terms of the model;
initially presenting, by the at least one processor, and on the display, and beside each first-order term of the list, an indication of the first-order term as selected to be estimated based on the model as a default;
initially including all first-order terms of the model in the first subset of terms to cause all first-order terms of the model to be estimated based on the model as a default;

for each first-order term of the list, monitoring, by the at least one processor, the input device for a change of the indication of being selected to be estimated based on the model to an indication of being selected to not be estimated; and in response to a change, for a first-order term of the list, of the indication of being selected to be estimated based on the model to an indication of being selected to not be estimated, removing the first-order term from the first subset of terms.

24. The computer-implemented method of claim 23, wherein:

the performance of the estimation of each term of the second subset of terms using Bayesian modification is conditioned on the second subset of terms comprising at least one term; and providing the estimation portion of the GUI further comprises performing operations comprising:

initially presenting, by the at least one processor, and on the display, and beside each second-order term of the list, an indication of the second-order term as not being selected to be estimated as a default;

initially include no second-order terms of the model in either of the first subset of terms or the second subset of terms as a default, such that the second subset is initially an empty set;

for at least one second-order term of the list, presenting, by the at least one processor, and on the display, an option to change the indication of not being selected to be estimated to an indication of being selected to be estimated using Bayesian modification;

for each term of the list, monitoring, by the at least one processor, the input device for a change of the indication of not being selected to be estimated, or of the indication of being selected to be estimated based on the model, to an indication of being selected to be estimated using Bayesian modification; and in response to a change, for a term of the list, of the indication of not being selected to be estimated, or of the indication of being selected to be estimated based on the model, to an indication of being selected to be estimated using Bayesian modification, including the term in the second subset of terms.

25. The computer-implemented method of claim 23, wherein:

the performance of the estimation of each term of the second subset of terms using Bayesian modification is conditioned on the second subset of terms comprising at least one term; and providing the estimation portion of the GUI further comprises performing operations comprising:

initially presenting, by the at least one processor, and on the display, and beside each second-order term of the list, an indication of the second-order term as being selected to be estimated using Bayesian modification as a default;

initially including all second-order terms of the model in the second subset of terms as a default;

for at least one second-order term of the list, presenting, by the at least one processor, and on the display, an option to change the indication of being selected to be estimated using Bayesian modification to either an indication of being selected to not be estimated or an indication of being selected to be estimated based on the model;

for each term of the list, monitoring, by the at least one processor, the input device for a change of the indication of not being selected to be estimated to either an indication of being selected to not be estimated or an indication of being selected to be estimated based on the model;

in response to a change, for a term of the list, of the indication of being selected to be estimated using Bayesian modification to an indication of being selected to not be estimated, removing the term from the second subset of terms; and in response to a change, for a term of the list, of the indication of being selected to be estimated using Bayesian modification to an indication of being selected to be estimated based on the model, performing operations comprising:

determining, by the at least one processor, whether adding the term to the first subset of terms would cause the first subset of terms to include a quantity of terms greater than is able to be estimated based on the model;

in response to a determination that the first subset of terms would include a quantity of terms greater than is able to be estimated based on the model, presenting, by the at least one processor, and on the display, an indication that the change results in too many terms to be estimated using the model; and in response to a determination that the first subset of terms would not include a quantity of terms greater than is able to be estimated based on the model, removing the term from the second subset of terms, and add the term to the first subset of terms.

26. The computer-implemented method of claim 23, wherein providing the estimation portion of the GUI further comprises performing operations comprising:

determining, by the at least one processor, a quantity of second-order terms that are able to be estimated based on the model in addition to all of the first-order terms;

initially presenting, by the at least one processor, and on the display, and beside each second-order term of the quantity of second-order terms of the list, an indication of each second-order term of the quantity of second-order terms as selected to be estimated based on the model as a default;

initially including each second-order term of the quantity of second-order terms of the model in the first subset of terms to cause each second-order term of the quantity of second-order terms of the model to be estimated based on the model as a default;

for at least one first-order term of the list, presenting, by the at least one processor, and on the display, an option to change the indication of being selected to be estimated based on the model to an indication of being selected to not be estimated;

for each first-order term of the list, monitoring, by the at least one processor, the input device for a change of the indication of being selected to be estimated based on the model to an indication of being selected to not be estimated; and in response to a change, for a first-order term of the list, of the indication of being selected to be estimated based on the model to an indication of being selected to not be estimated, performing operations comprising:

removing the first-order term from the first subset of terms;

presenting, by the at least one processor, and on the display and beside another second-order term of the second-order terms of the list, an indication of the other second-order term as being selected to be estimated using the model; and including the other second-order term in the first subset of terms.

27. The computer-implemented method of claim 21, comprising providing, by the at least one processor, a variants portion of the GUI, wherein the method comprises performing operations comprising:

presenting, by the at least one processor, and on the display, visual prompts to guide the operator through selecting, from among the predefined set of parameters of the experiment design, the subset of parameters that are to be varied to generate the set of variants;

presenting, by the at least one processor, and on the display, visual prompts to guide the operator through specifying a range of values for each parameter of the subset of parameters; and receiving, by the at least one processor, and from the input device, indications of the range of values for each parameter of the subset of parameters.

28. The computer-implemented method of claim 27, wherein providing the variants portion of the GUI further comprises performing operations comprising:

presenting, by the at least one processor, and on the display, visual prompts to guide the operator through specifying a value by which to step through the range of values specified for each parameter of the subset of parameters; and receiving, by the at least one processor, and from the input device, indications of the value by which to step through the range of values for each parameter of the subset of parameters.

29. The computer-implemented method of claim 21, wherein:

the method comprises, in response to receiving the command to generate the set of variants, and for each variant of the set of variants, deriving, by the at least one processor, at least one optimality value indicative of at least one optimality type of the variant; and for each variant, the table further comprises the at least one optimality value.

30. The computer-implemented method of claim 21, wherein providing the table portion of the GUI further comprises performing operations comprising:

presenting, by the at least one processor, and on the display, visual prompts to guide the operator to either select a variant of the set of variants to become a new version of the experiment design, or return to the variants portion of the GUI to select another subset of parameters to be varied to generate another set of variants of the experiment design; and monitoring, by the at least one processor, the input device for a command to select a variant of the set of variants to become the new version of the experiment design, or for a command to return to the variants portion of the GUI.

* * * * *